US012442488B2

(12) United States Patent
Tortorella, Jr.

(10) Patent No.: US 12,442,488 B2
(45) Date of Patent: *Oct. 14, 2025

(54) ORGANIZER AND WALL MOUNT FOR ORGANIZER

(71) Applicant: Frank Joseph Tortorella, Jr., Park Ridge, IL (US)

(72) Inventor: Frank Joseph Tortorella, Jr., Park Ridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,360

(22) Filed: Mar. 25, 2024

(65) Prior Publication Data

US 2024/0263737 A1 Aug. 8, 2024

Related U.S. Application Data

(60) Division of application No. 17/467,410, filed on Sep. 6, 2021, now Pat. No. 11,940,089, and a continuation-in-part of application No. 29/806,459, filed on Sep. 2, 2021, and a continuation-in-part of application No. 29/806,462, filed on Sep. 2, 2021, said application No. 17/467,410 is a continuation-in-part of application No. 17/157,675, filed on Jan. 25, 2021, now Pat. No. 11,913,595, application No. 18/615,360 is a continuation-in-part of application No. 29/696,973, filed on Jul. 2, 2019, and a continuation-in-part of application No. 29/696,970, filed on Jul. 2, 2019, now Pat. No. Des. 1,017,271, and a continuation-in-part of application No. 29/696,969, filed on Jul. 2, 2019, said application No. 17/467,410 is a continuation-in-part of application No. 16/202,732, filed on Nov. 28, 2018, now Pat. No. 11,110,590, said application No. 17/157,675 is a continuation of application No. 16/202,033, filed on Nov. 27, 2018, now abandoned, (Continued)

(51) Int. Cl.
*F16M 13/02* (2006.01)
(52) U.S. Cl.
CPC .................. *F16M 13/02* (2013.01)
(58) Field of Classification Search
CPC ... B25H 3/04; B25H 3/02; B25H 3/00; F16M 11/041
See application file for complete search history.

(56) References Cited

U.S. PATENT DOCUMENTS 2,450,722 A * 10/1948 Drije ................. A47J 45/02
248/311.2
3,168,275 A * 2/1965 Grondin ............. A47K 10/185
248/905

(Continued)

*Primary Examiner* — Bradley Duckworth
(74) *Attorney, Agent, or Firm* — MARSHALL, GERSTEIN & BORUN LLP

(57) ABSTRACT

A wall mount for a tool box includes a base, the base being at least substantially planar and defining a volume dimensioned to receive a tool box, a support extending outwardly from a lower portion of the base, the support constructed to at least substantially bear a weight of a tool box received by the wall mount, and at least one receiver extending outwardly from an upper portion of the base, the at least one receiver being constructed to engage a correspondingly dimensioned and positioned feature of a tool box to prevent outward rotation of a tool box about the at least one support.

11 Claims, 34 Drawing Sheets

Related U.S. Application Data which is a continuation-in-part of application No. 16/051,439, filed on Jul. 31, 2018, now Pat. No. 11,007,634, said application No. 16/202,732 is a continuation-in-part of application No. 16/051,439, filed on Jul. 31, 2018, now Pat. No. 11,007,634, application No. 18/615,360 is a continuation-in-part of application No. 29/650,060, filed on Jun. 4, 2018, now Pat. No. Des. 931,612, and a continuation-in-part of application No. 29/647,129, filed on May 9, 2018, now Pat. No. Des. 932,289, and a continuation-in-part of application No. 29/647,006, filed on May 9, 2018, now Pat. No. Des. 931,611.

(60) Provisional application No. 62/630,177, filed on Feb. 13, 2018, provisional application No. 62/592,222, filed on Nov. 29, 2017.

(56) References Cited

U.S. PATENT DOCUMENTS

| | | | | |
|---|---|---|---|---|
| 4,176,817 A * | 12/1979 | Jones | ............... | F16M 13/02 248/905 |
| 4,765,470 A * | 8/1988 | Curci | ............... | A01K 97/06 312/328 |
| 4,819,800 A * | 4/1989 | Wilson | ............... | B25H 3/023 211/70.6 |
| 5,984,441 A * | 11/1999 | Stokhuijzen | ......... | B65D 21/083 312/249.7 |
| 7,228,977 B2 * | 6/2007 | Perkins | ............... | A47B 95/008 211/94.01 |
| 7,527,156 B2 * | 5/2009 | Wisnoski | ............... | B25H 3/04 211/94.01 |
| 7,975,855 B2 * | 7/2011 | Lin | ............... | B25H 3/025 211/70.6 |
| 8,061,536 B2 * | 11/2011 | Lin | ............... | B25H 3/025 206/478 |
| 8,752,802 B1 * | 6/2014 | Fan | ............... | H04M 1/04 248/316.1 |
| 9,578,979 B1 * | 2/2017 | Zeuch | ............... | F16M 13/02 |
| D878,096 S * | 3/2020 | Tortorella, Jr. | ............... | D6/553 |
| 10,583,962 B2 * | 3/2020 | Brunner | ............... | B25H 1/04 |
| 10,703,534 B2 * | 7/2020 | Brunner | ............... | B62B 1/14 |
| D894,632 S * | 9/2020 | Tortorella, Jr. | ............... | D6/553 |
| 11,007,634 B1 * | 5/2021 | Tortorella, Jr. | ............... | B25H 3/02 |
| D931,611 S * | 9/2021 | Tortorella, Jr. | ............... | D3/315 |
| D931,612 S * | 9/2021 | Tortorella, Jr. | ............... | D3/315 |
| 11,110,590 B1 * | 9/2021 | Tortorella, Jr. | ............... | B25H 3/023 |
| D932,289 S * | 10/2021 | Tortorella, Jr. | ............... | D8/373 |
| 11,426,859 B2 * | 8/2022 | Squiers | ............... | A45F 3/047 |
| 11,913,595 B1 * | 2/2024 | Tortorella | ............... | B25H 3/022 |
| 11,940,089 B1 * | 3/2024 | Tortorella, Jr. | ............... | F16M 13/02 |
| 2002/0113187 A1 * | 8/2002 | Decker | ............... | A47K 10/185 248/905 |
| 2014/0061415 A1 * | 3/2014 | Hermey | ............... | F16M 13/02 248/316.1 |
| 2020/0165036 A1 * | 5/2020 | Squiers | ............... | A45C 7/0045 |
| 2021/0054963 A1 * | 2/2021 | Nguyen | ............... | F04B 53/22 |

\* cited by examiner

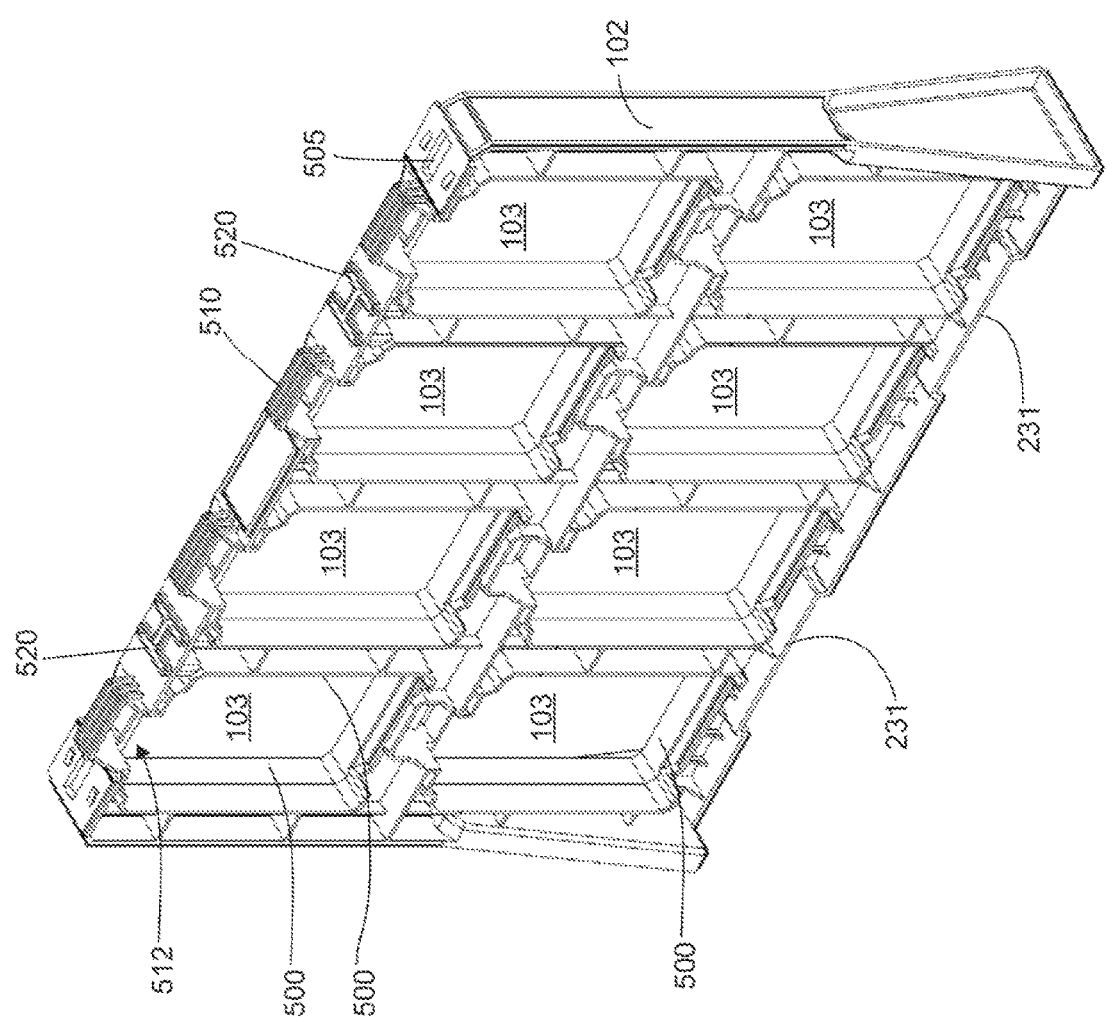

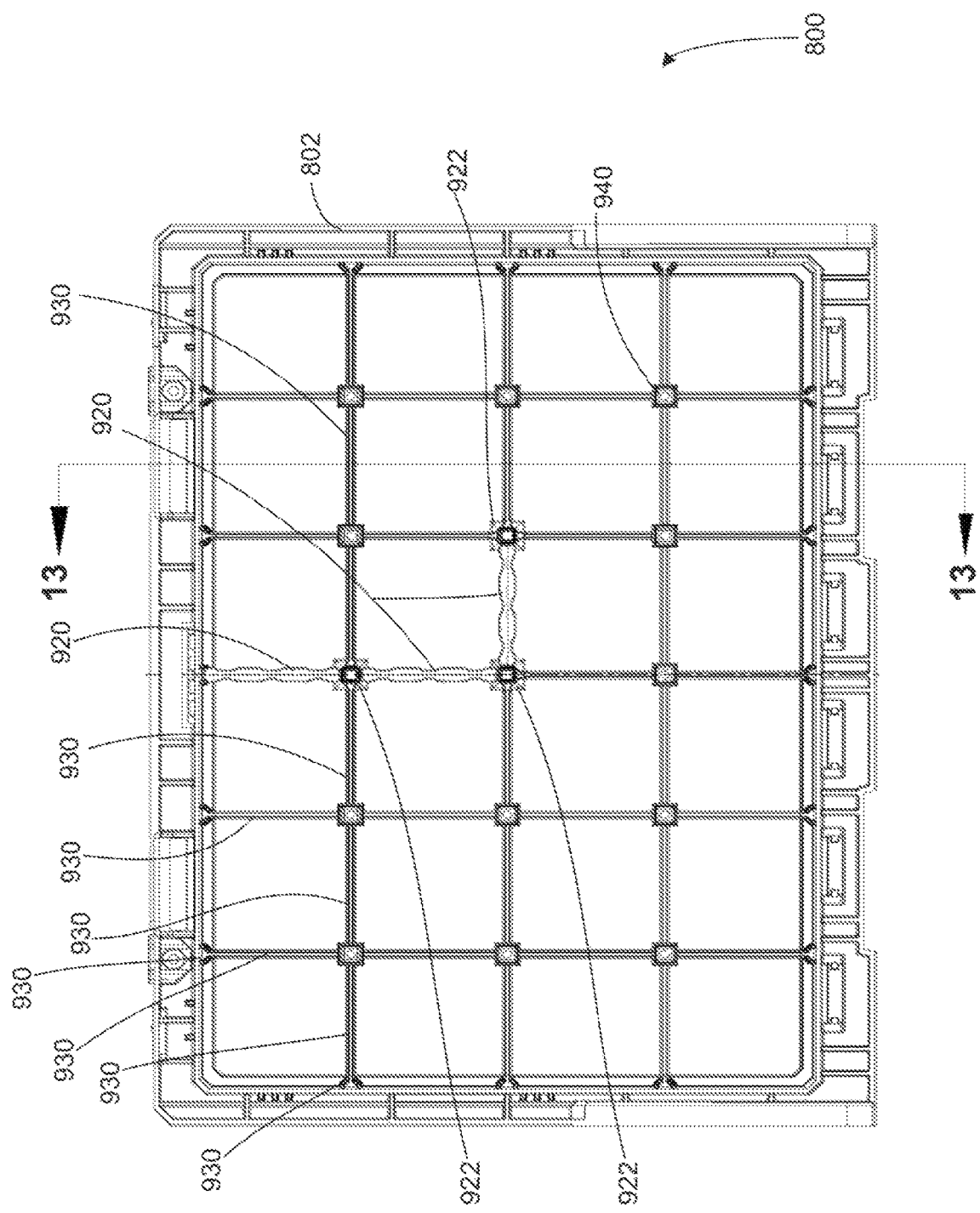

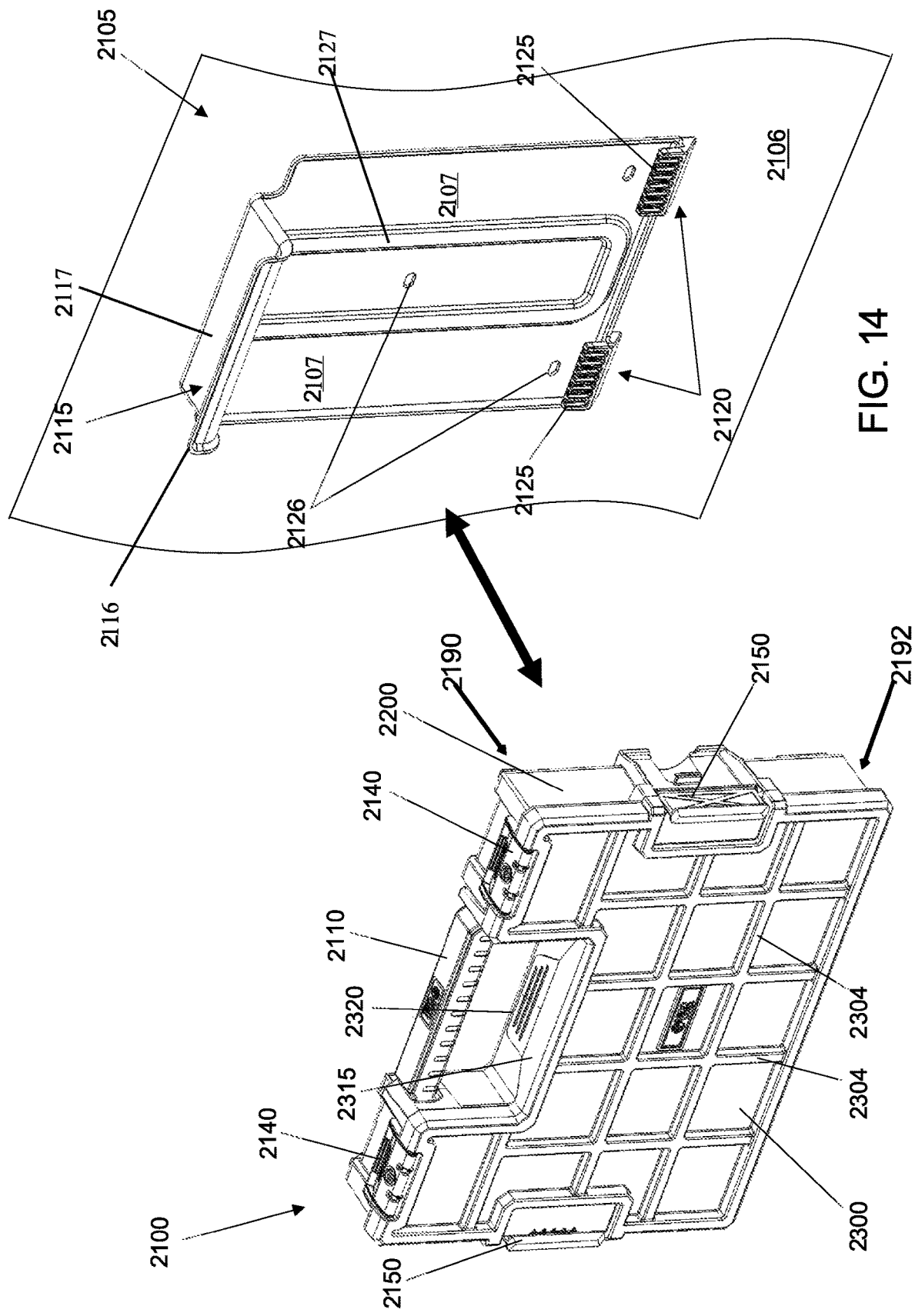

ORGANIZER AND WALL MOUNT FOR ORGANIZER

This application is a Divisional of, and claims priority to, U.S. Non-Provisional patent application Ser. No. 17/467,410, titled "Organizer and Wall Mount for Organizer," filed on Sep. 6, 2021, which is a Continuation-In-Part of, and claims priority to, U.S. Non-Provisional patent application Ser. No. 16/202,732, titled "Organizer and Wall Mount for Organizer," filed on Nov. 28, 2018, which is a Continuation-In-Part of and claimed priority to U.S. Non-Provisional patent application Ser. No. 16/051,439, titled "Organizer and Wall Mount for Organizer," filed on Jul. 31, 2018 and issued as U.S. Pat. No. 11,007,634 on May 18, 2021, which claimed priority to U.S. Provisional Patent Application Ser. No. 62/592,222 filed on Nov. 29, 2017 and U.S. Provisional Patent Application Ser. No. 62/630,177 filed on Feb. 13, 2018, the contents of each of which are incorporated herein by reference in their entirety; U.S. Non-Provisional patent application Ser. No. 17/467,410, titled "Organizer and Wall Mount for Organizer," filed on Sep. 6, 2021, for which the present application is a Divisional Application and from which the present application claims priority, is further a Continuation-In-Part of, and claims priority to, U.S. Non-Provisional patent application Ser. No. 17/157,675, titled "Organizer and Wall Mount for Organizer," filed on Jan. 25, 2021, which application is a Continuation of U.S. Non-Provisional patent application Ser. No. 16/202,033, titled "Organizer and Wall Mount for Organizer," filed on Nov. 27, 2018, which application is a Continuation-in-Part of U.S. Non-Provisional patent application Ser. No. 16/051,439, titled "Organizer and Wall Mount for Organizer," filed on Jul. 31, 2018, and which claims priority to U.S. Provisional Patent Application Ser. No. 62/592,222 filed on Nov. 29, 2017 and U.S. Provisional Patent Application Ser. No. 62/630,177 filed on Feb. 13, 2018, the contents of each of which are incorporated herein by reference in its entirety; this application is further a Continuation-in-Part of U.S. Design patent application Ser. No. 29/650,060, titled "Organizer System And Components Of Organizer System and filed on Jun. 4, 2018, a Continuation-in-Part of U.S. Design patent application Ser. No. 29/806,459, titled "Organizer System And Components Of Organizer System" and filed on Sep. 2, 2021, a Continuation-in-Part of U.S. Design patent application Ser. No. 29/647,006, titled "Organizer System And Components Of Organizer System" and filed on May 9, 2018, a Continuation-in-Part of U.S. Design patent application Ser. No. 29/806,462, titled "Organizer System And Components Of Organizer System" and filed on Sep. 2, 2021, a Continuation-in-Part of U.S. Design patent application Ser. No. 29/647,129, titled "Universal Wall Mount" and filed on May 19, 2018, a Continuation-in-Part of U.S. Design patent application Ser. No. 29/696,969, titled "Wall Mount" and filed on Jul. 2, 2019, a Continuation-in-Part of U.S. Design patent application Ser. No. 29/696,970, titled "Wall Mount" and filed on Jul. 2, 2019, a Continuation-in-Part of U.S. Design patent application Ser. No. 29/696,973, titled "Wall Mount" and filed on Jul. 2, 2019, and a Continuation-in-Part of U.S. Design patent application Ser. No. 29/696,974, titled "Wall Mount" and filed on Jul. 2, 2019, the contents of each of which design applications are incorporated herein by reference in their entirety.

This disclosure relates generally to an organizer, and, more particularly, to an organizer for tools, components, small parts and/or accessories.

BACKGROUND

Tools are typically housed in a toolbox drawer or tray which may include partitions to define subsections in which tools such as screwdrivers, socket wrenches, sockets and the like may be arranged. When selected tools are required for a task, the entire toolbox is typically moved to the worksite.

BRIEF DESCRIPTION OF THE DRAWINGS

FIG. 5 is a perspective illustration of an example frame of the first organizer of FIG. 1 and FIGS. 2A-2G constructed in accordance with teachings of this disclosure.

FIG. 12 is a front view of the third organizer of FIG. 9 with the movable door removed for clarity to show the example interior volume of the example third organizer in an example fourth configuration in accordance with teachings of this disclosure.

FIG. 14 is a perspective view of an example organizer, in accord with some aspects of the disclosure, disposed adjacent an example wall mount, in accord with some aspects of the disclosure, to which the example organizer is able to be selectively attached or selectively detached.

Figure 1:
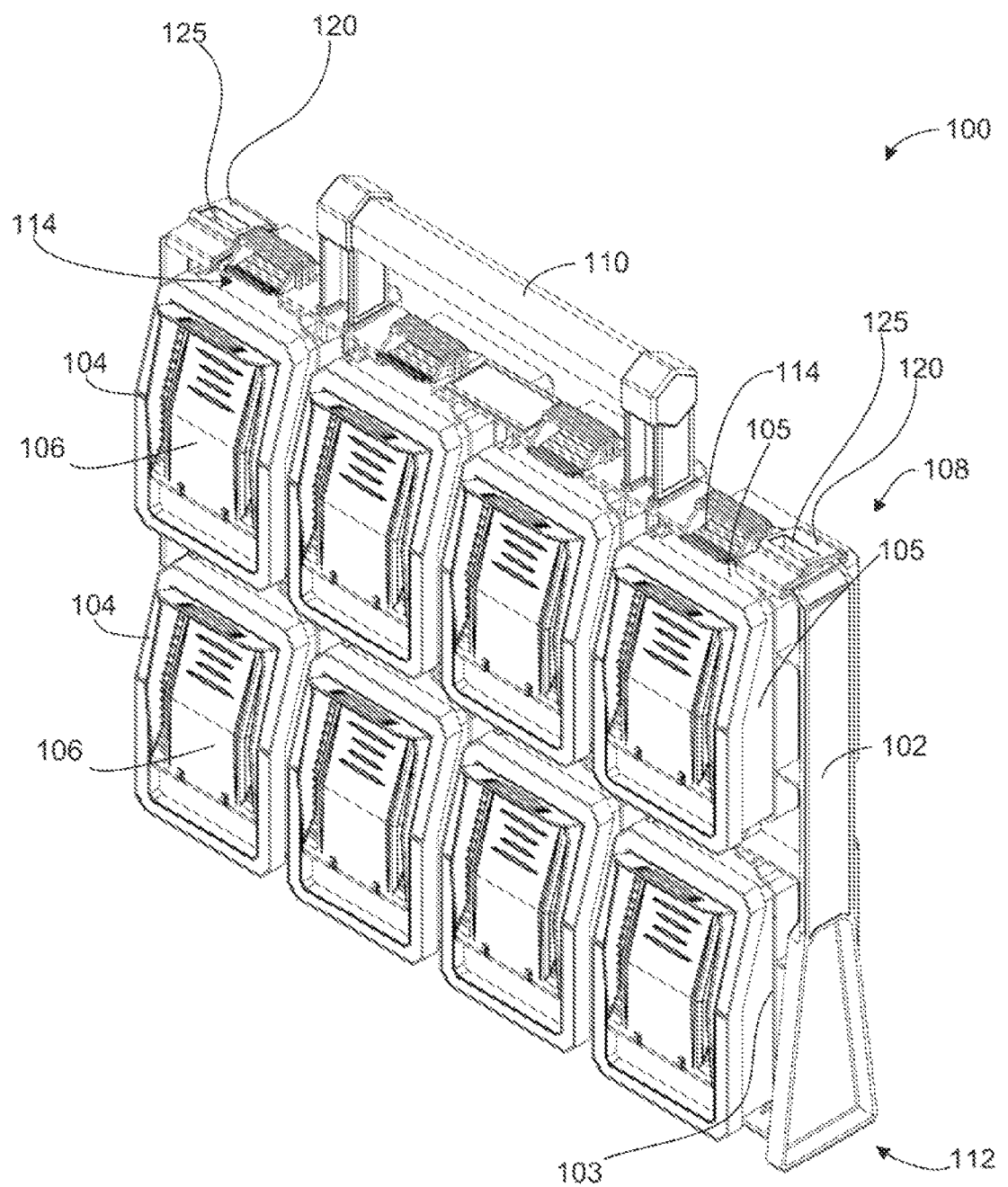
FIG. 1 is a perspective illustration of an example first organizer constructed in accordance with teachings of this disclosure.

The figures are not to scale. Wherever possible, the same reference numbers will be used throughout the drawing(s) and accompanying written description to refer to the same or like parts. As used in this patent, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

A worker at a job site is often required to make one or more trips out to their work truck parked outside of the job site to retrieve additional tools (a drill, a wrench, a screw driver, a socket wrench, etc.) or components, small parts and/or accessories (e.g., sockets, drill bits, electrical tape, twist-on wire couplers, nuts, bolts, washers, etc.) that were not present in the worker's already full toolbox. Generally, the toolbox includes many tools and/or components that are not required for the particular job at hand, but are nonetheless retained within the toolbox for simplicity.

FIG. 1 is a perspective illustration of an example first organizer 100. The first organizer 100 includes an example frame 102 defining a plurality of example openings 103 to receive a corresponding plurality of example cups 104. Each of the cups 104 includes example walls 105 and an example movable door 106. The walls 105 define an interior volume and an opening to the interior volume. The movable door 106 is constructed to move between an open position in which the interior volume is accessible via the opening and a closed position in which the opening is occluded by the movable door 106. In FIG. 1, each movable door 106 for each cup 104 is shown in the closed position.

In the first organizer 100 of FIG. 1, the plurality of example openings 103 defined by the frame 102 includes an array of openings 103 to receive the cups 104. In the example shown, an example upper portion 108 of the frame 102 includes or defines a first array of openings 103 (e.g., a 2×1 array, a 3×1 array, a 4×1 array, etc.) and includes or defines an example handle 110. An example lower portion 112 of the frame 102 defines a second array of openings 103 (e.g., a 2×1 array, a 3×1 array, a 4×1 array, etc.). The frame 102 further includes an example latch 114 adjacent each of the openings 103. The latch 114 is to engage a corresponding connector (not shown in FIG. 1) included on an exterior portion of the cup 104, when the cup 104 is positioned within the respective opening 103, to secure the cup 104 to the frame 102.

At the upper portion 108 of the frame 102 is an example adapter 120 including an example opening 125. In some examples, the adapter 120 is formed as a part of the frame 102. In some examples, the adapter 120 is a separate part that is fixed to the frame 102 or is removably attached thereto. In some examples, the adapter 120 facilitates attachment of the frame 102 to a wall mount bracket as described below.

In some examples, the frame 102, the cups 104, the movable doors 106, the handle 110, the latches 114 and/or the adapters 120 are formed from a plastic (e.g., a Polyethylene Terephthalate (PET), a High Density Polyethylene (HDPE), a Polyvinyl Chloride (PVC), a Low Density Polyethylene (LDPE), a Polypropylene (PP), a Polystyrene (PS), a Polyoxymethylene (POM), etc.) and/or a metal or a metal alloy (e.g., aluminum, steel, etc.).

Figure 2A:
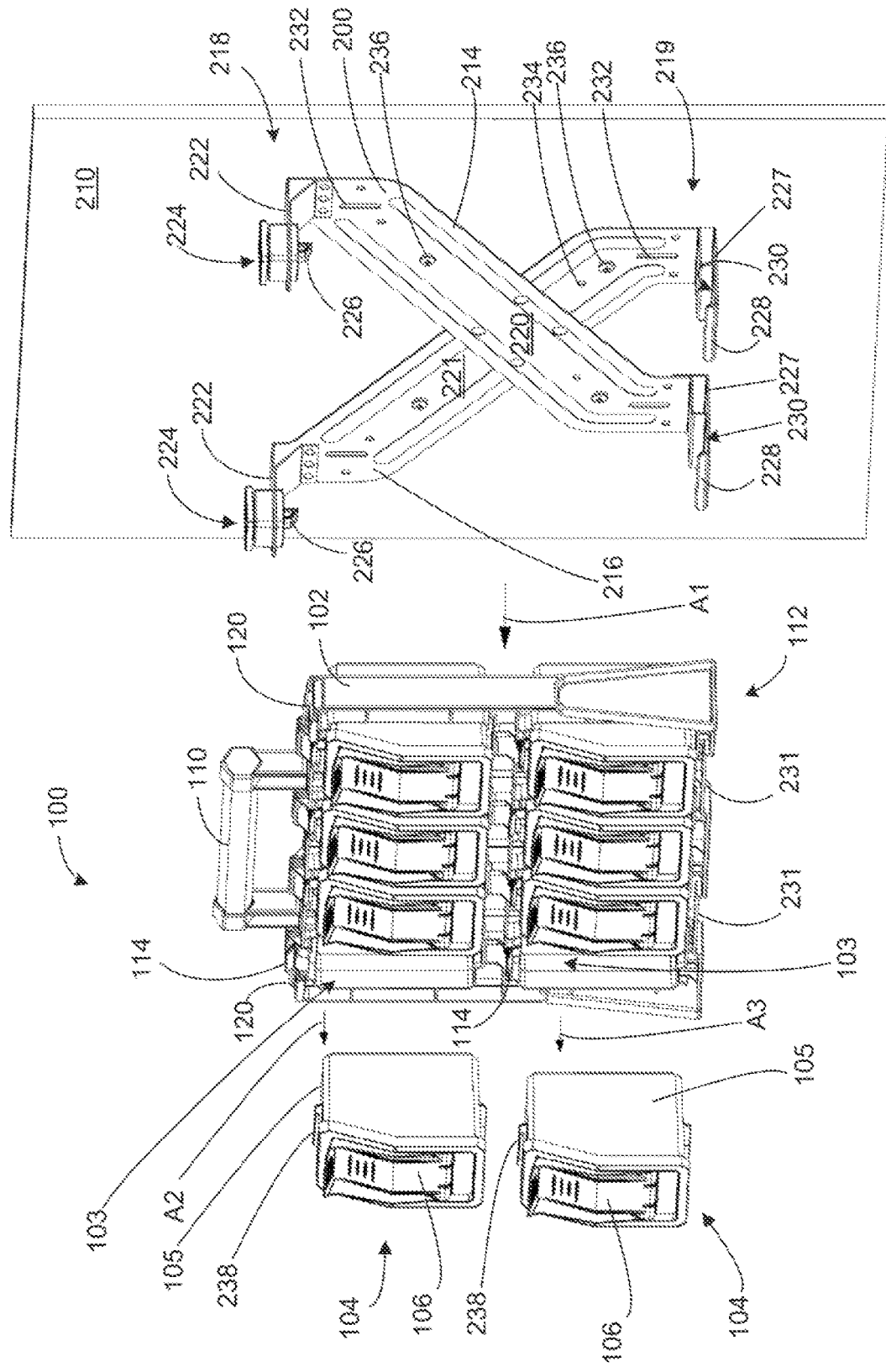
FIG. 2A is an exploded perspective illustration of the first organizer of FIG. 1 showing example removable cups and showing an example wall mount bracket in accordance with teachings of this disclosure.

FIG. 2A is an exploded perspective illustration of the first organizer 100 of FIG. 1, showing the first organizer 100 in relation to an example wall mount bracket 200 attached to an example wall 210, with the example arrow A1 indicating an example removal of the first organizer 100 from the wall mount bracket 200. FIG. 2A also shows two cups 104 removed from corresponding openings 103 of the first organizer 100, as represented by the arrows A2 and A3, respectively. To illustrate, the two cups 104 that are shown to be removed in FIG. 2A may be replaced by two different cups 104 (not shown) containing two different types of components, small parts and/or accessories (e.g., sockets, drill bits, electrical tape, twist-on wire couplers, nuts, bolts, washers, etc.) that are deemed necessary by a worker for a particular job. In some examples, a worker's truck includes all components, small parts and/or accessories (e.g., sockets, drill bits, electrical tape, twist-on wire couplers, nuts, bolts, washers, etc.) in cups 104 disposed in one or more racks which include a frame defining openings to receive the cups 104. In some examples, the rack(s) are a larger version of the frame 102.

The wall mount bracket 200 of FIG. 2A includes an example first section 214 attached to, or integrally formed with, an example second section 216. In some examples, wall mount bracket 200, the first section 214 of the wall mount bracket 200 and/or the second section 216 of the wall mount bracket 200 are formed from a plastic (e.g., PET, HDPE, PVC, LDPE, PP, PS, POM, etc.) and/or a metal or a metal alloy (e.g., aluminum, steel, etc.). In the example form factor depicted, the first section 214 and the second section 216 form a generally X-shaped wall mount bracket 200. In other examples, the wall mount bracket 200 includes a rectangular frame dimensioned to receive the frame 102 of the first organizer 100. In some examples, the wall mount bracket 200 includes an upper section and a lower section that are separate from one another (e.g., a substantially parallel upper bracket and lower bracket each separately mounted to the wall 210, etc.).

The example wall mount bracket 200 includes an example upper portion 218 and an example lower portion 219. In some examples, the first section 214 includes an example base 220 constructed to attach to the wall 210 and/or to the second section 216 and the second section 216 includes an example base 221 constructed to attach to the wall 210 and/or to the first section 214. The upper portion 218 of the wall mount bracket 200 includes an example first pair of arms 222 extending outwardly from the base 220 and the base 221. In some examples, the first pair of arms 222 extends outwardly, from proximal ends at the base 220 and the base 221, substantially perpendicular to the base 220 and the base 221 (plus or minus 1 degree, plus or minus 2 degrees, plus or minus 3 degrees, etc.). At distal ends of the first pair of arms 222 are quick release connectors 224 having movable pins 226 to engage the adapter 120 and/or the opening 125 of the adapter 120 and releasably secure the frame 102 via engagement of the connectors (e.g., movable pins 226 engaging the opening 125 of the adapter 120, etc.). For example, the movable pins 226 are constructed to fit within the opening 125 of the adapter 120. In some examples, the movable pins 226 are spring-loaded with springs biasing the movable pins 226 in a downward direction to facilitate connection of the movable pins 226 to the adapter 120 and/or the opening 125 of the adapter 120.

In another example, the example first pair of arms 222 extending outwardly from the base 220 and the base 221, or more generally extending outwardly from the upper portion 218 of the example wall mount bracket 200 or a wall mount of another configuration, are cantilevered and configured to move slightly upwardly responsive to force being applied to the first pair of arms 222, or the like, by the tool box upon insertion of a tool box into the wall mount bracket. Upon full insertion of the tool box, and positioning of a corresponding feature or features (e.g., female connectors, depressions, latch members, etc.) of the tool box adjacent matingly dimensioned and positioned feature(s) on the first pair of arms 222 (e.g., male connector members, pins, ridges, latch members, etc.), the example first pair of arms 222 would then move downwardly to engage a corresponding upper portion or portions of the toolbox. In some examples, the example wall mount comprises a single centrally-positioned arm comprising one or more features to engage a tool box. In some examples, the example wall mount comprises a plurality of spaced-apart arms, each of the plurality of spaced-apart arms comprising one or more features to engage a tool box.

The lower portion 219 of the wall mount bracket 200 includes an example second pair of arms 227 extending outwardly from the base 220 and the base 221. In some examples, the second pair of arms 227 extends outwardly from the base 220 and the base 221 substantially perpendicular to the base (plus or minus 1 degree, plus or minus 2 degrees, plus or minus 3 degrees, etc.). In some examples, the second pair of arms 227 extends outwardly, from proximal ends at the base 220 and the base 221, substantially perpendicular to the base 220 and the base 221 (plus or minus 1 degree, plus or minus 2 degrees, plus or minus 3 degrees, etc.). At distal ends of the second pair of arms 227 are provided example lateral retainers 228 and example supports 230 dimensioned to engage corresponding example features 231 (e.g., a recessed portion, etc.) at the lower portion 112 of the frame 102. In the example shown in FIG. 2A, the supports 230 take the form of substantially flat sections of the second pair of arms 227 that are received within the features 231, with the lateral retainers 228 extending beyond the features 231 to engage a front portion of the frame 102. In some examples, the lateral retainers 228 curve upwardly to engage a front portion of the frame 102 and prevent movement of the lower portion 112 of the first organizer 100 away from the base 220 and the base 221 of the wall mount bracket 200. Likewise, the movable pins 226 engage the adapters 120 and/or the openings 125 of the adapters 120 at the upper portion 108 of the frame 102 to prevent movement of the upper portion 108 of the first organizer 100 away from the base 220 and the base 221 of the wall mount bracket 200 during such engagement.

In some examples, the movable pins 226 are constructed to fit within the openings 125 of the adapters 120. In some examples, the quick release connectors 224 are spring-loaded to bias the movable pins 226 (e.g., in a downward direction, etc.) to facilitate automatic connection of the movable pins 226 to the adapter 120 and/or the opening 125 of the adapter 120 once the example first organizer 100 is properly positioned within the wall mount bracket 200 to thereby releasably secure the frame 102 to the wall mount bracket 200 via engagement of the connectors (e.g., movable pins 226 engaging the opening 125 of the adapter 120, etc.).

In some examples, to facilitate positioning of the wall mount bracket 200 on the wall 210 and/or to ease installation, the first section 214 and/or the second section 216 include one or more through example slots 232, in one or more portions of the first section 214 and/or the second section 216, through which an example fastener (not shown) may be disposed to secure to the wall 210. The slots 232, which are shown as example vertical slots, facilitate alignment of fasteners at different points along an axis of the slots 232. In some examples, to facilitate mounting of the wall mount bracket 200 to the wall 210, the first section 214 and/or the second section 216 include one or more example through holes 234, in one or more portions of the first section 214 and/or the second section 216, through which an example fastener 236 may be disposed to secure to the wall 210.

FIG. 2A shows example connectors 238 included on an exterior portion of the cups 104. When the cups 104 are positioned within a respective opening 103, the cup 104 is secured to the frame 102 via an engagement of the latch 114 adjacent the opening 103 and the connector 238 of the cup. In some examples, the connector 238 includes a rib extending upwardly from an upper surface of the cup 104.

To illustrate attachment of the first organizer 100 to the wall mount bracket 200, the lower portion 112 of the frame 102 of the first organizer 100 is positioned so that the features 231 are aligned with the second pair of arms 227 so that the features 231 engage (e.g., rest upon, etc.) the supports 230. With the lower portion 112 of the frame 102 positioned in the supports 230, the upper portion 108 of the frame 102 is pivoted toward the wall mount bracket 200, whereupon the adapters 120 engage the pins 226 to bias the pins 226 upwardly into the quick release connectors 224 until the openings 125 are positioned below the pins 226, at which point the pins 226 will be biased (e.g., by spring force or force of another resilient member, etc.) into the openings 125, thereby locking the upper portion 108 of the frame 102 into the wall mount bracket 200. To reverse the process and remove the first organizer 100 from the wall mount bracket 200, an upper portion of the quick release connectors 224 are moved upwardly to correspondingly move the pins 226 upwardly until the pins 226 clear the openings 125, enabling movement of the upper portion 108 of the frame 102 away from the wall mount bracket 200. The first organizer 100 may then be lifted away from the wall mount bracket 200 to disengage the features 231 at the lower portion 112 of the frame 102 from the second pair of arms 227.

Figure 2B:
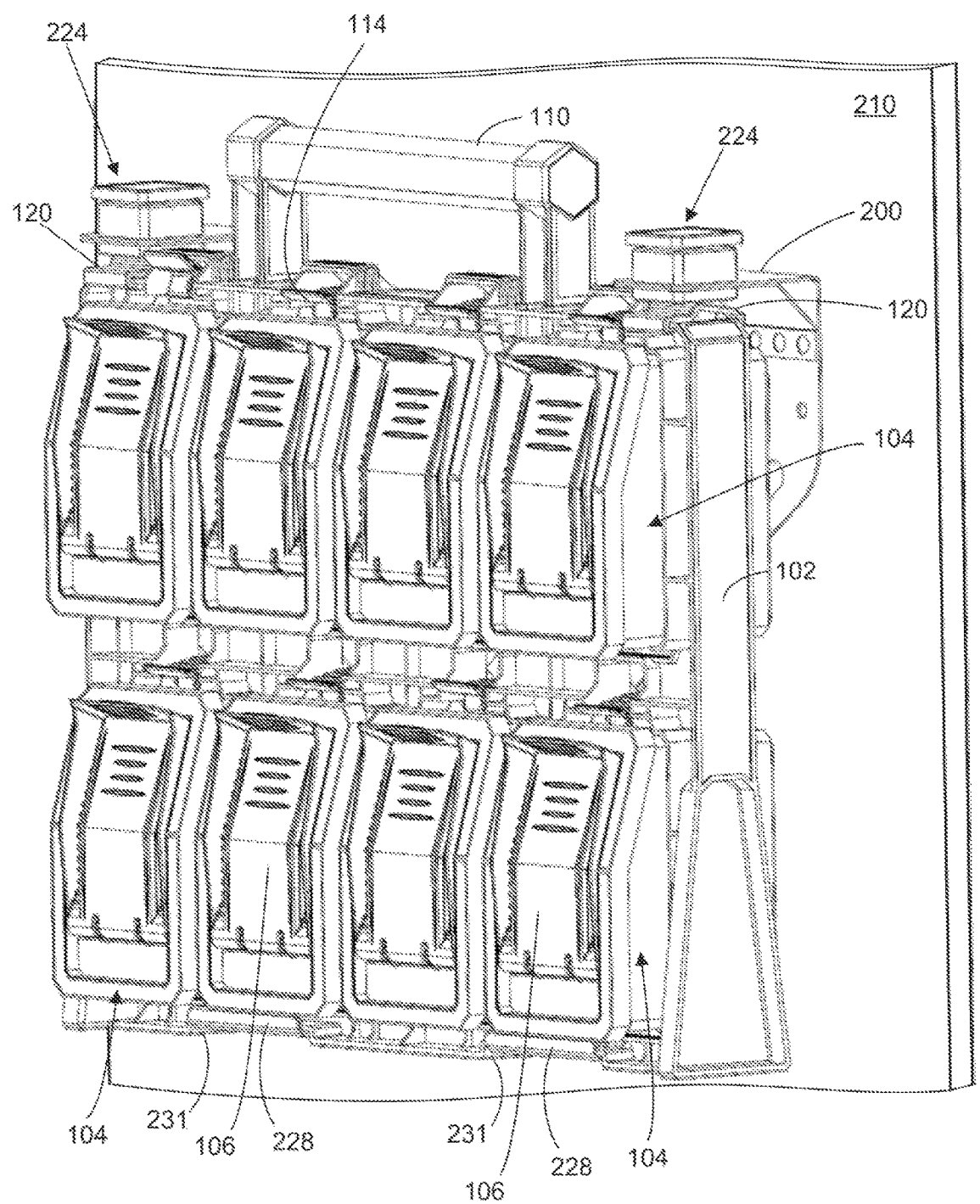
FIG. 2B is a perspective illustration of the first organizer of FIG. 1 removably attached to the wall mount bracket of FIG. 2A in accordance with teachings of this disclosure.

FIG. 2B is a perspective illustration of the first organizer 100 of FIG. 1 and FIG. 2A removably attached to the wall mount bracket 200 of FIG. 2A. As shown in FIG. 2B, the frame 102 is positioned so that the features 231 are aligned with the second pair of arms 227 and engage the supports 230 with the lateral retainers 228 extending beyond the features 231 to engage a front portion of the frame 102. The adapters 120 are engaged by the pins 226 of the quick release connectors 224, which locks the upper portion of the frame 102 into the wall mount bracket 200. In some examples, FIG. 2B represent a portion of a wall 210 of a work van and the first organizer 100 is positioned on the wall mount bracket 200 for transport. In some examples, FIG. 2B represents a portion of a wall 210 of a home, garage or workshop.

Figure 2C:
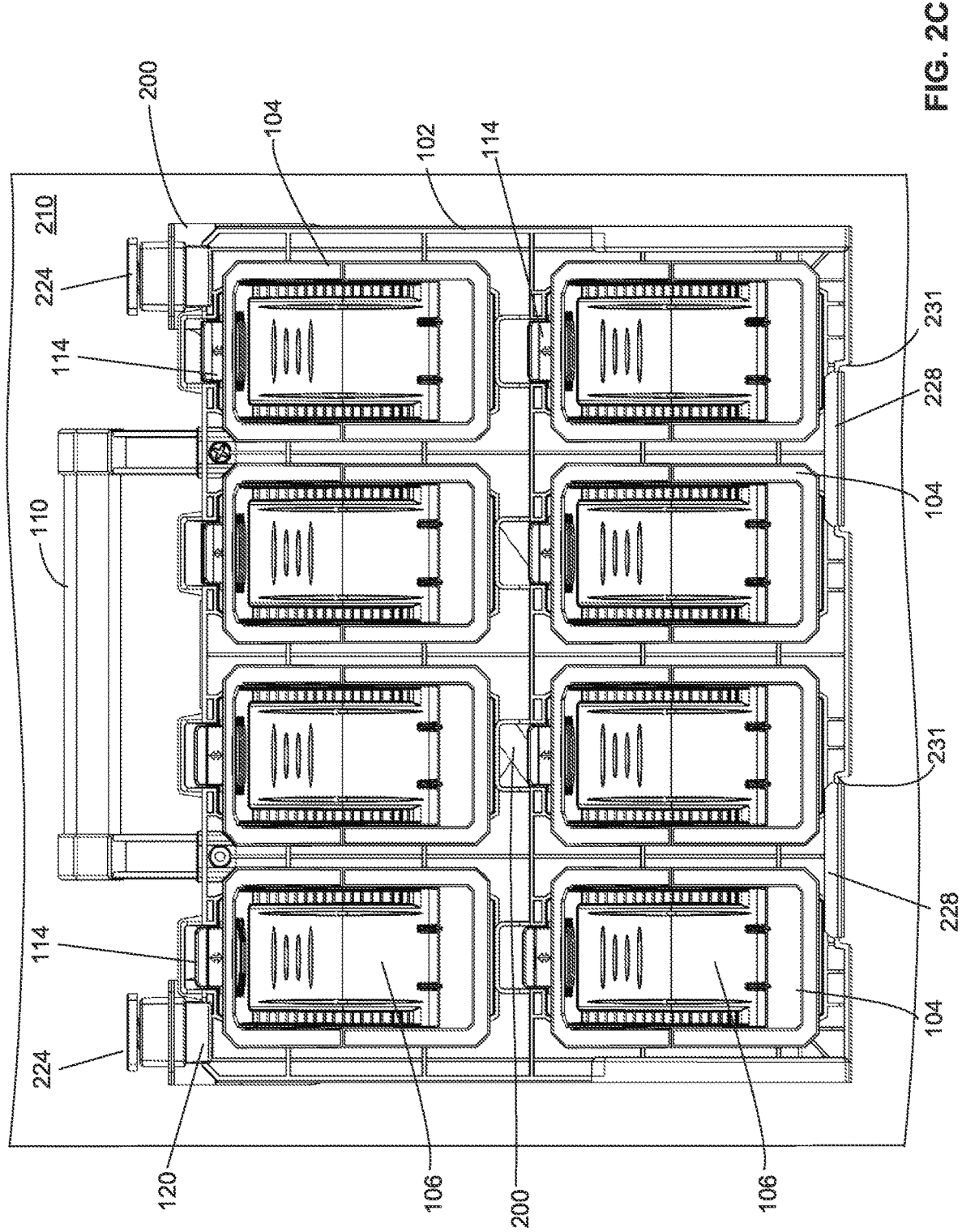
FIG. 2C is a front view of the first organizer of FIG. 1 and FIGS. 2A-2B removably attached to the wall mount bracket of FIGS. 2A-2B in accordance with teachings of this disclosure.

FIG. 2C is a front view of the first organizer 100 of FIG. 1 and FIGS. 2A-2B removably attached to the wall mount bracket 200 of FIGS. 2A-2B. FIG. 2C shows engagement of the frame 102 by the lateral retainers 228 at a lower portion of the first organizer 100 and engagement of the adapters 120 of the frame 102 by the quick release connectors 224 at an upper portion of the first organizer 100.

Figure 2D:
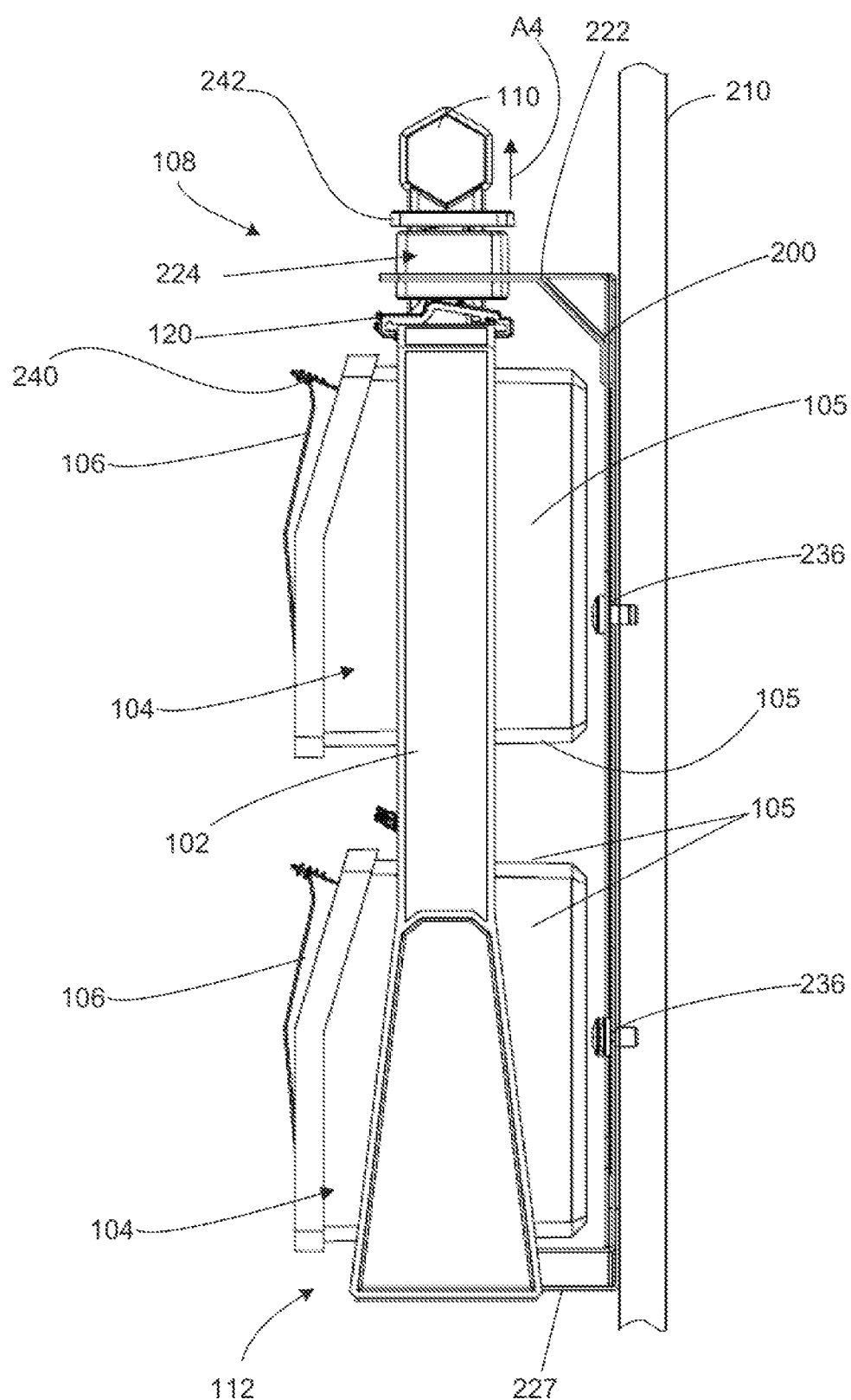
FIG. 2D is a side view of the first organizer of FIG. 1 and FIGS. 2A-2C removably attached to the wall mount bracket of FIGS. 2A-2C in accordance with teachings of this disclosure.

FIG. 2D is a side view of the first organizer 100 of FIG. 1 and FIGS. 2A-2B removably attached to the wall mount bracket 200 of FIGS. 2A-2C. The side view of FIG. 2D shows, for example, the upper portion 108 of the frame 102 and the adapter 120 in relation to the quick release connector 224 and the lower portion 112 of the frame 102 to an arm of the second pair of arms 227. The wall mount bracket 200 is shown to be secured to the wall 210 via fasteners 236 (e.g., screws, etc.) positioned in slots 232 and/or through holes 234. The quick release connector 224 is shown to include an example actuator 242 that may be moved upwardly in the direction of the example arrow A4 to pull the pin 226 of the quick release connector 224 out of engagement with the opening 125 of the adapter 120 to release the frame 102 of the first organizer 100 from the quick release connector 224. FIG. 2D also shows an example handle 240 of the movable door 106.

Figure 2E:
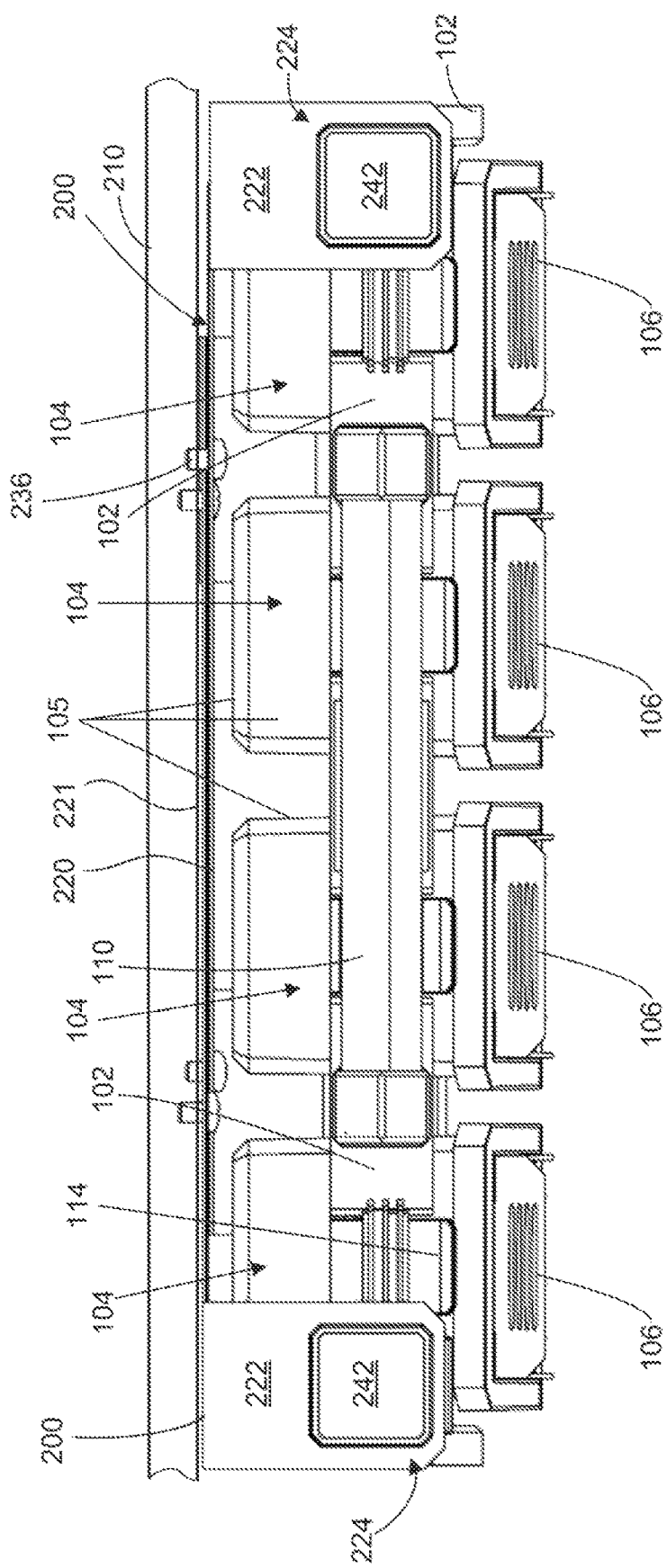
FIG. 2E is a top view of the first organizer of FIG. 1 and FIGS. 2A-2D removably attached to the wall mount bracket of FIGS. 2A-2D in accordance with teachings of this disclosure.

FIG. 2E is a top view of the first organizer 100 of FIG. 1 and FIGS. 2A-2D removably attached to the wall mount bracket 200 of FIGS. 2A-2D. The cups 104 are disposed in the frame 102 and are secured in place relative to the frame 102 via the latches 114, which engage corresponding connectors (not shown) on an exterior upper portion of the cup 104. FIG. 2E shows the first pair of arms 222 extending outwardly from the base 220 and the base 221, with the quick release connectors 224 provided at the distal ends of the first pair of arms 222. The wall mount bracket 200 is shown to be secured to the wall 210 via fasteners 236 (e.g., screws, etc.) positioned in the slots 232 and/or the through holes 234 (not shown).

Figure 2F:
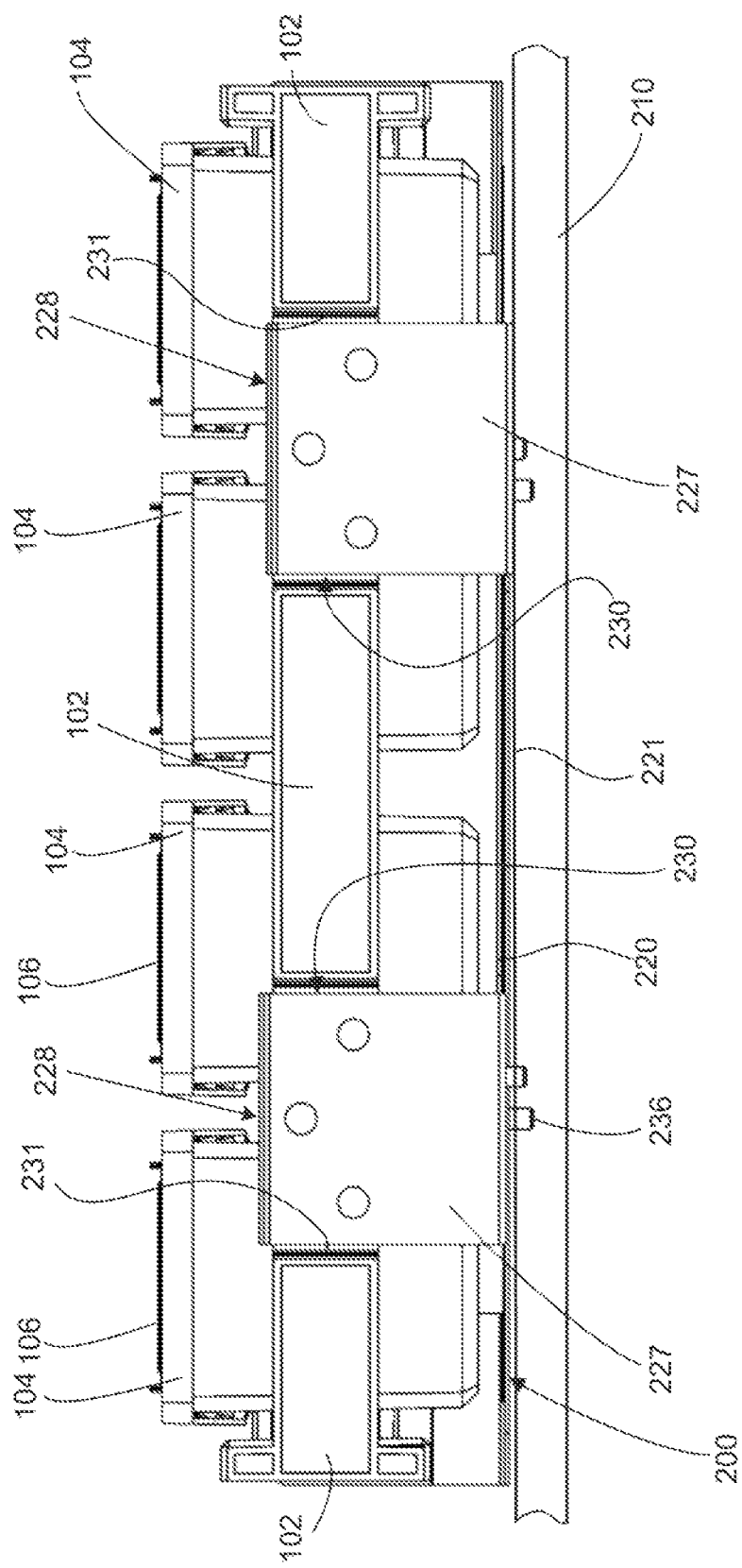
FIG. 2F is a bottom view of the first organizer of FIG. 1 and FIGS. 2A-2E removably attached to the wall mount bracket of FIGS. 2A-2E in accordance with teachings of this disclosure.

FIG. 2F is a bottom view of the first organizer 100 of FIG. 1 and FIGS. 2A-2E removably attached to the wall mount bracket 200 of FIGS. 2A-2E. The second pair of arms 227 are shown to extend outwardly from the base 220 and the base 221 relative to the wall 210 to terminate, at distal ends of the second pair of arms 227, with the lateral retainers 228. The supports 230 of the second pair of arms 227 engage corresponding features 231 of the frame 102 to prevent movement of the lower portion 112 of the first organizer 100 relative to the base 220 and the base 221 of the wall mount bracket 200.

Figure 2G:
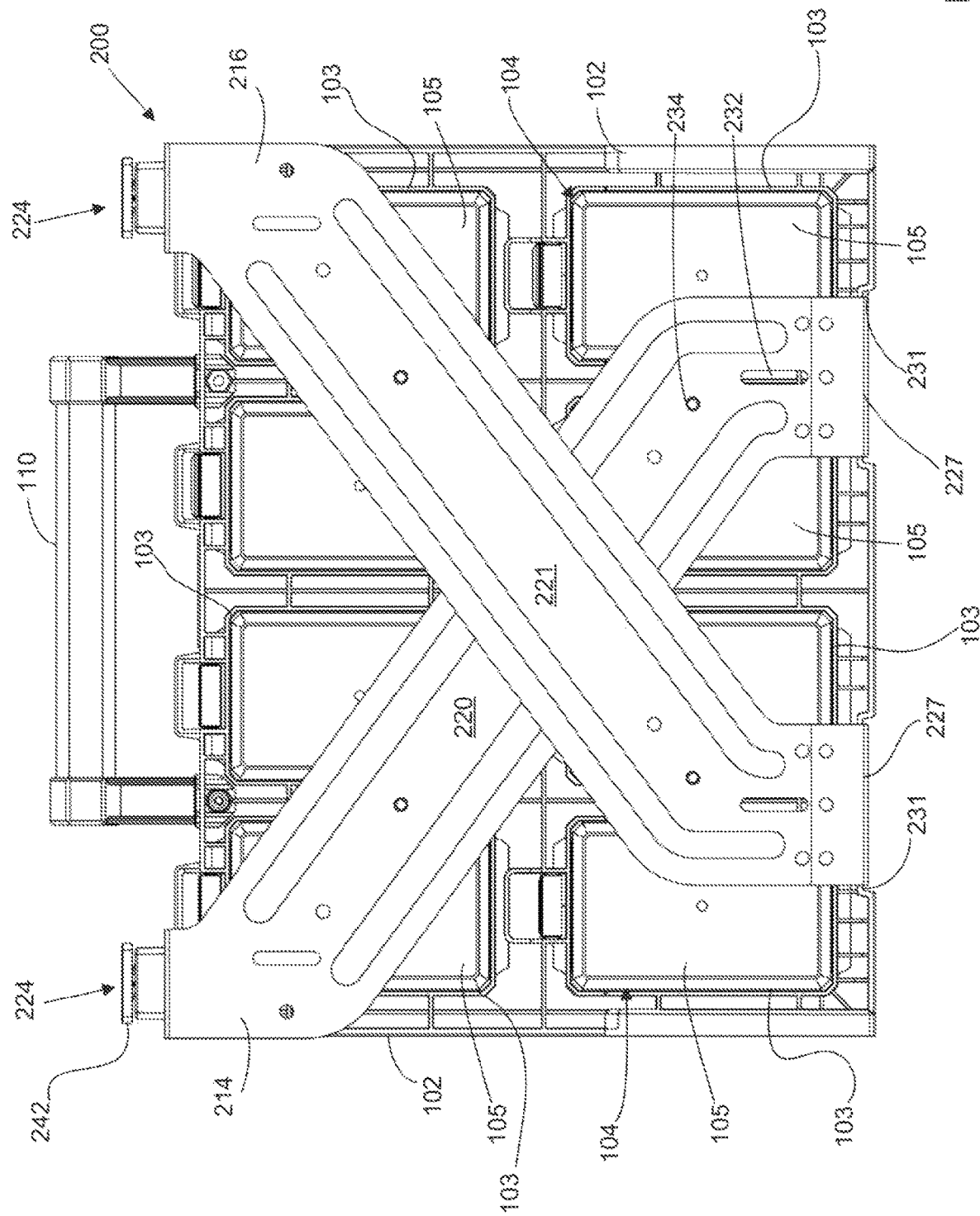
FIG. 2G is a rear view of the first organizer of FIG. 1 and FIGS. 2A-2F removably attached to the wall mount bracket of FIGS. 2A-2F, with the example wall removed for clarity, in accordance with teachings of this disclosure.

FIG. 2G is a rear view of the first organizer 100 of FIG. 1 and FIGS. 2A-2F removably attached to the wall mount bracket 200 of FIGS. 2A-2F, with the wall 210 removed for clarity. FIG. 2G shows the first section 214 and the second section 216 of the wall mount bracket 200, as well as the slots 232 and through holes 234 by which the wall mount bracket 200 may be mounted to the wall. In some examples, the wall mount bracket 200 may omit the example slots 232 and through holes 234 in favor or an adhesive connection between the wall mount bracket 200 and the wall. FIG. 2G also shows the openings 103 defined by the frame 102 to receive the cups 104.

In some examples, the wall mount bracket 200 is omitted and the first organizer 100 is mounted to the wall via a bracket or hanger that engages the handle 110 or other feature of the frame 102. For instance, the first organizer 100 may be placed in or attached to a hanger hook or a clamp mounted to the wall.

Figure 3A:
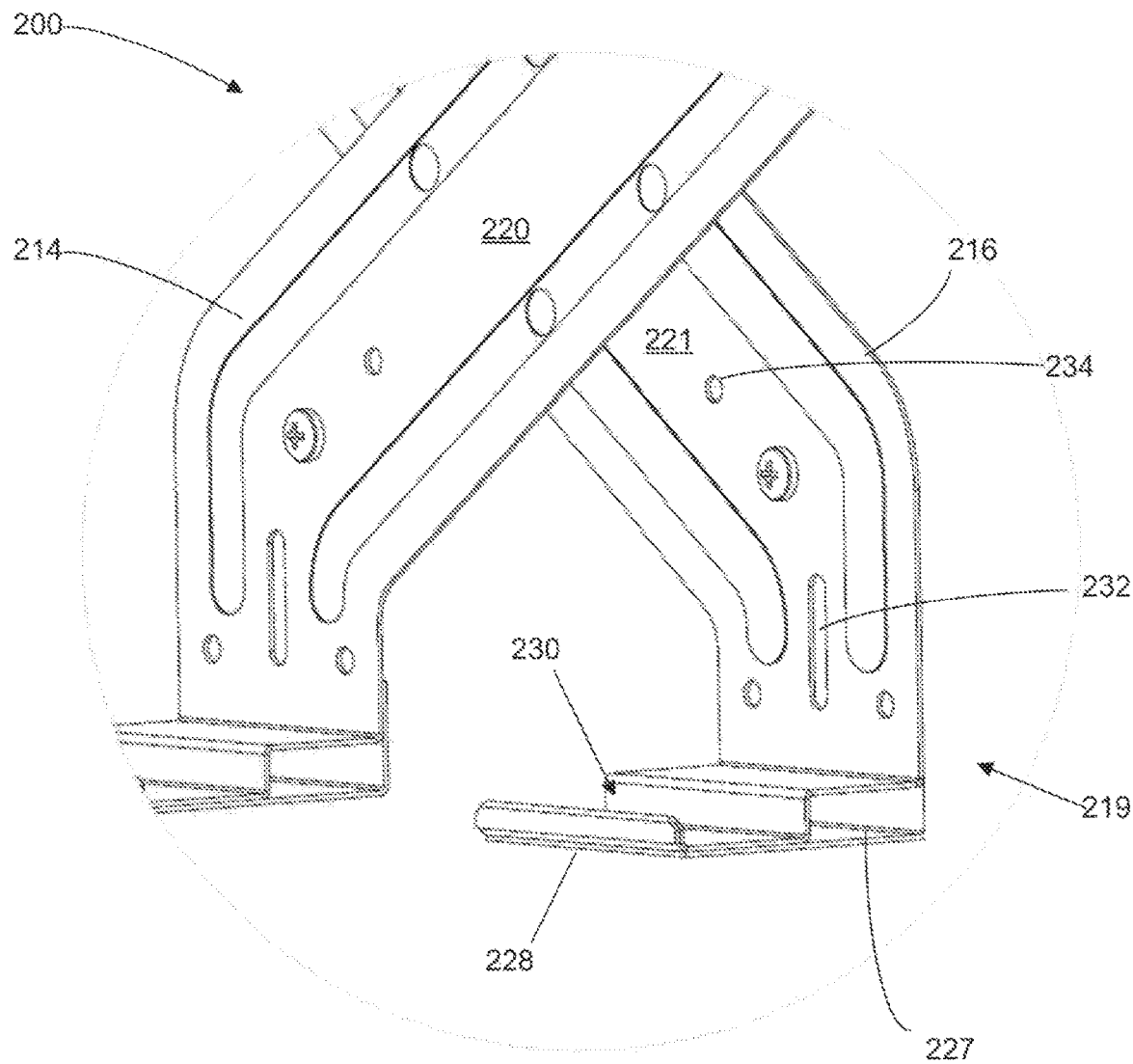
FIG. 3A is a perspective illustration of a lower portion of the wall mount bracket of FIGS. 2A-2G in accordance with teachings of this disclosure.
Figure 3C:
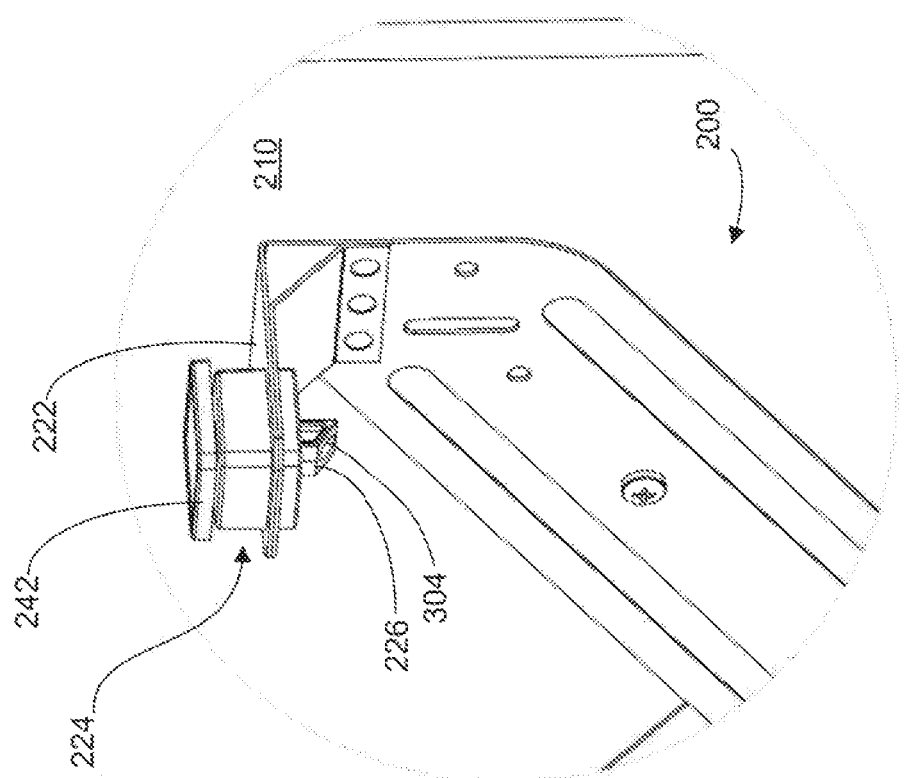
FIG. 3C is a perspective illustration of an example quick release connector at an example upper portion of the wall mount bracket of FIGS. 2A-2G in accordance with teachings of this disclosure.

FIG. 3A is a perspective illustration of a lower portion of the wall mount bracket 200 of FIGS. 2A-2G showing portions of the first section 214 and the second section 216 and showing an example configuration of the second pair of arms 227 extending outwardly from the base 220 of the first section 214 and the base 221 of the second section 216. The distal end of the arm 227 extending outwardly from the base 221 shows the lateral retainer 228 curving upwardly to a position where the lateral retainer 228 can engage a front portion of the frame 102 to prevent movement of the lower portion 112 of the first organizer 100 forward relative to the support 230. In some examples, the support 230 takes the form of a slot formed within the arm 227. In some examples, the lateral retainer 228 takes the form of one or more protuberances or male members disposed not at the distal end of the arm 227, but rather at the support 230, to extend upwardly relative to the support 230 to engage a corresponding recess or recesses formed in the features 231 at the lower portion 112 of the frame 102.

Figure 3B:
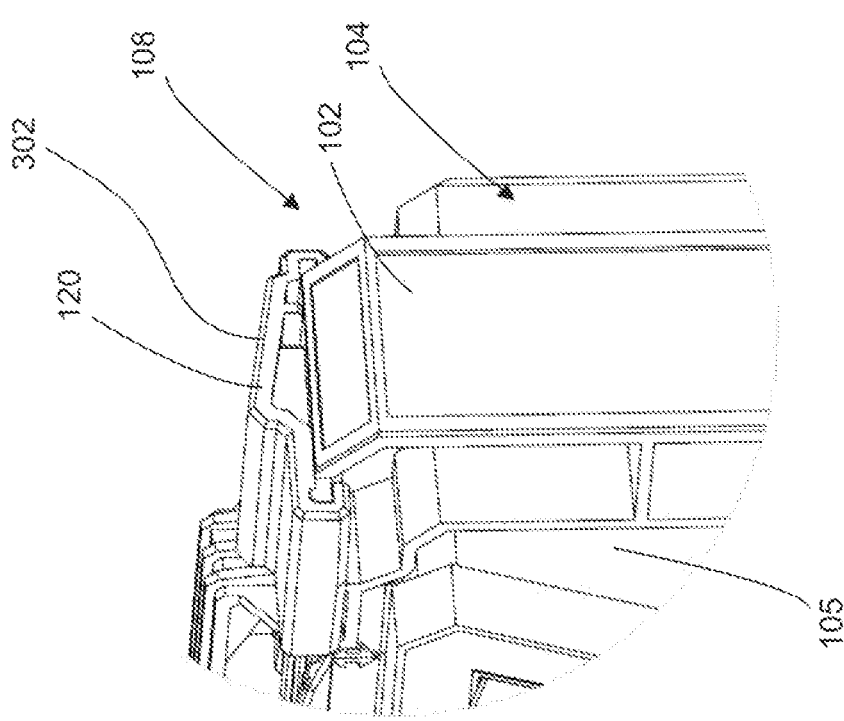
FIG. 3B is a perspective illustration of an upper portion of an example frame for the first organizer of FIG. 1 and FIGS. 2A-2G in accordance with teachings of this disclosure.

FIG. 3B is a perspective illustration of the upper portion 108 of the frame 102 of the first organizer 100 of FIG. 1 and FIGS. 2A-2G and FIG. 3C is a perspective illustration of the quick release connector 224 at the upper portion of the wall mount bracket 200 of FIGS. 2A-2G. The adapter 120 of FIG. 3B is shown to have an example sloped surface 302 generally corresponding to a sloped surface 304 of pin 226. As the adapter 120 is brought into contact with the pin 226 during mounting of the first organizer 100 in the wall mount bracket 200, the pin 226 slides against the sloped surface 302 and is biased upwardly against a spring force biasing the pin 226 downwardly. When the pin 226 encounters the opening 125 in the adapter 120, the pin 226 then springs into the opening 125 to lock the frame 102 relative to the quick release connector 224 and the wall mount bracket 200. The actuator 242 of the quick release connector 224 can be moved upwardly to move the pin 226 out of engagement with the opening 125 in the adapter 120 to enable movement of the frame 102 relative to the quick release connector 224 and the wall mount bracket 200.

Figure 3D:
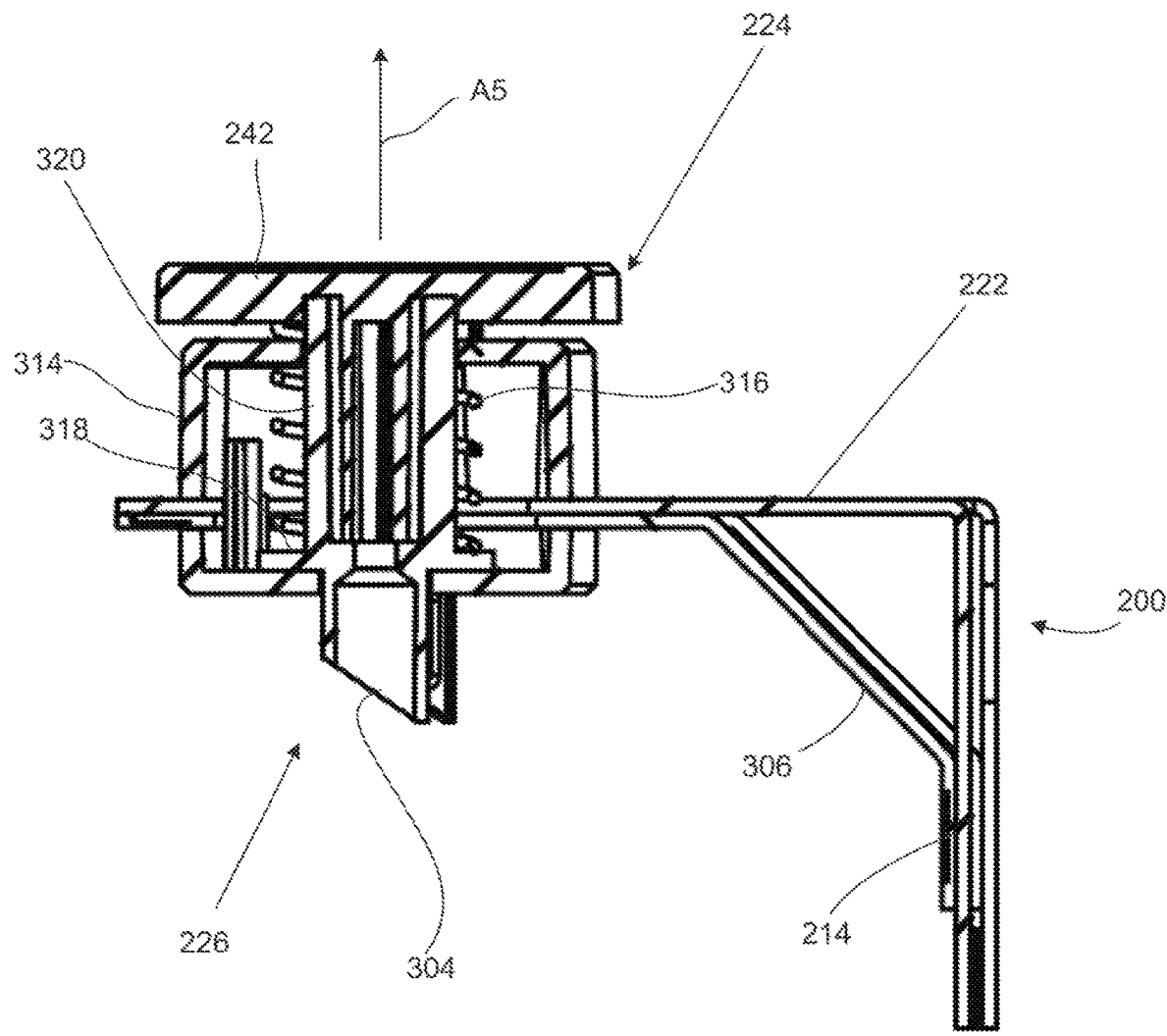
FIG. 3D is a cut-away side view of the example quick release connector of FIG. 3C in accordance with teachings of this disclosure.

FIG. 3D is a cut-away side view of the quick release connector 224 of FIGS. 2A-2G and FIG. 3C. In some examples, an example support 306 is used to support the arm 222 and maintain an angular relation between the arm 222 and the first section 214 of the wall mount bracket 200. FIG. 3D shows the sloped surface 302 of the pin 226. The quick release connector 224 includes an example housing 314 integrated with or attached to the arm 222. An example resilient element 316 (e.g., a spring, etc.) is disposed within the housing 314 to engage an example boss 318 of the pin 226 at a first end and to engage an interior surface of the housing 314 at a second end to bias the pin 226 downwardly into the depicted position. An example body 320 of the pin 226 extends upwardly through the housing 314 to connect to the actuator 242. When the actuator 242 is displaced upwardly in the direction of the example arrow A5, the boss 318 of the pin 226 compresses the resilient element 316 and the pin 226 moves upwardly within the housing 314. When the force on the actuator 242 is released, the resilient element 316 releases its stored energy and biases the boss 318 and the pin 226 downwardly until the boss 318 encounters surfaces of the housing 314 the prevent further movement of the pin 226.

Figure 3E:
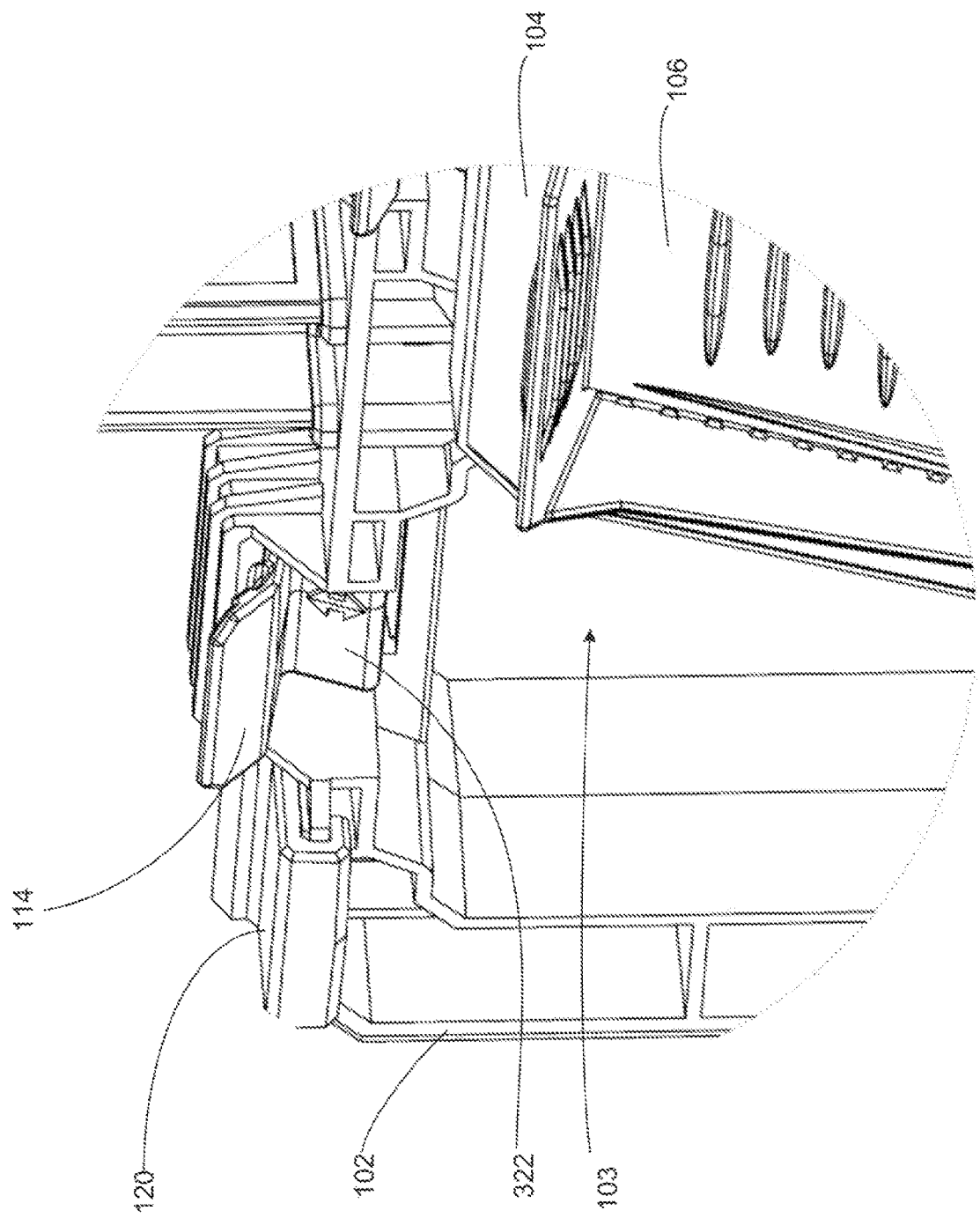
FIG. 3E is a perspective illustration of an example connector to connect the example cup of FIG. 1 to the example frame of the example first organizer of FIG. 1 and FIGS. 2A-2G in accordance with teachings of this disclosure.

FIG. 3E is a perspective illustration of an example latch 114 to connect the example cup 104 of FIG. 1 and FIGS. 2A-2G to the frame 102 of the first organizer 100 of FIG. 1 and FIGS. 2A-2G. In some examples, the latch 114 includes an example latch 322 downwardly depending therefrom. In some examples, the latch 114 is rotatable relative to the frame 102 and is attached to a hinge or is rotatably attached to a pin. As shown, the latch 114 is in a raised position, wherein the latch element 322 is positioned so as to enable removal of the cup 104 from the opening 103. Following positioning of a cup 104 within the opening 103, the latch 114 is rotated downwardly to move the latch element 322 into engagement with the connector 238 on the cup 104 inserted into the opening 103. For instance, the latch element 322 is biased against the connector 238 as the latch 114 is rotated downwardly. Correspondingly, to enable removal of a cup 104 from the opening 103 of the frame 102, the latch 114 is rotated upwardly to move the latch element 322 out of engagement with the connector 238 on the exterior portion of the cup 104.

Figure 4B:
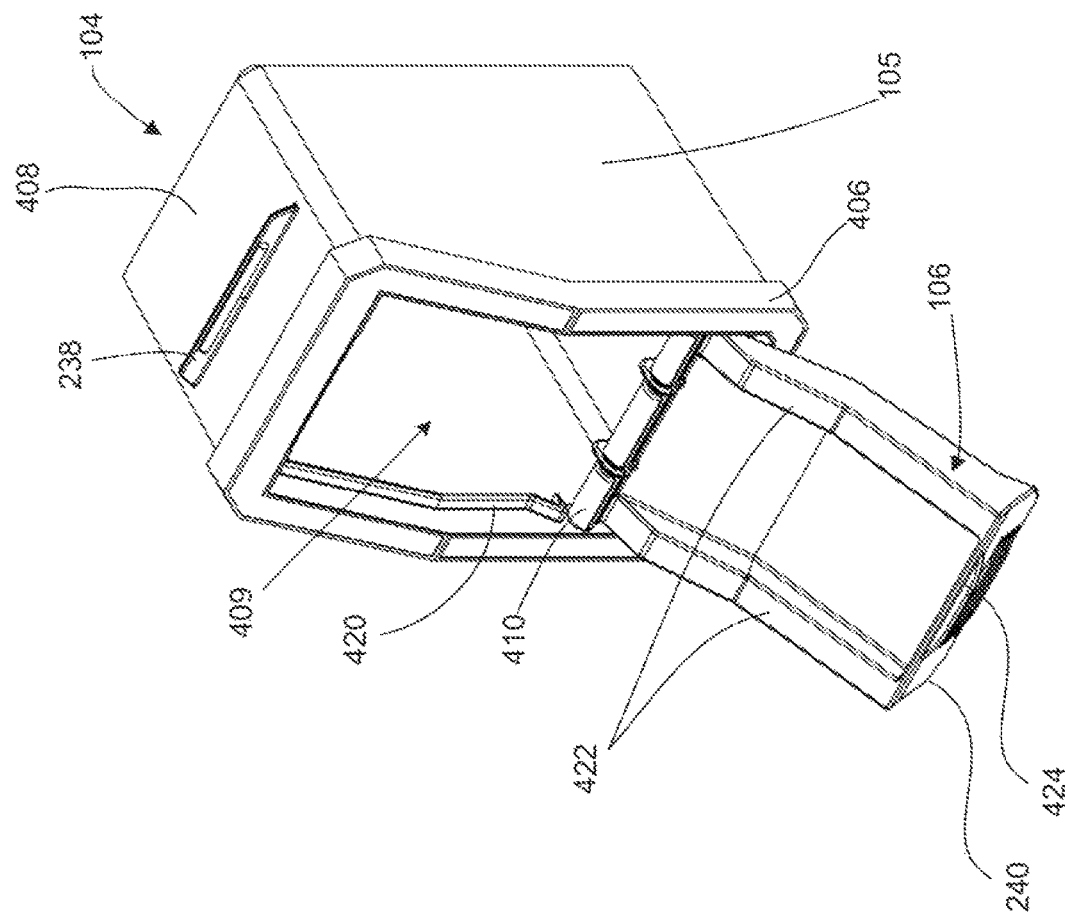
FIGS. 4A-4B are perspective illustrations of the example cup of FIG. 1 and FIGS. 2A-2G with an example movable door in a closed position and an open position, respectively, in accordance with teachings of this disclosure.
Figure 4A:
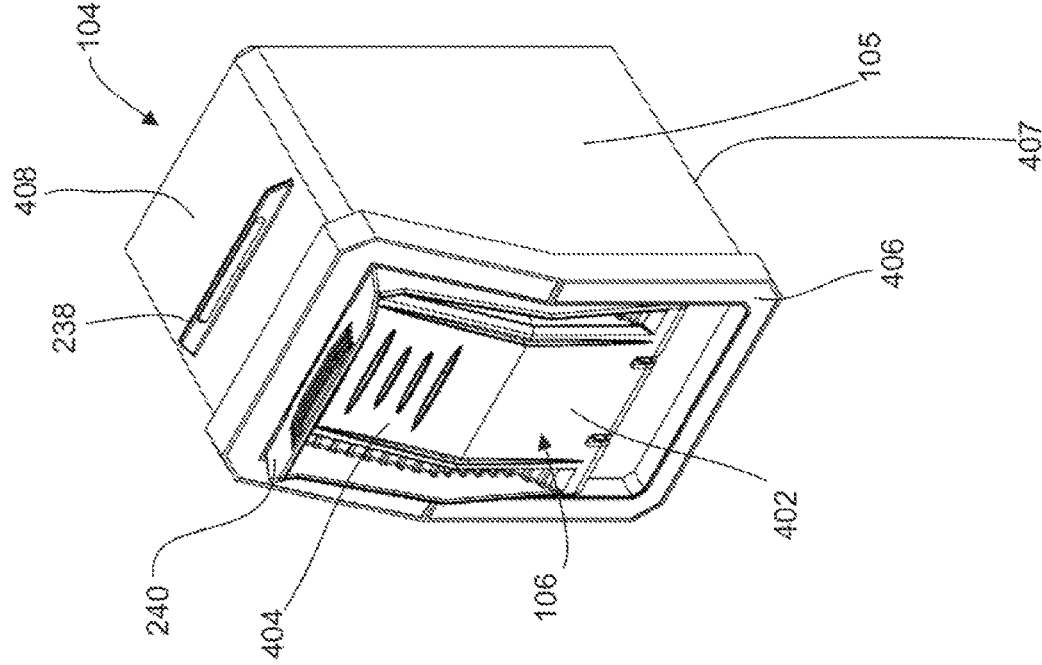

FIGS. 4A-4B are perspective illustrations of the example cup 104 of FIG. 1 and FIGS. 2A-2G. FIG. 4A shows the movable door 106 of the cup 104 in a closed position and FIG. 4B shows the movable door 106 of the cup 104 an open position. In some examples, the movable door 106 includes an example lower portion 402 and an example upper portion 404 arranged at an angle relative to one another. For instance, as shown in FIG. 4A, the upper portion 404 is angled rearwardly (e.g., toward a rear of the cup 104) relative to the lower portion 402 to generally match a shape of an example bezel 406 of the cup 104 and a shape of the cup 104. The cup 104 is shown to have an example lower portion 407 that is larger (e.g., deeper, longer, etc.) that an example upper portion 408. In this configuration, the cup 104 is stable when removed from the frame 102 and disposed on a surface, such as a work table or counter. Additionally, the example interior volume 409 of the cup 104, shown in part in FIG. 4B, has a larger cross-sectional area in the lower portion 407 as compared to that of the upper portion 408. Consequently, when the interior volume 409 is filled with components, small parts and/or accessories, for example, a center of gravity of the filled or partially-filled cup 104 is below a middle of a height of the cup 104, which contributes to stability of the cup 104 when removed from the frame 102. In some examples, a bottom portion of the bezel 406 is flush with the lower portion 407 of the cup 104 so that the bottom surface of the cup 104 is substantially planar. In some examples, the lower portion 407 of the cup 104 includes a connector, a rib, a stand, or a male member or protuberance that extends downwardly by a height generally corresponding to that of a height of the bezel 406 from the bottom surface of the cup 104 to provide one or more additional points of contact on the bottom surface of the cup 104.

FIG. 4B shows an example hinge 410 about which the movable door 106 rotates. FIG. 4B shows a portion of an example interior stop 420 of the cup 104 that engages one or more example features 422 of the movable door 106 to stop movement of the movable door 106 in the closing direction. In the example of FIG. 4B, the features 422 include raised areas structured to matingly engage the stop 420 at one or more areas. In some examples, the features 422 are to matingly engage the stop 420 along a periphery of the interior volume so as to provide a generally sealing engagement therebetween. In some examples, the features 422 and/or the stop 420 includes a gasket or resilient element to facilitate formation of a seal along the periphery of the interior volume. In some examples, the movable door 106 includes an example protrusion 424 to serve as a snap-fit connector to engage with a corresponding recess in the bezel 406 to lock the movable door 106 in place. In some examples, the movable door 106 or the bezel 406 includes a latch to lock the movable door 106 in place. In some examples, the movable door 106 frictionally engages the bezel 406 to provide resistance to movement of the movable door 106 along a portion of a range of angular movement of the movable door 106 (e.g., along the first 5°-10° of movement of the movable door in the opening direction, etc.) or along an entire range of angular movement of the movable door 106.

Figure 4D:
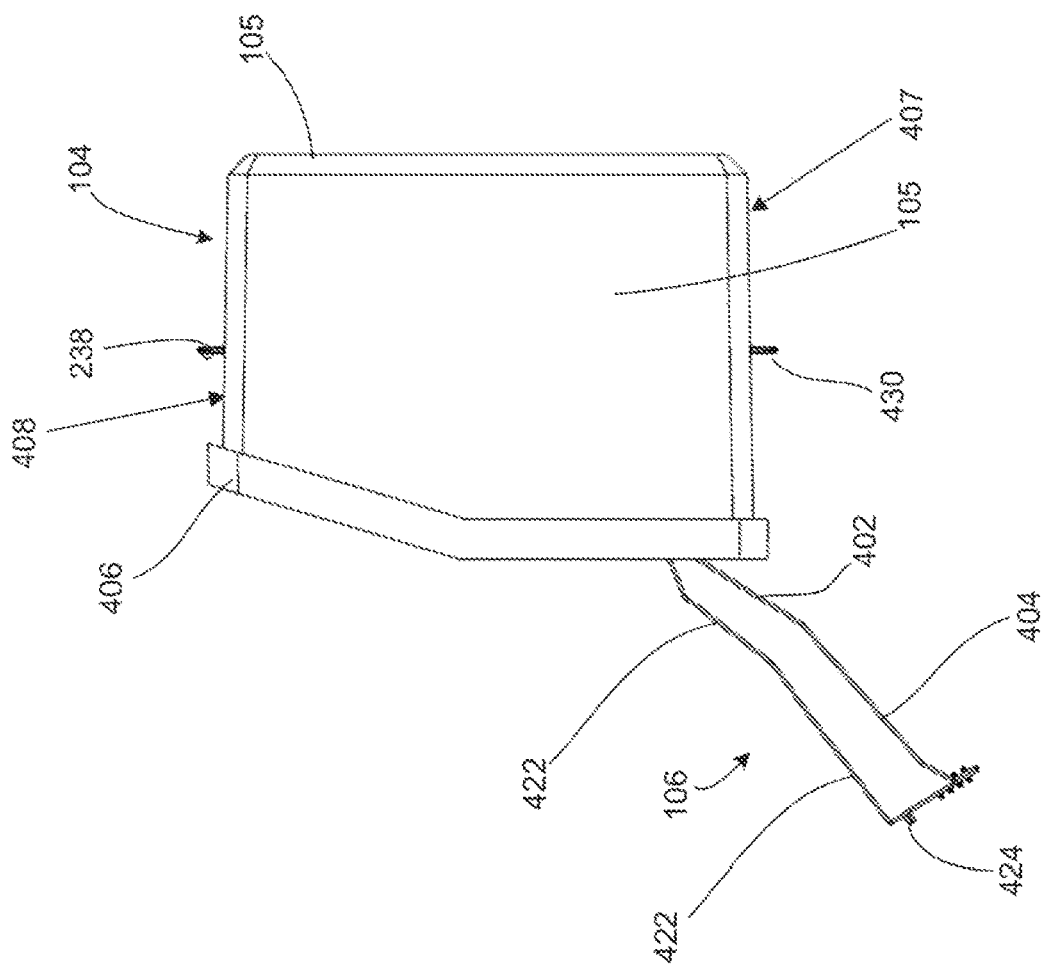
FIGS. 4C-4D are side views of the example cup of FIGS. 4A-4B with the example movable door in the closed position and the open position, respectively, in accordance with teachings of this disclosure.
Figure 4C:
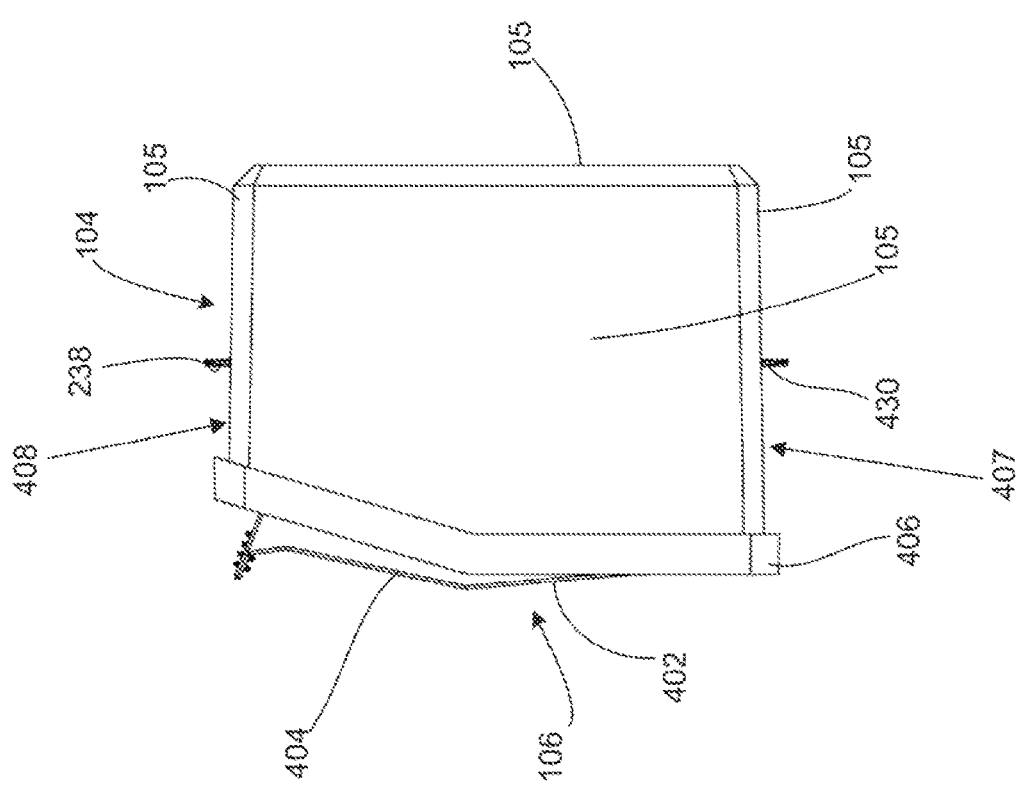

FIGS. 4C-4D are example side views of the example cup 104 of FIG. 1, FIGS. 2A-2G and FIGS. 4A-4B. FIG. 4C shows the movable door 106 of the cup 104 in a closed position and FIG. 4D shows the movable door 106 of the cup 104 an open position. In some examples, the movable door 106 includes an example lower portion 402 and an example upper portion 404 arranged at an angle relative to one another. For instance, as shown in FIG. 4C, the upper portion 404 is angled rearwardly (e.g., toward a rear of the cup 104) relative to the lower portion 402 to generally match a shape of the bezel 406 of the cup 104 and a shape of the cup 104. FIG. 4C shows the lower portion 407 of the cup 104 is larger (e.g., deeper, longer, etc.) that the upper portion 408. As noted above, this configuration facilitates stability of the cup 104 when the cup 104 is removed from the frame 102 and disposed on a surface. In the example of FIGS. 4C-4D, the lower portion 407 of the cup 104 includes an example feature 430 (e.g., a connector, a rib, a stand, a male member or protuberance, etc.) that extends downwardly at a height generally corresponding to that of a height of the bezel 406 from the bottom surface of the cup 104 to provide an additional line of contact between the cup 104 and a surface upon which the cup 104 rests. FIG. 4D the movable door 106 rotated into an open position and shows the features 422, which are to matingly engage the stop 420 of the cup 104 at one or more areas.

FIG. 5 is a perspective illustration of an example frame 102 of the first organizer 100 of FIG. 1 and FIGS. 2A-2G. The frame 102 defines, vian example walls 500, a plurality of openings 103 that are to removably receive cups 104 therein. In some examples, the walls 500 define a plurality of uniform openings 103. In some examples, the walls 500 define a plurality of openings 103 of which at least one opening 103 is dissimilar in shape and/or size than another of the openings 103 to receive therein a cup 104 that is dissimilar in shape and/or size than another of the cups 104. FIG. 5 also shows the frame 102 to define example enclosures 510 within which the latches 114 are disposed. In some examples, the enclosures 510 serve to protect the latches 114, so as to reduce a potential for an inadvertent contact with, and delatching of, a latch 114 and serve to provide a reinforcement to the frame 102 around example openings 512 formed to receive the latches 114. FIG. 5 also shows example slots 520 to receive the handle 110. In some examples, the handle 110 and/or vertical arms of the handle 110 are integrally formed with the frame 102 and the slots 520 are omitted.

Figure 6A:
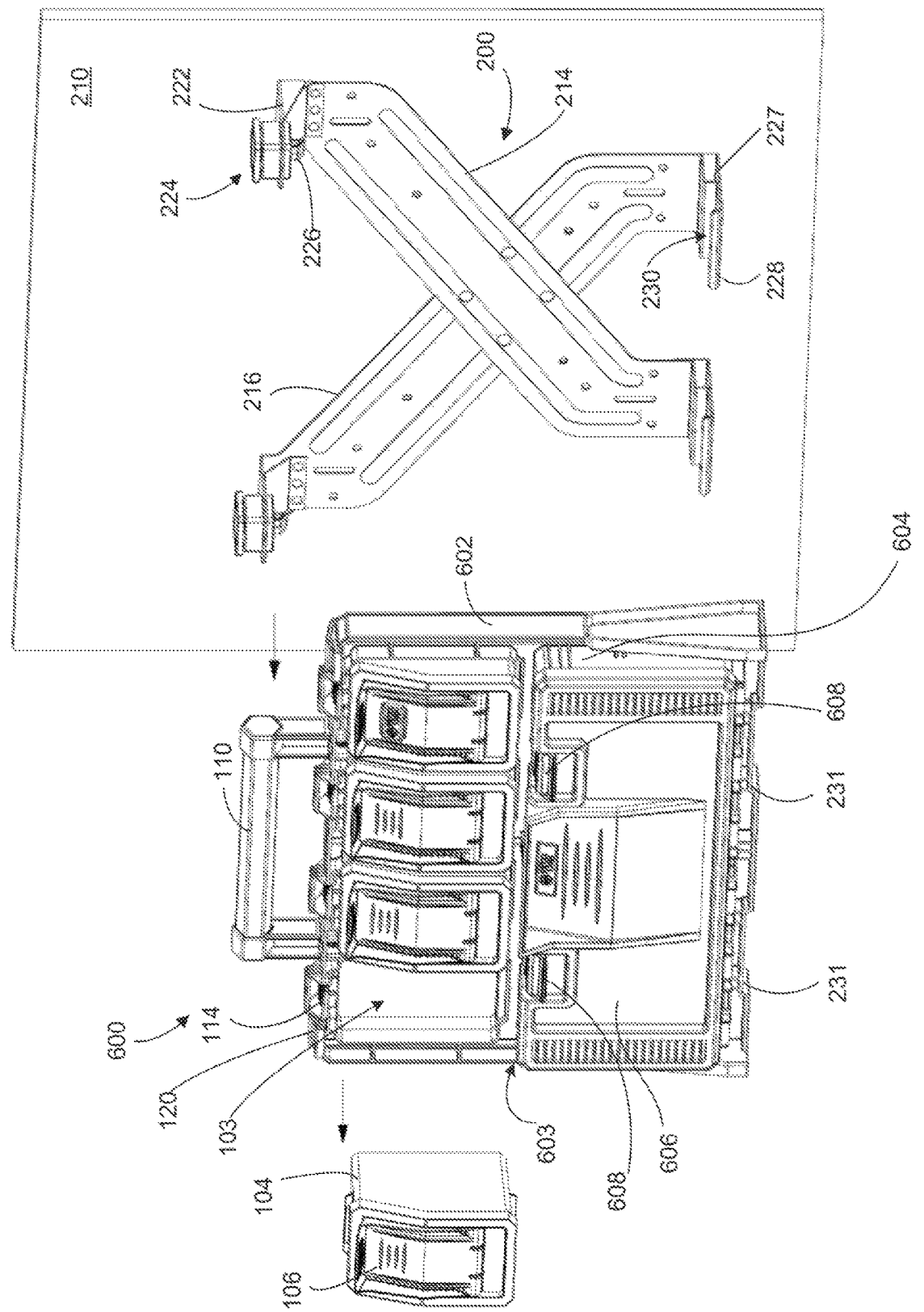
FIG. 6A is an exploded perspective illustration of an example second organizer showing example removable cups and showing an example wall mount bracket in accordance with teachings of this disclosure.

FIG. 6A is an exploded perspective illustration of an example second organizer 600 showing removable cups 104 similar to those shown in FIGS. 1-5 and an example wall mount bracket 200 similar to those shown in FIGS. 2A-5. As with FIG. 2A, FIG. 6A shows the second organizer 600 in relation to the wall mount bracket 200 attached to an example wall 210 and shows a cup 104 removed from a corresponding opening 103 of the second organizer 600. However, whereas the frame 102 (see FIG. 2A) includes a plurality of openings 103 formed in the lower portion 112 of the frame 102 (see FIG. 2A), the second organizer 600 omits the plurality of openings 103 in the lower portion 112 of the frame 602 in favor of a single opening 603 including an example receptacle 604. In some examples, the example receptacle 604 is fixed to the frame 602. In some examples, the receptacle 604 is removably attached to the frame 602. In some examples, the receptacle 604 is removably attached to the frame 602 in a similar manner to that of the cups 104 (e.g., via one or more latches 114, etc.). In some examples, the receptacle 604 is removably attached to the frame 602 in a manner different than that of the cups 104 (e.g., via one or more male/female connectors and/or snap-fit connectors, etc.). The receptacle 604 includes an example movable door 606. In some examples, the movable door 606 and/or the frame 602 includes example latches 608 to secure the movable door 606 relative to the receptacle 604. In some examples, the movable door 606 includes one or more snap-fit connectors to engage with corresponding mating snap-fit connectors formed in the receptacle 604 to lock the movable door 606 in place in a closed position. In some examples, the movable door 606 frictionally engages the receptacle 604 to provide resistance to movement of the movable door 606 along a portion of a range of angular movement of the movable door 606 (e.g., along the first 5°-10° of movement of the movable door in the opening direction, etc.) or along an entire range of angular movement.

Figure 6B:
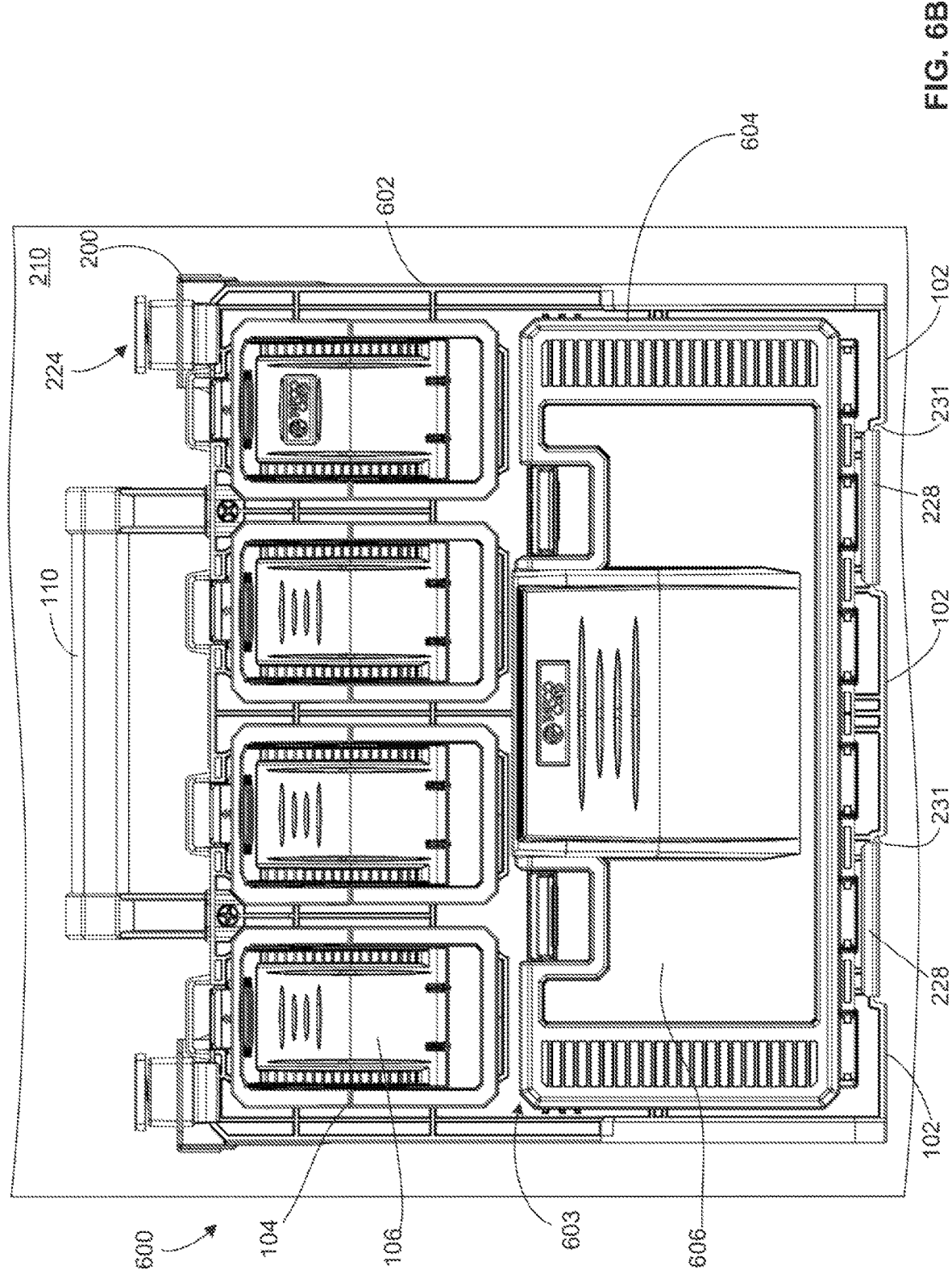
FIG. 6B is a front view of the second organizer of FIG. 6A removably attached to the wall mount bracket of FIG. 6A in accordance with teachings of this disclosure.

FIG. 6B is a front view of the second organizer 600 of FIG. 6A removably attached to the wall mount bracket 200 of FIG. 6A. FIG. 6B shows engagement of the frame 602 by the lateral retainers 228 at a lower portion of the first organizer 100 and engagement of the adapters 120 of the frame 602 by the quick release connectors 224 at an upper portion of the first organizer 100.

Figure 6C:
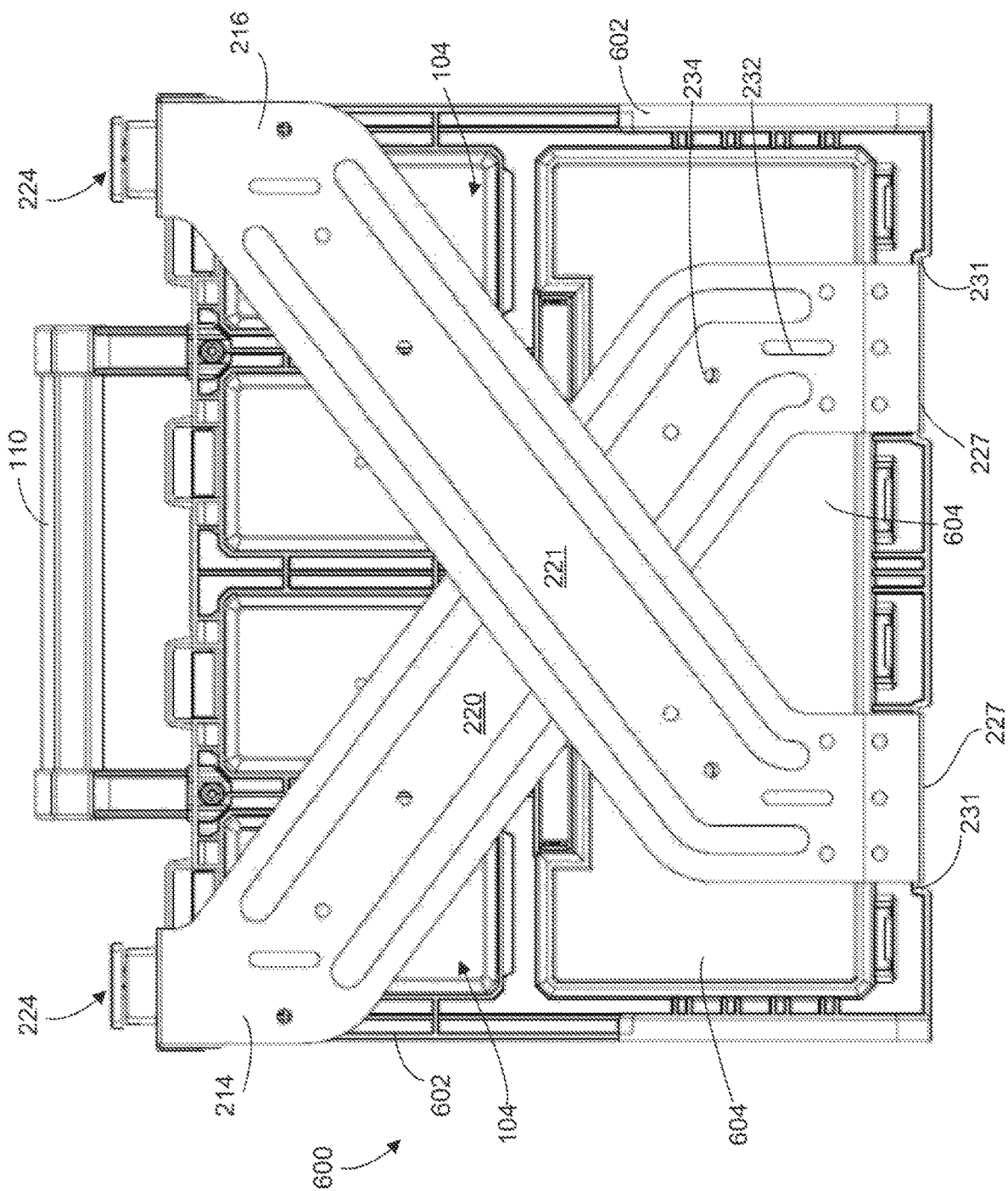
FIG. 6C is a rear view of the second organizer of FIGS. 6A-6B removably attached to the wall mount bracket of FIGS. 6A-6B, with the example wall removed for clarity, in accordance with teachings of this disclosure.

FIG. 6C is a rear view of the second organizer 600 of FIGS. 6A-6B removably attached to the wall mount bracket 200 of FIGS. 6A-6B, with the example wall removed for clarity. FIG. 6C shows the first section 214 and the second section 216 of the wall mount bracket 200, as well as the slots 232 and through holes 234 by which the wall mount bracket 200 may be mounted to the wall. In some examples, the wall mount bracket 200 may omit the example slots 232 and through holes 234 in favor or an adhesive connection between the wall mount bracket 200 and the wall. FIG. 6C also shows the openings 103 defined by the frame 602 to receive the cups 104. In some examples, the wall mount bracket 200 is omitted and the second organizer 600 is mounted to the wall via a bracket or hanger that engages the handle 110 or other feature of the frame 602. For instance, the second organizer 600 may be placed in or attached to a hanger hook or a clamp mounted to the wall.

Figure 6D:
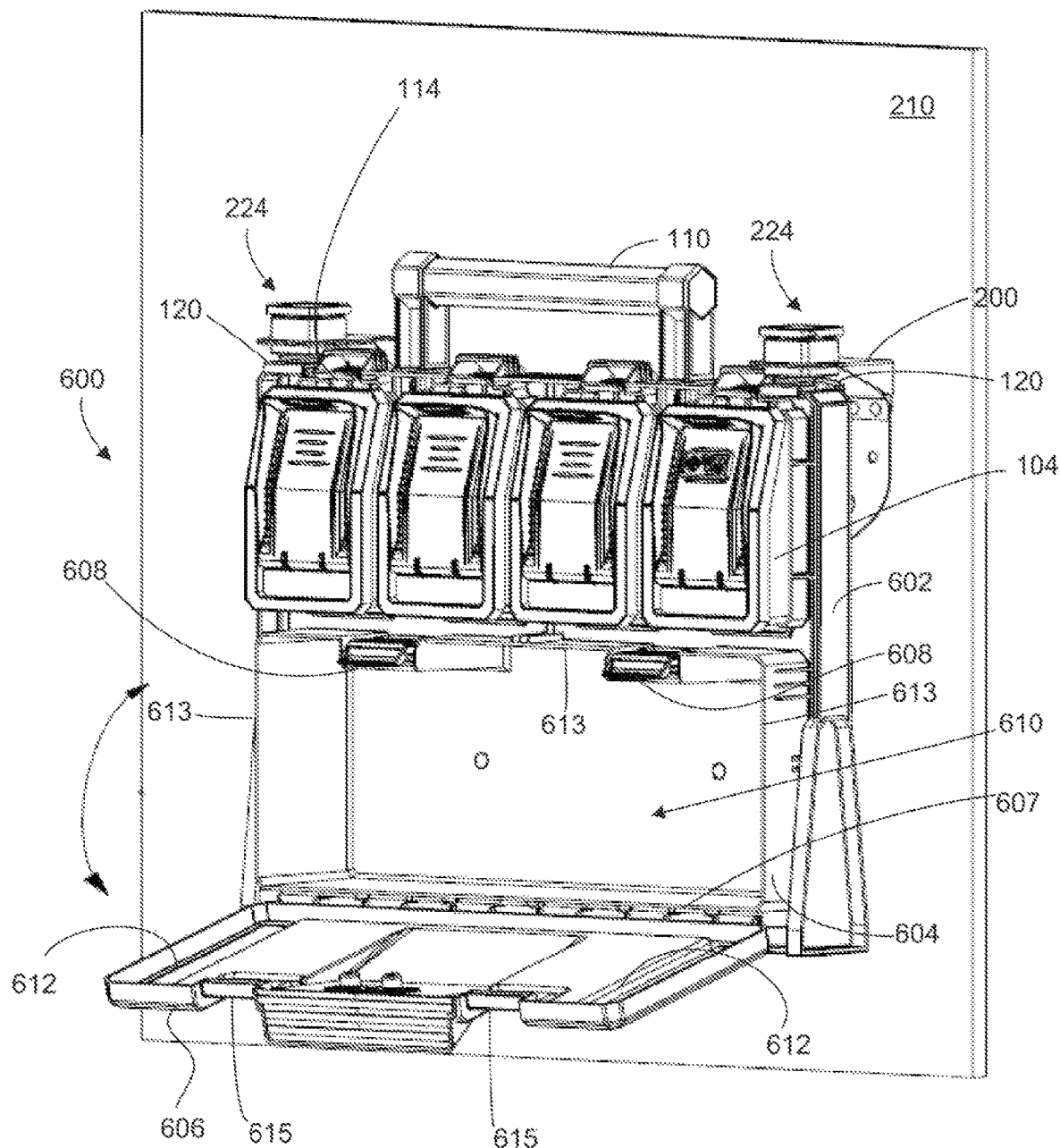
FIG. 6D is a perspective illustration of the second organizer of FIGS. 6A-6C, attached to the wall mount bracket of FIGS. 6A-6C, in accordance with teachings of this disclosure with a movable door of a receptacle at a lower portion of the second organizer being shown in an open position.

FIG. 6D is a perspective illustration of the second organizer 600 of FIGS. 6A-6C, attached to the wall mount bracket 200 of FIGS. 6A-6C. In FIG. 6D, the movable door 606 of the receptacle 604 is in an open position, showing the example hinge 607 about which the movable door 606 rotates relative to the receptacle 604 and showing the example interior volume 610. In some examples, inner surfaces of the movable door 606 define example features 612, such as grooves or recesses, configured to matingly receive and/or matingly engage corresponding features 613 of the receptacle 604. For example, the features 612 of the movable door 606 includes grooves configured to receive features 613 (e.g., edges) of the receptacle 604. Example latches 608 of the receptacle 604 are rotatably provided adjacent the receptacle 604 to removably engage corresponding example connectors 615 on the movable door 606. In some examples, the latches 608 include a first snap-fit element and the connectors 615 include a second snap-fit element, with the first snap-fit element matingly engaging the second snap-fit element when the movable door 606 is in the fully closed position and the latches 608 are rotated downwardly to engage the first snap-fit element to the second snap-fit elements. In some examples, the latches 608 are omitted and the movable door 606 includes one or more connection elements (e.g., snap-fit connector, male connector, etc.) to matingly engage correspondingly configured (e.g., snap-fit connector, female connector, etc.) connection elements of the receptacle 604. In some examples, the latches 608 are omitted and the movable door 606 includes one or more connection elements (e.g., groove, etc.) dimensioned to engage, via a friction fit (e.g., a location fit, a sliding fit, etc.), mating connection elements of the receptacle 604, wherein a light amount of force (e.g., opened by hand with little effort, etc.) is sufficient to lock the movable door 606 in a closed position or to open the movable door 606 from the closed position.

Figure 7:
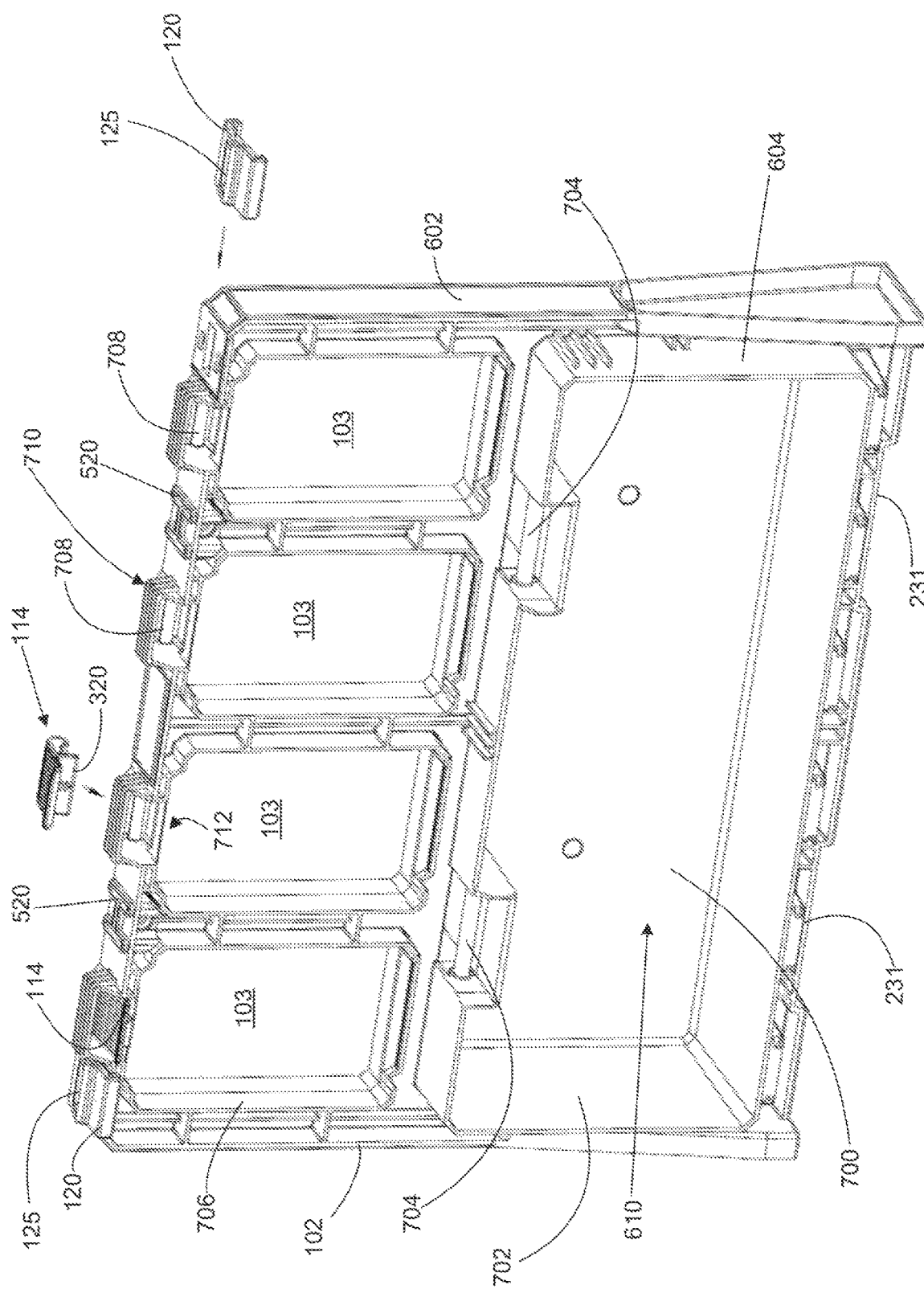
FIG. 7 is a perspective illustration of an example frame of the second organizer of FIGS. 6A-6D constructed in accordance with teachings of this disclosure.

FIG. 7 is a perspective illustration of the example frame 602 of the second organizer 600 of FIGS. 6A-6D. The frame 602 defines the receptacle 604 vian example walls 700, 702. The frame 602 and/or the receptacle 604 include example connectors 704, which are cylindrical in the depicted example, to which the latches 608 are rotatably attached. The frame 602 defines the openings 103 vian example walls 706. The frame 602 includes example connectors 708, which are cylindrical in the depicted example, to which the latches 114 are rotatably attached. In some examples, the walls 706 define a plurality of openings 103 of which at least one opening 103 is dissimilar in shape and/or size than another of the openings 103 to receive therein a cup 104 that is dissimilar in shape and/or size than another of the cups 104. FIG. 7 shows the frame 602 to define example enclosures 710 within which the latches 114 are disposed. In some examples, the enclosures 710 serve to protect the latches 114, so as to reduce a potential for an inadvertent contact with, and delatching of, a latch 114 and serve to provide a reinforcement to the frame 602 around example openings 712 formed to receive the latches 114. FIG. 7 shows the adapter 120 is a separate component that is attached to the frame 602 via mechanical fasteners (e.g., snap-fit connectors, etc.) and/or adhesive.

Figure 8:
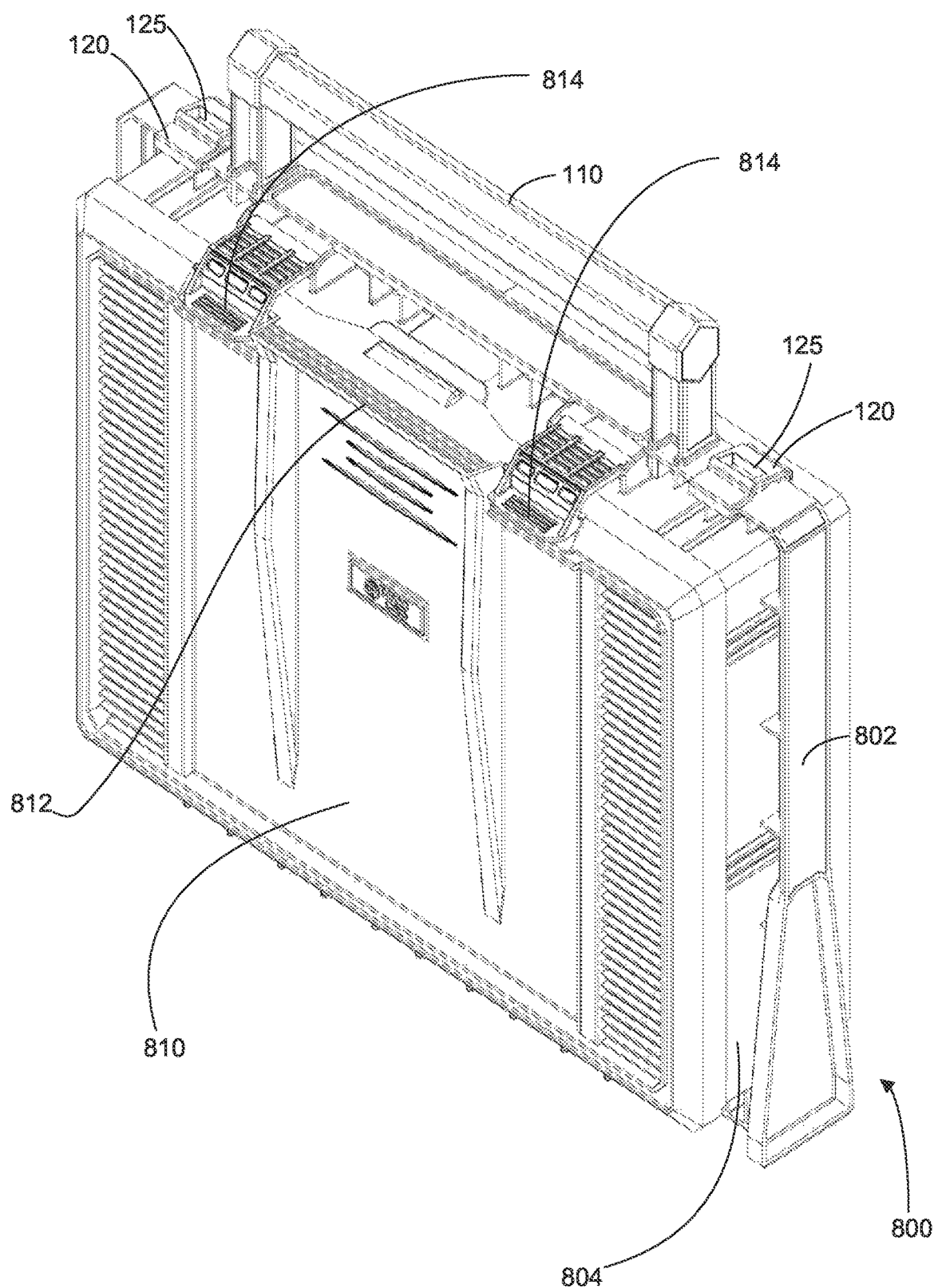
FIG. 8 is a perspective illustration of an example third organizer in accordance with teachings of this disclosure.

FIG. 8 is a perspective illustration of an example third organizer 800 including an example frame 802, an example receptacle 804, an example movable door 810, an example hinge 811 about which the movable door 810 rotates, an example handle 812 that may be used to manipulate the movable door 810 relative to the receptacle 804, and example latches 814 movable (e.g., rotatable, etc.) to secure the movable door 810 relative to the receptacle 804. The frame 802 of the third organizer 800 includes adapters 120 and/or features facilitating connection of the third organizer 800 to a wall mount bracket 200 similar to that shown, by way of example, in FIGS. 2A and 6A, with respect to the first organizer 100 and the second organizer 600.

Figure 9:
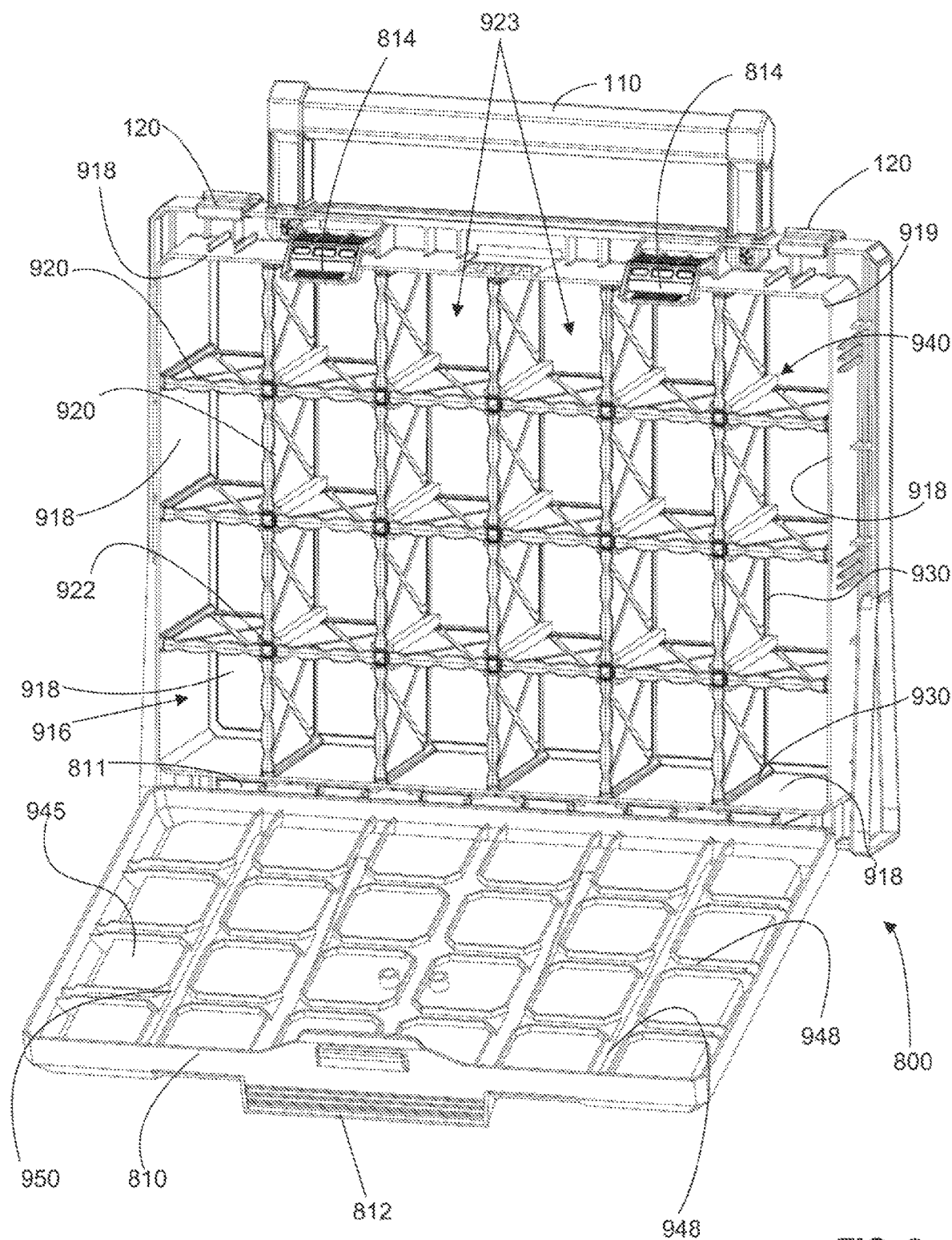
FIG. 9 is a perspective illustration of the third organizer of FIG. 8 with a movable door shown in an open position to show an example interior volume of the third organizer in an example first configuration in accordance with teachings of this disclosure.

FIG. 9 is a perspective illustration of the third organizer 800 of FIG. 8 with the movable door 810 in an open position showing an example interior volume 916 defined by example walls 918 of the third organizer 800. The receptacle 804 walls 918 likewise define an example opening 919 to the interior volume 916. The movable door 810 is to move between an open position, as shown in FIG. 9, in which the interior volume 916 is accessible via the opening 919 and a closed position, as shown in FIG. 8, in which the opening 919 is occluded.

Example removable partitions 920 and example removable posts 922 subdivide the interior volume 916 into a plurality of example compartments 923. As shown in FIG. 9, the interior volume 916 is arranged in an example first configuration, an example 4×6 array, defining twenty-four compartments 923. The walls 918 include a plurality of example first features 930 (e.g., slots, grooves, snap-fit connectors, female connectors, male connectors, etc.) to removably receive the removable partitions 920 and include a plurality of example second features 940 to removably receive the removable posts 922, such first features 930 and second features 940 being described further below in relation to the examples illustrated in FIGS. 10-13B.

In some examples, an interior surface 945 of the movable door 810 is substantially planar. In some examples, the interior surface 945 of the movable door 810 includes example third features 948 (e.g., slots, grooves, snap-fit connectors, female connectors, male connectors, etc.) that matingly engage upper ends (e.g., upper surfaces of or upper portions of, etc.) of the removable partitions 920 to provide lateral support to the upper end of the removable partitions 920 when the movable door 810 is in the closed position. In some examples, the interior surface 945 of the movable door 810 includes example fourth features 950 (e.g., slots, grooves, snap-fit connectors, female connectors, male connectors, etc.) that matingly engage upper ends (e.g., upper surfaces of or upper portions of, etc.) of the removable posts 922 to provide lateral support to the upper end of the removable posts 922 when the movable door 810 is in the closed position. In the example of FIG. 9, the third features 948 include slots arranged in a grid pattern and the fourth features 950 include recesses disposed at intersections of the grid pattern of the third features 948.

The third organizer 800 is constructed to enable selective customization of the interior volume 916 by securing a lower end of one or more removable posts 922 to a selected one or more of the plurality of second features 940, by securing a lateral end of one or more removable partitions 920 to a lateral portion of the one or more removable posts 922, and by securing a lower end of the one or more removable partitions 920 to one or more first features 930 adjacent the one or more removable posts 922.

Figure 10:
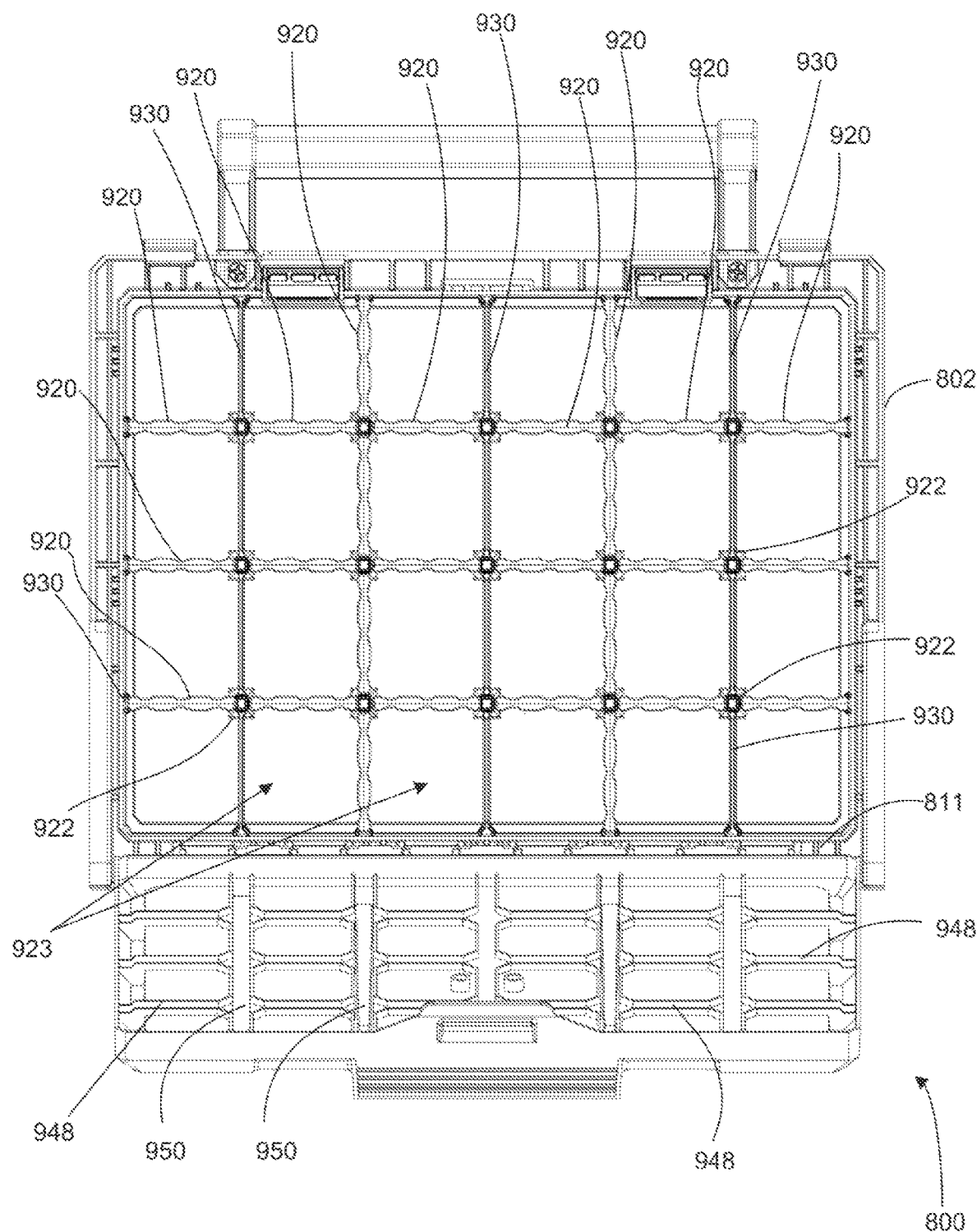
FIG. 10 is a front view of the third organizer of FIG. 9 with the movable door shown in the open position to show the example interior volume of the third organizer in an example second configuration in accordance with teachings of this disclosure.

To illustrate, FIG. 10 is a front view of the third organizer 800 of FIGS. 8-9 with the movable door 810 in the open position to show the interior volume 916 of the third organizer 800 in an example second configuration. Whereas FIG. 9 showed a first configuration including removable partitions 920 and removable posts 922 defining a 4×6 array of twenty-four equally sized compartments 923, FIG. 10 shows the example second configuration including removable partitions 920 and removable posts 922 defining a 3×4 array of twelve equally sized compartments 923. The third organizer 800 may be customized from an initial state to a subsequent state by selective removal or and/or additional of removable partitions 920 and/or posts 922. For instance, a transition from the first configuration of FIG. 9 to the second configuration of FIG. 10 would require selective removal of twelve removable partitions 920.

Figure 11:
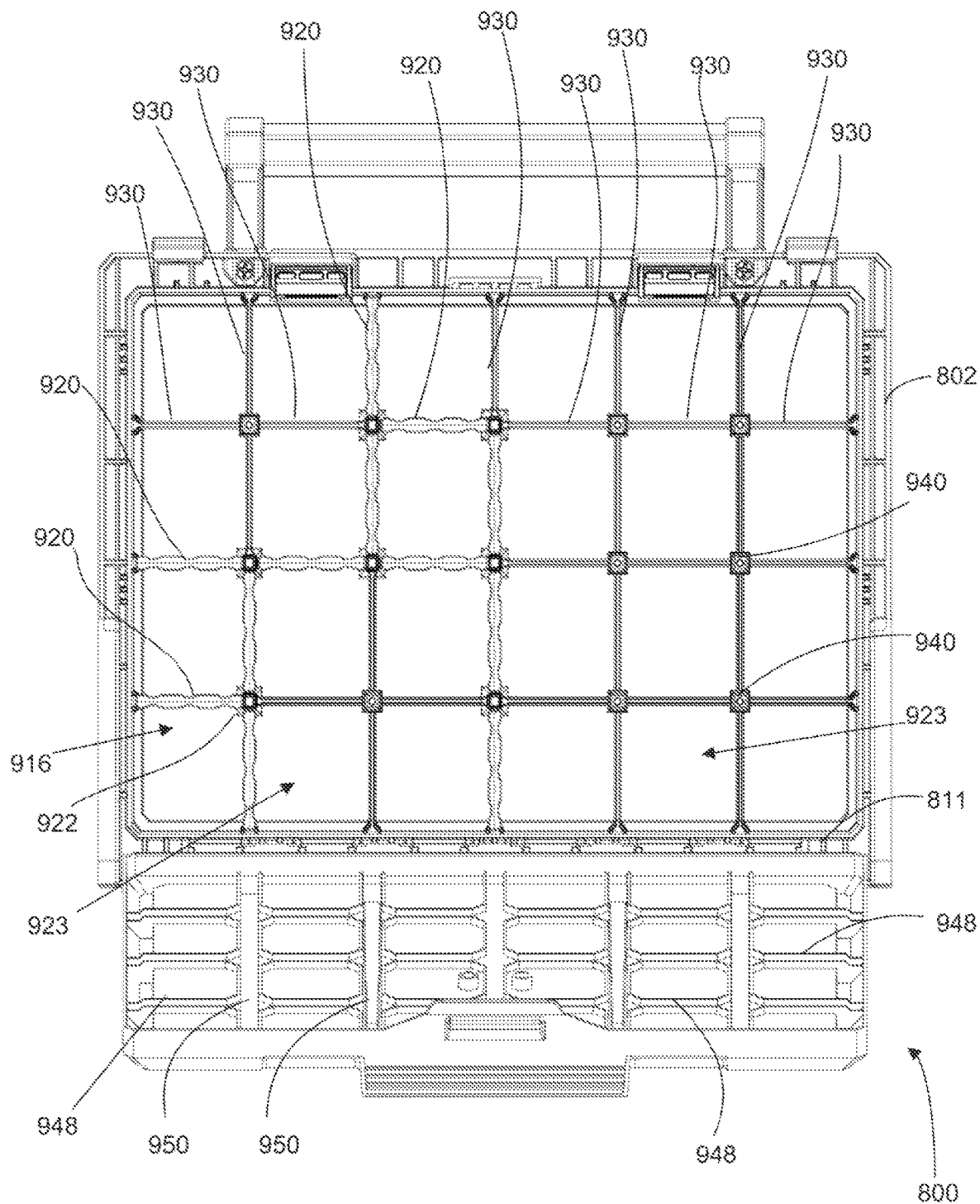
FIG. 11 is a front view of the third organizer of FIG. 9 with the movable door shown in the open position to show the example interior volume of the third organizer in an example third configuration in accordance with teachings of this disclosure.

FIG. 11 is a front view of the third organizer 800 of FIG. 9 with the movable door 810 in the open position to show the interior volume 916 of the third organizer 800 in an example third configuration. FIG. 11 shows the example third configuration including removable partitions 920 and removable posts 922 defining six compartments 923 including three 1×1 compartments, two 4×4 compartments, and one larger compartment occupying more than half of the interior volume 916

FIG. 12 is a front view of the third organizer 800 of FIG. 9 with the movable door removed for clarity to show the interior volume 916 of the third organizer 800 in an example fourth configuration. The fourth configuration of FIG. 12 shows three removable partitions 920 and three removable posts 922 arranged to form a partition within the interior volume 916.

Figure 13A:
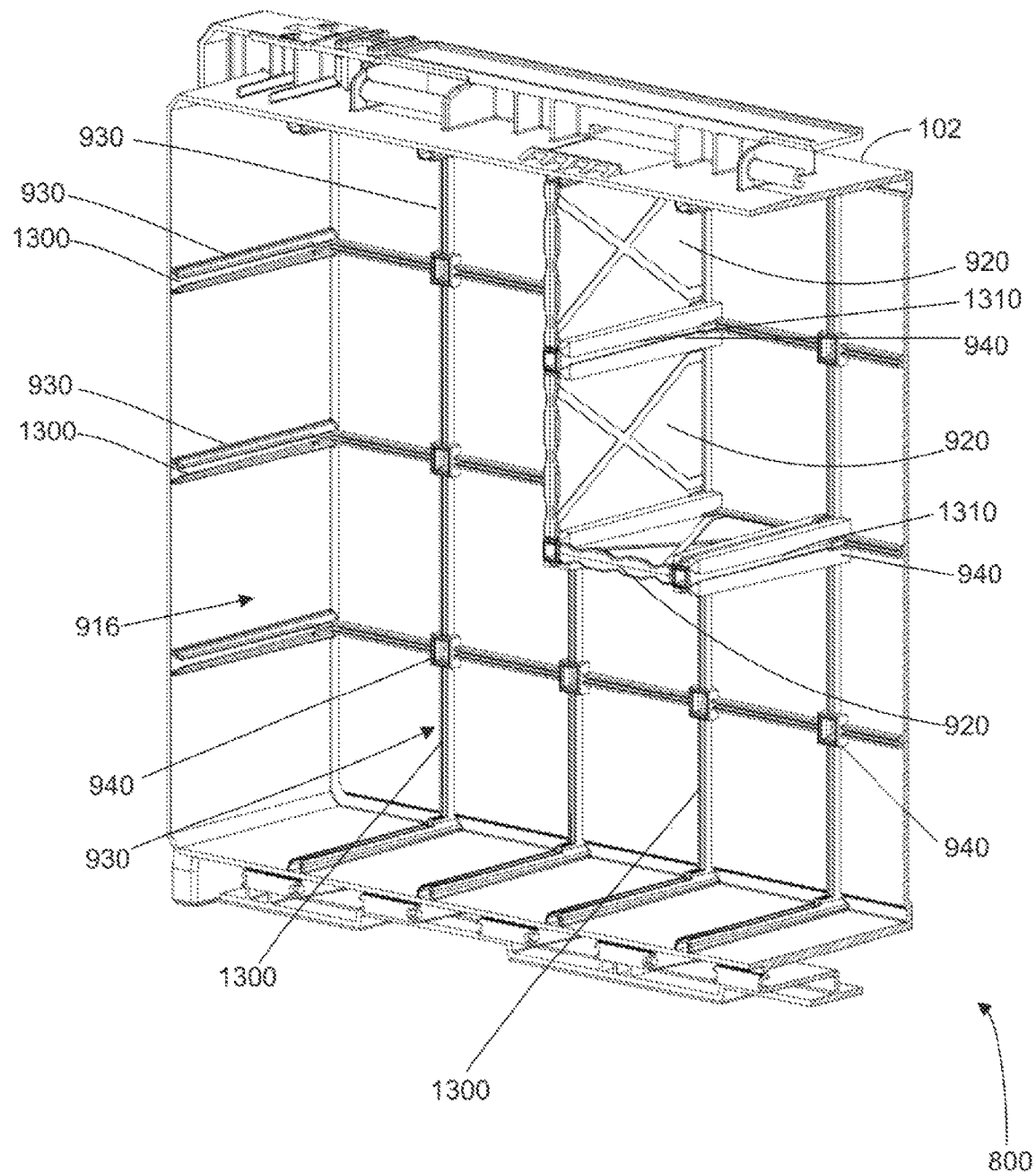
FIG. 13A is a partial perspective illustration of the third organizer of FIG. 12, showing the example interior volume of the example third organizer in the example fourth configuration, in accordance with teachings of this disclosure.

FIG. 13A is a partial perspective illustration of the third organizer 800 of FIG. 12, showing the interior volume 916 of the third organizer 800 in the example fourth configuration. FIG. 13A shows additional details of the example first features 930 to removably receive the removable partitions 920 and the example second features 940 to removably receive the removable posts 922. The first features 930 of FIG. 13A include example slots 1300 into which lateral portions of the removable partitions 920 (e.g., a lateral portion of the removable partition, an entire lateral side of the removable partition, etc.) are received and retained. The second features 940 of FIG. 13A include example slots 1310 into which lateral portions of the removable partitions 920 (e.g., a lateral portion of the removable partition, an entire lateral side of the removable partition, etc.) are received and retained.

Figure 13B:
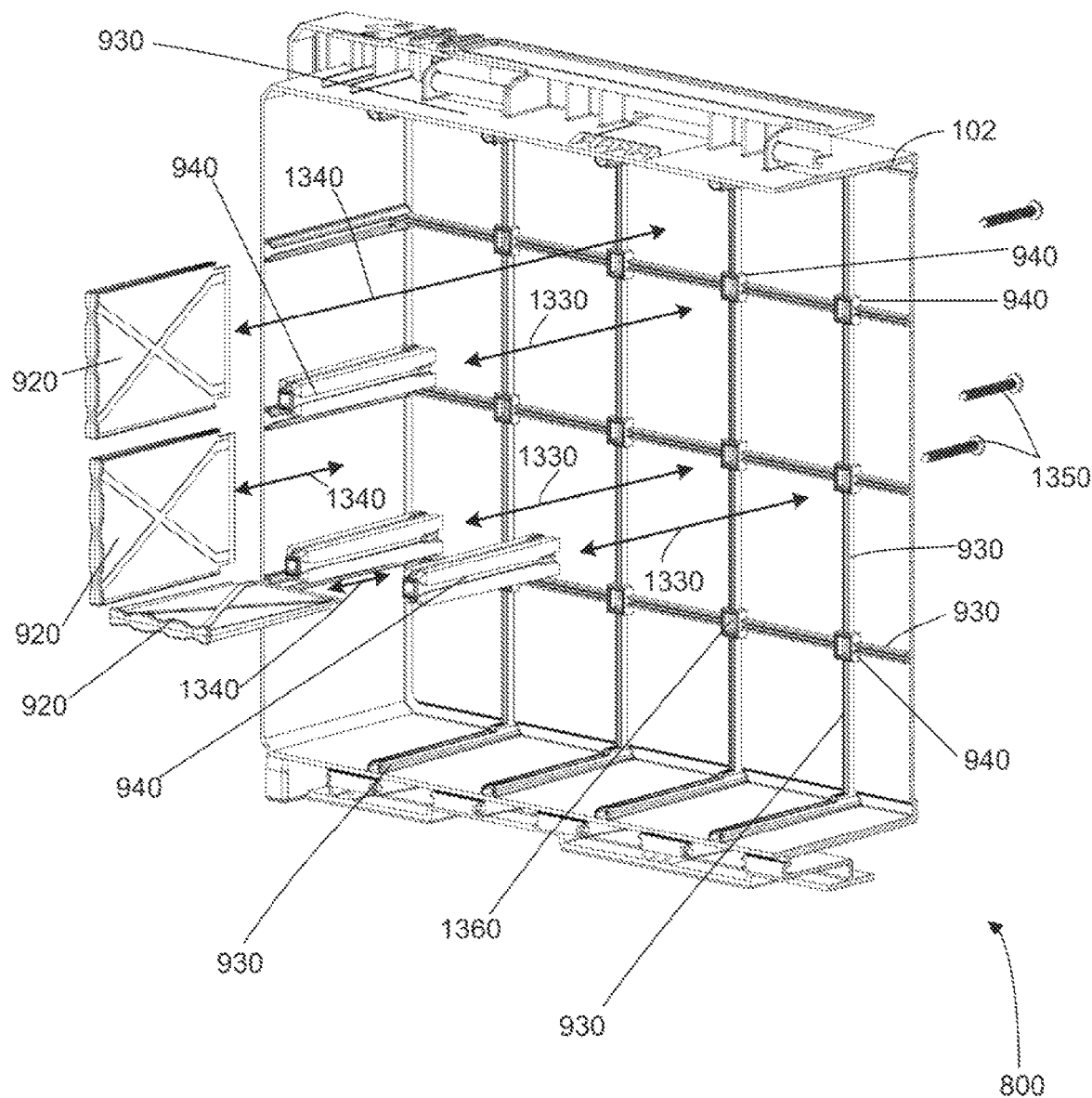
FIG. 13B is an exploded view of the third organizer of FIG. 13A, showing the example interior volume of the third organizer in the example fourth configuration in relation to a plurality of example first features and a plurality of example removable partitions received thereby and in relation to a plurality of example second features and a plurality of example removable posts received thereby, in accordance with teachings of this disclosure.

FIG. 13B is an exploded view of the third organizer 800 of FIG. 13A, showing the interior volume 916 of the third organizer 800 in the example fourth configuration of FIGS. 12-13A. FIG. 13B shows the second features 940 in relation to the removable posts 922 in an assembly or disassembly operation indicated by the example arrows 1330. FIG. 13B also shows the first features 930 in relation to the removable partitions 920 in an assembly or disassembly operation indicated by example arrows 1340. In some examples, following positioning of the removable posts 922 in the selected second features 940, example mechanical fasteners 1350 are inserted through example openings 1360 in the second features 940 and into a bottom portion of the removable posts 922 (e.g., via a threaded hole in a bottom portion of the removable posts 922 to receive a screw, etc.). In some examples, the removable posts 922 are connected to the second features via a male/female connector and/or a snap-fit connector rather than through a separate mechanical fastener.

Figure 15:
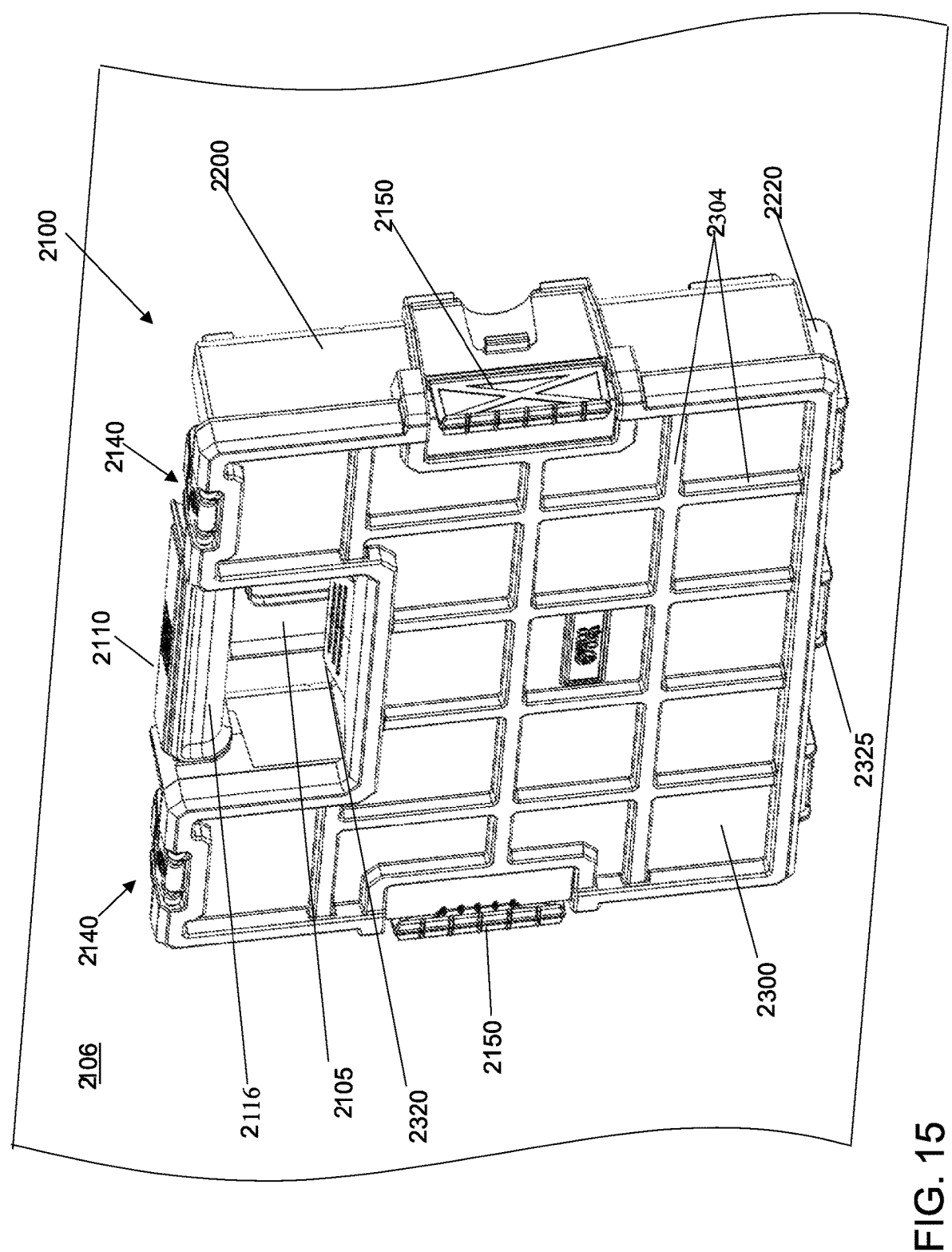
FIG. 15 is a perspective view of the example organizer of FIG. 14 attached to the example wall mount.
Figure 16:
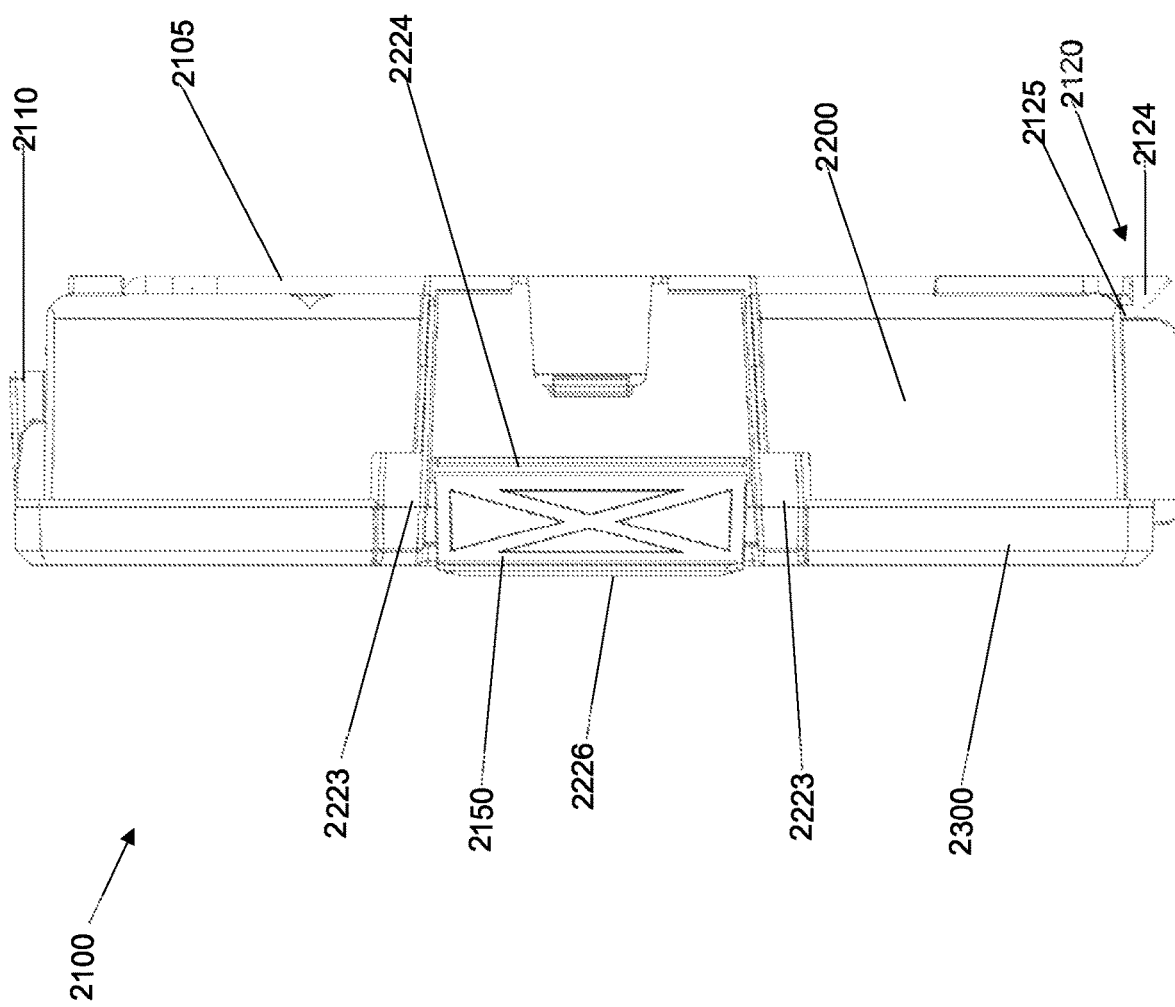
FIG. 16 is an example side view of the example organizer of FIG. 14 attached to the example wall mount.

FIGS. 14-16 are example perspective views of an example organizer 2100 disposed adjacent an example wall mount 2105 mounted on an example wall 2106. The example organizer 2100 is selectively attached to or selectively detached from the example wall mount 2105 by a user. In some examples, the example wall 2106 includes a wall of a home, business, or building. In some examples, the example wall 2106 includes an upright or an inclined surface (e.g., vertical or non-vertical, a positively inclined surface, a negatively inclined surface, etc.) of any type such as, but not limited to, an interior wall of a work vehicle (e.g., a utility van, etc.), a partition or a work station.

The example organizer 2100 of FIG. 14, and FIGS. 15-16, is shown to include an example base 2200 and an example cover 2300 matingly engaged to the example base 2200. In the example of FIGS. 14-16, the example base 2200 is matingly engaged to the example cover 2300 via one or more (e.g., two, three, etc.) example hinges 2202 along a side of the example organizer 2100, as is shown by way of example in FIG. 15. In some examples, the example hinges 2202 are external hinges, such as is shown in the example organizer 2100 of FIG. 15. In some examples, the example hinges 2202 are internal hinges.

The example organizer 2100 of FIG. 14-16 is also shown to include an example handle 2110, example lateral connectors 2140, example side connectors 2150 and an example center connector 2315 disposed at a central portion of the example organizer 2100. In some examples, one or more of the example lateral connectors 2140, the example side connectors 2150 and/or the example central connector 2315 are attached to the example base 2200. In some examples, one or more of the example lateral connectors 2140, the example side connectors 2150 and/or the example central connector 2315 are attached to, or integral with (e.g., formed as part of, permanently affixed to, etc.) the example cover 2300. The combination of the example lateral connectors 2140 and the example center connector 2315 of the example organizer 2100 provides a robust, positive lock-up of the example cover 2300 to the example base 2200. In some examples, the example organizer 2100 omits the example lateral connectors 2140 and/or the example side connectors 2150.

In some examples, one or more of the example lateral connectors 2140, the example side connectors 2150 and/or the example central connector 2315 comprise a mechanical closure such as, but not limited to, a latch, a mechanical fastener, a linkage, a magnet (e.g., a rare-earth magnet, a neodymium magnet, etc.), a snap connector, a clasp, a quick release fastener or a slide lock. In the example of FIGS. 14-16, the example lateral connectors 2140 include latches, the example side connectors 2150 include latches and the example central connector 2315 includes an example snap connector.

FIGS. 14-15 show an example wherein the central connector 2315 includes an example hinge connecting the example central connector 2315 to the example cover 2300 and includes an example tab 2320 to facilitate a user's outward biasing of the example central connector 2315 relative to the example base 2200 and the example cover 2300 to disengage the example mechanical closure or feature (e.g., a snap connector, a ledge, a strike, a protrusion or boss, a recess, etc.) of the example central connector 2315 from a corresponding mechanical closure or feature (e.g., another of a snap connector, a ledge, a strike, a protrusion or boss, a recess, etc.), which may be continuous or discontinuous, on the example base 2200. In some examples, the example hinge is a living hinge. In some examples, the example central connector 2315 is a separate part from the example cover 2300 and the example central connector includes a first hinge element (e.g., a shaft, etc.) that is attached to corresponding second hinge element (e.g., a knuckle, a loop, joint, a node, etc.) of the example cover 2300, with a spring or resilient element biasing the example central connector 2315 inwardly to facilitate the automatic engaging of the example mechanical closure of the example central connector 2315 with the corresponding mechanical closure or feature on the example base 2200.

In some examples, the example central connector 2315 extends at least substantially perpendicularly (e.g., 89°, 90°, 91° etc.) to the example base 2301 (e.g., the plane generally defining the example cover 2300) of the example cover 2300, such as is shown in FIG. 14. In some examples, the example central connector 2315 is canted outwardly relative to the example base 2301, such as at an outwardly directed angle from the perpendicular of between about 0°-5° (e.g., 91°, 92°, 93°, 94°, 95°, etc. relative to the example base 2301) or more. In some examples, the example central connector 2315 is canted inwardly relative to the example base 2301, such as at an inwardly directed angle from the perpendicular of between about 0°-5° (e.g., 89°, 88°, 87°, 86°, 85°, etc. relative to the example base 2301) or more. In some examples, the example tab 2320 is canted outwardly relative to the example central connector 2315 (e.g., away from example base 2200 and the example cover 2300 with the example organizer 2100 in a closed position), such as at an angle between about 0°-30°, to facilitate digital manipulation of the example tab 2320 by a user when opening the example organizer 2100. In some examples, the example mechanical closure (see, e.g., the example snap connector 2322) is integrated with the example tab 2320 rather than the example central connector 2315. In closure, a user is able to simply rotate the example cover 2300 toward and into engagement with the example base 2200 and the example central connector 2315, or the example tab 2320, automatically engages and locks onto the example base 2200 to securely and independently (e.g., without engagement of the example lateral connectors 2140 and/or the example side connectors 2150) retain the example cover 2300 in engagement with the example base 2200. For instance, the example first connector(s) 2322 of the example central connector 2315 engage(s) the example second connector(s) 2323 of the example base 2200. In this state, with the example central connector 2315, or the example tab 2320, locked onto the example base 2200 via the mechanical closure, the example organizer can be oriented in another position (e.g., a vertical position as shown in FIG. 15, etc.) and the example cover 2300 will remained locked to the example base 2200 even if the example lateral connectors 2140 and/or the example side connectors 2150 are not provided or are not engaged.

The example in the following paragraphs relates to an example organizer similar to that of the example of FIGS. 14-16, but some components are positioned differently than in the example organizer 2100 of FIGS. 14-16. For clarity, in the example that follows, the reference numerals of the example of FIGS. 14-16 (e.g., base 2200) are used with a prime indicator (e.g., base 2200') to connote that the structures of the example that follows are essentially the same as that of the example of FIGS. 14-16, but are disposed on a different part of an example organizer 2100' than that of the example organizer 2100 shown in FIGS. 14-16. In the example that follows, an example central connector 2315' (not shown) is connected to an example base 2200' (not shown) and an example cover 2300' (not shown) includes the corresponding mechanical closure or feature (e.g., a snap connector, a ledge, a strike, a protrusion or boss, a recess, etc.), continuous or discontinuous, with which the example central connector 2315' of the example base 2200' engages.

In some examples, the example central connector 2315' is connected to the example base 2200' via a hinge such as, but not limited to, a living hinge. In some examples, the example central connector 2315' is a separate part from the example base 2200' and the example central connector includes a first hinge element (e.g., a shaft, etc.) that is attached to corresponding second hinge element (e.g., a knuckle, a loop, joint, a node, etc.) of the example base 2200' with a spring or resilient element biasing the example central connector 2315' inwardly to facilitate the automatic engaging of the example mechanical closure of the example central connector 2315' with the corresponding mechanical closure or feature on the example cover 2300'. In some examples, the example central connector 2315' includes an example tab 2320' canted outwardly relative to the example central connector 2315' by an angle between about 0°-30°. The example tab 2320' facilitates a user's outward biasing of the example central connector 2315' relative to the example base 2200' and the example cover 2300' to disengage the example mechanical closure or feature (e.g., a snap connector, a ledge, a strike, a protrusion or boss, a recess, etc.) of the example central connector 2315' from a corresponding mechanical closure or feature (e.g., another of a snap connector, a ledge, a strike, a protrusion or boss, a recess, etc.) on the example cover 2300'.

In some examples, the example central connector 2315' extends parallel to or substantially parallel to the example outer side walls 2250' of the example base 2200'. In some examples, the example central connector 2315' extends upwardly to a point above an upper edge of the example outer side walls 2250' of the example base 2200'. In some examples, the example central connector 2315' is attached to, or integrated with, the example base 2200' in an outwardly canted orientation relative to the example base 2200' and the example cover 2300' (e.g., canted at an angle between about 0°-15°, etc.) to facilitate digital manipulation by a user.

In some examples, the example central connector 2315' is canted outwardly slightly relative to the outer side walls 2250', such as at an outwardly directed angle of between about 0°-5° or more relative to the example outer side walls 2250'. In some examples, the example central connector 2315' is connected to a respective one of the example outer side walls 2250' (e.g., an outer side wall positioned adjacent the example handle 2110') via a living hinge at a proximal end of the example central connector 2315', the proximal end being displaced outwardly from the respective one of the example outer side walls 250' via an offset. In this example, the example central connector 2315' is canted inwardly relative to the respective one of the example outer side walls 2250' (e.g., at an inwardly directed angle of between about 0°-5°), such that a spacing between at least a portion of a distal end of the example central connector 2315' and the respective one of the example outer side walls 2250' is less than a spacing between the example proximal end of the example central connector 2315' and the respective one of the example outer side wall 2250'.

In some examples, as shown by way of example in FIGS. 14-16, the example cover 2300 includes example features 2304. In some examples, the example features 2304 are raised features, projecting above a base height of the example cover 2300, defining channels on an underside of the cover (not shown in FIGS. 14-16). In some examples, the example features 2304 are recessed features, extending below a base height of the example cover 2300, defining projections on an underside of the cover. In summary, the channels defined by the example features 2304 engage corresponding features (e.g., projections, male connectors, recesses, female connectors, etc.) of fixed and/or removable partitions, and/or junctions or posts therebetween, disposed to define a plurality of separate compartments within the example base 2200. The engagement between the channels formed by the example features 2304 and the corresponding features of that partitions and/or junctions provide additional points of contact between and/or connection between, the example cover 2300 and the example base 2200 when the cover is in a closed position. Additionally, the enhanced engagement between the channels formed by the example features 2304 and the corresponding features of that partitions and/or junctions could help to prevent migration of small parts borne within the one or more compartments in the example organizer 2100 when the example cover 2300 is in a closed position.

Turning to the example wall mount 2105 of FIGS. 14-16, the example wall mount 2105 includes an example base 2107 that is attached to the example wall 2106 or other inclined surface (e.g., a panel, a hutch, a pegboard, a partition, etc.). An upper portion of the example wall mount 2105 includes an example receiver 2115 extending outwardly from the example base 2107 (e.g., away from the example wall 2106 or other surface to which the example wall mount 2105 is attached) to receive a handle (e.g., example handle 2110 of the example organizer 2100 of FIGS. 14-16, etc.) thereupon. The example receiver 2115 may extend perpendicularly from the example base 2107, substantially perpendicularly from the example base 2107 (e.g., 88°, 89°, etc.), or at an upward cant (e.g., 60°, 75°, 80°, etc.) or a downward cant (e.g., 60°, 75°, 80°, etc.) relative to the example base 2107.

In some examples, the example receiver 2115 includes an example retainer 2116 at an example distal end of an example base 2117. In some examples, such as is shown in FIGS. 14-16, the example retainer 2116 includes one or more upwardly curving sections. In some examples, the example retainer 2116 includes one or more upwardly extending sections or members (e.g., posts, pins, plates, etc.). The example retainer 2116 is to prevent forward movement of the handle (e.g., 2110) of the organizer (e.g., 2100) away from the example base 2107 of the example wall mount 2105 and off of the example receiver 2115. In some examples, the example retainer 2116 includes one or more upwardly extending sections or members (e.g., male connectors) corresponding in dimension and placement to matingly engage recessed sections (e.g., female connectors) or other features in a handle of an organizer or in a common handle configuration used for a family of organizers. In some examples, the retainer 2116 includes one or more recessed areas (e.g., grooves, slots, cutouts, recesses, etc.) corresponding in dimension and placement to matingly engage one or more portions in a handle of an organizer or in a common handle configuration used for a family of organizers. For instance, in some examples, the retainer 2116 includes a semi-cylindrical recess having a first diameter, dimensioned to receive a handle having a second diameter that is less than the first diameter. In some examples, the retainer 2116 may include a combination of one or more upwardly extending sections or members and one or more recessed areas. In the example of FIGS. 14-16, the example retainer 2116 upwardly curves from the example base 2117. In some examples, this upward curve corresponds generally to a curve of a handle of an organizer, or family of organizers, that are mated with, or intended to be used with, the example wall mount 2105.

FIGS. 14-15 show that the example base 2107 of the example wall mount 2105 includes one or more example openings 2126, such as holes (e.g., circular openings, etc.) to facilitate use of conventional mechanical fasteners (e.g., screws, nuts, nails, rivets, etc.) to secure the example base 2107 of the example wall mount 2105 to the example wall 2106 or other inclined surface. In some examples, the one or more example openings 2126 include slots (e.g., oblong openings, etc.) to further facilitate additional degrees of freedom in positioning of the mechanical fasteners relative to structures (e.g., studs, supports, etc.) of the example wall 2106 or other inclined surface.

In some examples, the example base 2107 includes one or more example features 2127 including one or more male features (e.g., an example ridge or protrusion in the example of FIG. 14) and/or one or more female features (e.g., an example recess, slot, groove, etc.), which may matingly engage correspondingly positioned and dimensioned features in a rear surface of a toolbox (e.g., 2190) to be received. For instance, it the example of FIG. 14, the vertical aspects of the example features 2127 may engage correspondingly oriented and dimensioned features (e.g., vertically oriented spaced-apart grooves, etc.) on a rear side of the example base 2200 of the example toolbox 2190.

In some examples, to secure a bottom portion of the example organizer 2100 borne by the example wall mount 2105, the example wall mount 2105 includes one or more (e.g., two, three, etc.) example supports 2120. In FIGS. 14-16, two spaced-apart example supports 2120 are shown. In some examples, the example wall mount 2105 includes one support 2120 that may extend along an entire width of the example wall mount 2105 or, alternatively, may extend only a portion of the width of the example wall mount 2105 (e.g., a centrally-disposed support having one-half, one-third, one-quarter, or other fractional portion of the width of the example wall mount 2105). In some examples, three supports 2120 are provided, with two laterally disposed supports (e.g., as shown in FIGS. 14-15) and one centrally disposed support.

In some examples, the example supports 2120 engage a bottom portion of the example organizer 2100 borne by the example wall mount 2105. In some examples, the example supports 2120 include example first connectors 2125 to matingly engage example second connectors 2270 on the bottom portion of the example organizer 2100 to limit or prevent motion of the bottom portion of the example organizer along one or more axes (translational and/or rotational). In some examples, the example first connectors 2125 and the example second connectors 2270 may include male-female connectors (e.g., spike and cone, pin and socket, boss and indentation, etc.), snap-fit connectors, frictional engagement surfaces, magnetic connectors or biasing elements (e.g., spring assisted pins, etc.). In the example of FIGS. 14-15, the example first connectors 2125 include male connectors projecting upwardly from the example supports 2120 and the example second connectors 2270 include female connectors comprising recesses formed within the example base 2200 to receive the example first connectors 2125. While in some examples the example supports 2120 and/or the example first connectors 2125 are similar in configuration in the example of FIGS. 14-16, the example supports 2120 and/or the example first connectors 2125 may be dissimilarly configured. In some examples of the present concepts, the example first connectors 2125 and the example second connectors 2270 are omitted.

In some examples of the present concepts, the example supports 2120 are omitted and the engagement of the example organizer 2100 with the example wall mount 2105 is via the example handle 2110. In some examples, the example supports 2120 are positioned on one or more different portions of the example wall mount 2105 so as to engage correspondingly positioned features (e.g., second connectors 2270) formed on the example base 2200 of the example organizer 2100. For instance, the example supports 2120 can be positioned on lateral portions of the example wall mount 2105 to engage example second connectors positioned on lateral portions of the example base 2200. As another example, the example supports 2120 can be positioned on the example base 2107 of the example wall mount 2105 to engage example second connectors positioned on an example rear portion 205 of the example base 2200.

FIG. 15 is a perspective view of the example organizer 2100 attached to the example wall mount 2105. The example handle 2110 of the example organizer 2100 is nestled on the example base 2117 of the example receiver 2115 and is displaced adjacent or in contact with the example retainer 2116. In the perspective of FIG. 15, example hinges 325 on the example cover 2300 connect the example cover 2300 to the example base 2200. In the example of FIG. 15, the example organizer 2100 includes three separated example hinges 2325. In other examples, a lesser number (e.g., one or two) or a greater number (e.g., four, etc.) of hinges are provided. For instance, a single hinge extending along substantially an entire width of the example cover 2300 and the example base 2200 may be used to rotatably connect the example cover 2300 and the example base 2200.

FIG. 16 is an example side view of the example organizer 2100 attached to the example wall mount 2105. FIG. 16 shows the connection between the example first connectors 2125 of the example supports 2120 and the example second connectors 2270 (not shown) of the example organizer 2100. The example supports 2120 are also shown to include an example angled support 2124.

FIG. 3 also shows the example side connector 2150 to include, at a bottom portion thereof, an example shaft 2224 defining an axis of rotation about which the example side connector 2150 rotates. In some examples, the example side connector 2150 includes lateral spindles or pins in lieu of the example shaft 2224. A first end of the example shaft 2224 is rotatably received within an example first opening or slot (not shown in FIG. 16) formed in an example hinge support 2223 and a second end of the example shaft 2224 is rotatably received within an example second opening or slot (not shown in FIG. 16) formed in another example hinge support 2223. Thus, in the example shown in FIG. 16, the example side connector 2150 rotates relative to the example base 2200 and connects to the example cover 2300 via an example connector 2226 (e.g., a snap connector, etc.) at an upper end of the example side connector 2150.

Figure 17:
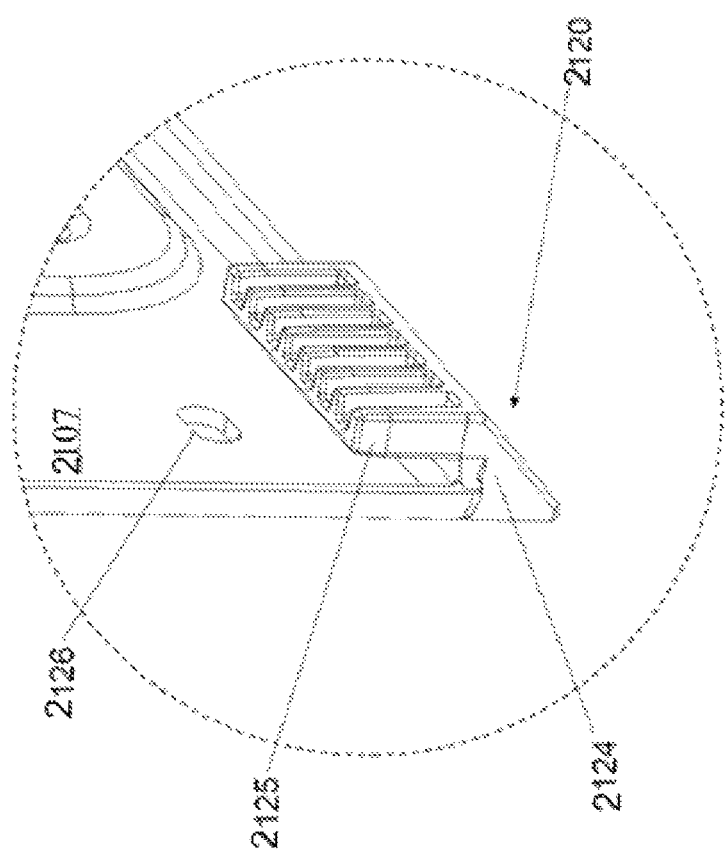
FIG. 17 is an example perspective view of an example lower support member of the example wall mount of FIGS. 14-16, the example lower support member being adapted to engage a bottom portion of the example organizer of FIGS. 14-16.

FIG. 17 is an example perspective view of an example lower support member 2120 of the example wall mount 2105 of FIGS. 14-16. The example lower support member 2120 is adapted to engage a bottom portion of the example organizer 2100 via example first connectors 2125 configured to matingly engage example second connectors 2270 on the bottom portion of the example organizer 2100. In some examples, the example first connectors 2125 include one of a male or a female connector and the example second connectors 2270 include another one of the male or the female connector. In FIG. 17, the example first connector 2125 is a male connector projecting upwardly from the example angled support 2124. In some examples, the example first connectors 2125 and the example second connectors 2270 include interlocking teeth. In some examples, the example first connectors 2125 and the example second connectors 2270 are tapered in shape, with a distal portion of the example first connectors 2125 having a smaller depth than a proximal portion of the example first connectors 2125 (i.e., at the example angled support 2124). Tapering of the example first connectors advantageously assists with positioning of the example second connectors 2270 over the example first connectors 2125.

Figure 18:
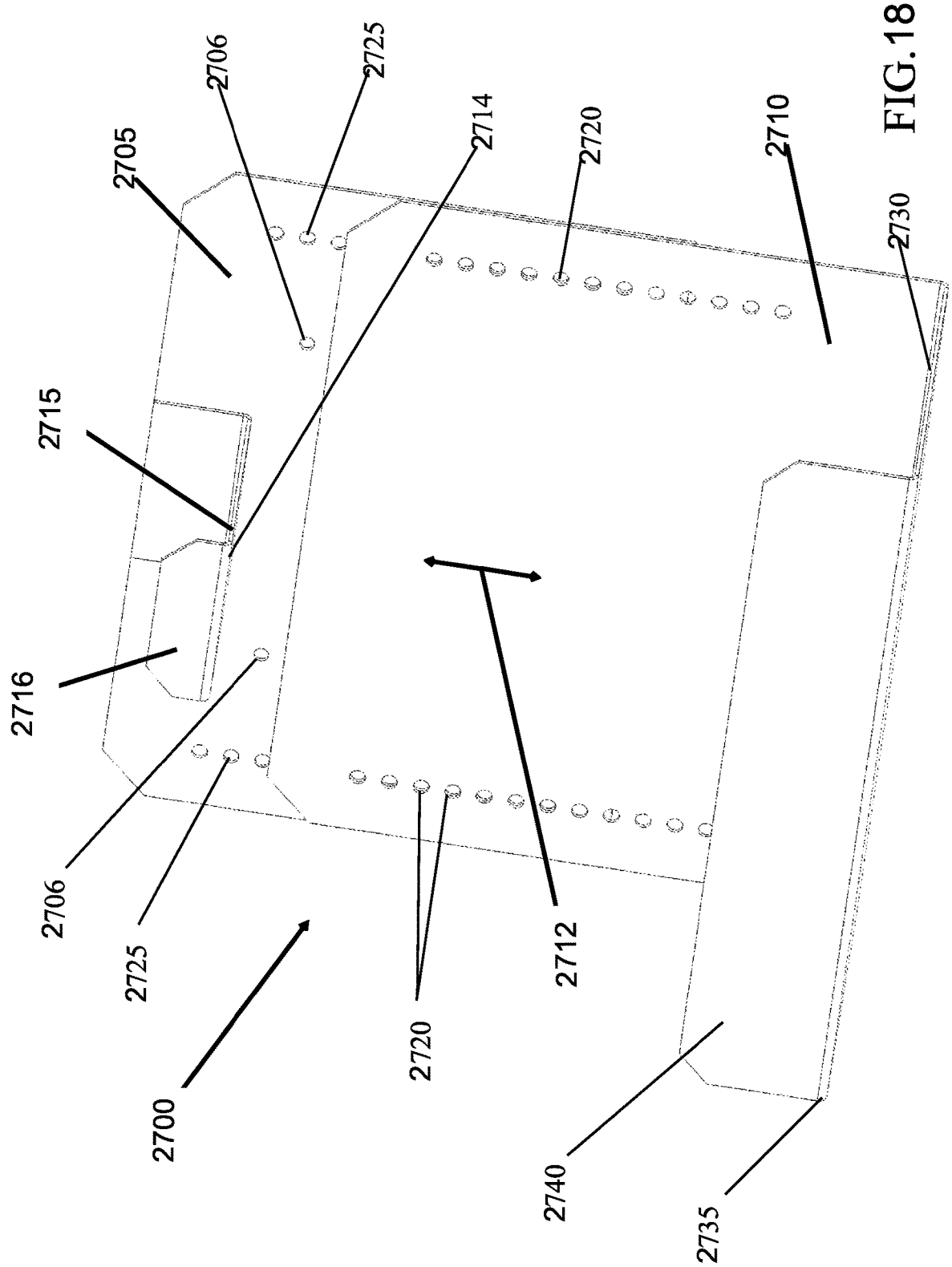
FIG. 18 is an example perspective view of an example first adjustable wall mount that may be used with the example organizer of FIGS. 14-17 or another organizer.
Figure 19:
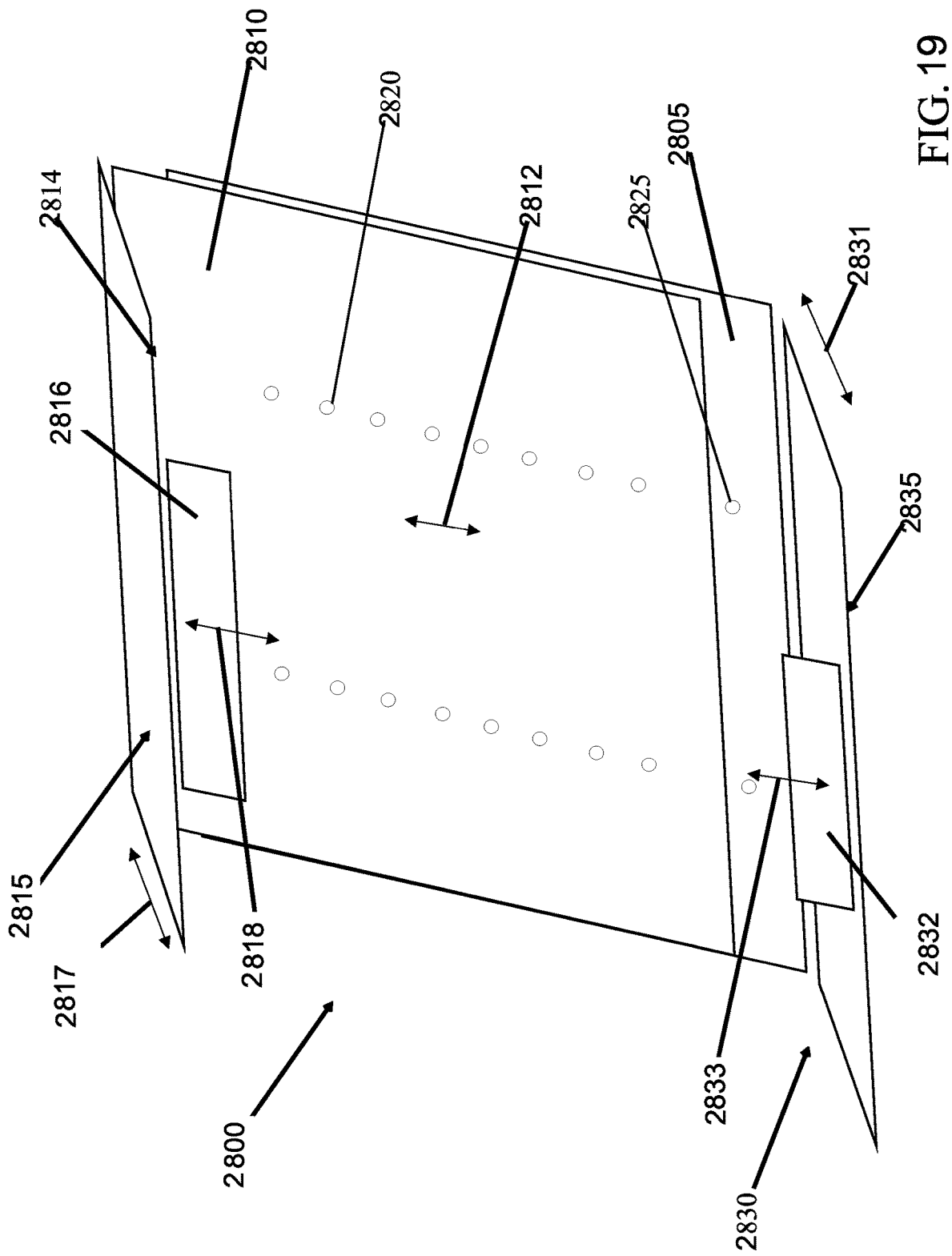
FIG. 19 is an example perspective view of an example second adjustable wall mount that may be used with the example organizer of FIGS. 14-18 or another organizer.
Figure 20:
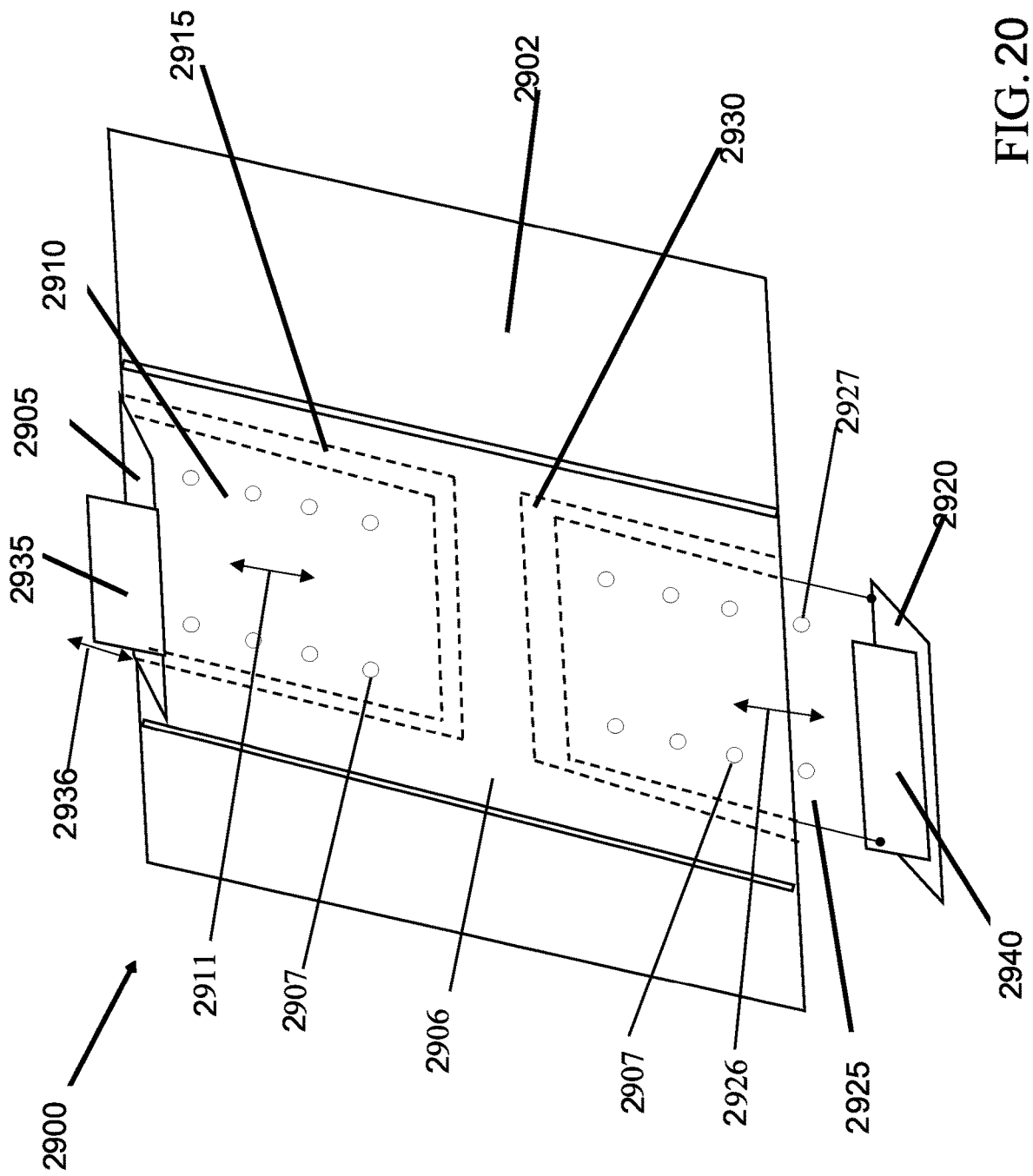
FIG. 20 is an example perspective view of an example third adjustable wall mount that may be used with the example organizer of FIGS. 14-19 or another organizer.

FIGS. 18-20 are perspective views of example adjustable wall mounts that may be used with the example organizer 2100 of FIGS. 14-17, above, other example organizers disclosed herein, or may be used with another organizer (e.g., tool box, etc.) of any make (e.g., DeWalt, Husky, Stanley, Black & Decker, etc.) or model.

FIG. 18 shows an example first adjustable wall mount 2700 including an example mount 2705 attachable to a wall or other vertical or inclined surface (hereinafter collectively denoted as a "wall" for brevity). In some examples, the example mount 2705 is attached to a wall or other vertical or inclined surface via one or more example through holes 706 through which mechanical fasteners (e.g., screws, nails, etc.) may be disposed to connect the example mount 2705 to the wall. In some examples, the example mount 2705 is attached to a wall via one or more adhesives or is itself attached to another mount that is secured to the wall. The example first adjustable wall mount 2700 also includes an example base 2710 selectively positionable relative to the example mount 2705. In some examples, the example base 2710 is translatable (e.g., vertically translatable and/or horizontally translatable) relative to the example mount 2705. For instance, the example base 2710 is translatable vertically relative to the example mount 2705 in the direction(s) of the example arrow 2712. In some examples, the example base 2710 is secured to the example mount 2705 via one or more example locking elements (not shown) to lock the example base 2710 relative to the example mount 2705 when the example base 2710 is in a desired position relative to the example mount 2705. For instance, in some examples, the one or more locking elements includes mechanical fasteners (e.g., screws, dowels, pins, pegs, etc.) inserted through a selected one or more of the example through holes 2725 formed in the example mount 2705 and through a selected one or more of the example through holes 2720 formed in the example base 2710 after alignment of the example through holes 2720, 2725. The mechanical fasteners (e.g., screws, etc.) are selectively removable, enabling removal of the mechanical fasteners to permit relative motion between (e.g., repositioning of) the example mount 2705 relative to the example base 2710. Following such repositioning, the one or more locking elements (e.g., mechanical fasteners, etc.) are secured in a desired location (e.g., inserting the one or more mechanical fasteners through aligned ones of the through holes 2720, 2725) to prevent relative motion between the example mount 2705 and the example base 2710. In some examples, the one or more locking elements include mechanical fasteners (e.g., latch(es), lock(s), clasp(s), etc.) disposed on the example mount 2705 and/or the example base 2710 (e.g., on lateral portions thereof) that are selectively repositionable (e.g., moved from a first state of engagement with the example base 2710 to a second state of disengagement from the example base 2710) to enable relative motion between the example mount 2705 and the example base 2710 to facilitate positioning or repositioning. In some examples, the one or more locking elements include one or more adhesives.

In some examples, the first adjustable wall mount 2700 of FIG. 18 includes an example first receiver 2715 to receive a handle of an organizer (e.g., the example handle 2110 of the example organizer 2100, etc.). In some examples, an example distal end 2714 of the example first receiver 2715 includes an example first retainer 2716 (e.g., a flange, a plate, a post, a dorsal protrusion, a high friction interface, a magnet, etc.) to inhibit or to prevent a handle of the organizer (e.g., the example handle 2110 of the example organizer 2100, etc.) from moving in a forward direction away from the wall (see, e.g., example wall 2106 in FIG. 14) and out of engagement with the example first receiver 2715. In some examples, the example base 2710 of the example first adjustable wall mount 2700 includes an example second receiver 2730 to receive example second end 2192 of the example organizer 2100 (e.g., the example second end 2292 of the example base 2200), or a bottom of another organizer, and to retain in place the example second end 2192 of the example organizer, or bottom of another organizer. In some examples, the example second receiver 2730 bears an entirety of a weight of an organizer inserted into the example first adjustable wall mount 2700. In some examples, the example first receiver 2715 bears an entirety of a weight of an organizer inserted into the example first adjustable wall mount 2700. In some examples, the example first receiver 2715 and the example second receiver 2730 each bear a portion of a weight of an organizer inserted into the example first adjustable wall mount 2700. In some examples, an example distal end 2735 of the example second receiver 2730 includes an example second retainer 2740 (e.g., a flange, a plate, a post, a dorsal protrusion, a high friction interface, a magnet, etc.) to inhibit or to prevent the example second end 2192 of the example organizer 2100 (e.g., a second end 2292 of the example base 2200), or a bottom of another organizer, from moving in a forward direction away from the wall (see, e.g., example wall 2106 in FIG. 14) and out of engagement with the example second receiver 2730.

In the example of FIG. 14, the example first receiver 2715 is integrated with the example mount 2705 and the example second receiver 2730 is integrated with the example base 2710. In such example, the example first receiver 2715 and the example mount 2705 are stationary, with the example second receiver 2730 and the example base 2710 being translatable relative thereto. However, in some other examples, the example first receiver 2715 is integrated with the example base 2710 and the example second receiver 2730 is integrated with the example mount 2705. In such example, the example second receiver 2730 is stationary, with the example first receiver 2715 and the example base 2710 being translatable relative thereto.

FIG. 19 depicts a perspective view of an example second adjustable wall mount 2800 that may be used with any example organizer disclosed herein. FIG. 19 shows an example second adjustable wall mount 2800 including an example mount 2805 attachable to a wall (not shown in FIG. 19, see, e.g., FIG. 14). In some examples, the example mount 2805 is attached to a wall via one or more example through holes (not shown) through which mechanical fasteners (e.g., screws, nails, etc.) may be disposed to connect the example mount 2805 to the wall. In some examples, the example mount 2805 is attached to a wall via one or more adhesives or is itself attached to another mount that is secured to the wall.

The example second adjustable wall mount 2800 also includes an example base 2810 selectively positionable relative to the example mount 2805. In some examples, the example base 2810 is translatable (e.g., vertically translatable and/or horizontally translatable) relative to the example mount 2805. For instance, the example base 2810 is translatable vertically relative to the example mount 2805 in the direction(s) of the example arrow 2812. In some examples, the example base 2810 is secured to the example mount 2805 via one or more example locking elements (not shown) to lock the example base 2810 relative to the example mount 2805 when the example base 2810 is in a desired position relative to the example mount 2805. For instance, in some examples, the one or more locking elements includes mechanical fasteners (e.g., screws, dowels, pins, pegs, etc.) inserted through a selected one or more of the example through holes 2825 formed in the example mount 2805 and through a selected one or more of the example through holes 2820 formed in the example base 2810 after alignment of the example through holes 2820, 2825. The mechanical fasteners (e.g., screws, etc.) are selectively removable, enabling removal of the mechanical fasteners to permit relative motion between (e.g., repositioning of) the example mount 2805 relative to the example base 2810. Following such repositioning, the one or more locking elements (e.g., mechanical fasteners, etc.) are secured in a desired location (e.g., inserting the one or more mechanical fasteners through aligned ones of the through holes 2820, 2825) to prevent relative motion between the example mount 2805 and the example base 2810.

In some examples, the one or more locking elements include mechanical fasteners (e.g., latch(es), lock(s), clasp(s), etc.) disposed on the example mount 2805 and/or the example base 2810 (e.g., on lateral portions thereof) that are selectively repositionable (e.g., moved from a first state of engagement with the example base 2810 to a second state of disengagement from the example base 2810) to enable relative motion between the example mount 2805 and the example base 2810 to facilitate positioning or repositioning. In some examples, the one or more locking elements include one or more adhesives. In some examples, rather than two tracks of example through holes 2820, 2825 in the example mount 2805 and the example base 2810, the example mount 2805 and the example base 2810 include a plurality of tracks of example through holes 2820, 2825 or include an array (e.g., a n×n or an n×m array, wherein n and m can be any integer value) to facilitate lateral positioning of the example base 2810 relative to the example mount 2805.

In some examples, the second adjustable wall mount 2800 of FIG. 19 includes an example first receiver 2815 to receive a handle of an organizer (e.g., the example handle 2110 of the example organizer 2100, etc.). In the example of FIG. 19, the example first receiver 2815 extends outwardly from the example base 2810 of the example second adjustable wall mount 2800. In some examples, an example distal end 814 of the example first receiver 2815 includes an example first retainer 2816 (e.g., a flange, a plate, a post, a dorsal protrusion, a high friction interface, a magnet, etc.) to inhibit or to prevent a handle of the organizer (e.g., the example handle 2110 of the example organizer 2100, etc.) from moving in a forward direction away from the wall (see, e.g., example wall 2106 in FIG. 14) and out of engagement with the example first receiver 2815. In some examples, the example mount 2805 of the example second adjustable wall mount 2800 includes an example second receiver 2830 to receive and retain an example second end 2192 portion of the example organizer 2100 (e.g., example second end 2292 of the example base 2200 of the example organizer 2100), or a bottom of another organizer.

In some examples, the example second receiver 2830 bears an entirety of a weight of an organizer inserted into the example second adjustable wall mount 2800. In some examples, the example first receiver 2815 bears an entirety of a weight of an organizer inserted into the example second adjustable wall mount 2800. In some examples, the example first receiver 2815 and the example second receiver 2830 each bear a portion of a weight of an organizer inserted into the example second adjustable wall mount 2800. In some configurations of the example second adjustable wall mount 2800 of FIG. 19, the example first retainer 2816 is positioned to extend downwardly beneath the example first receiver 2815. In this position, the example first receiver 2815 and the example first retainer do not bear any weight of the organizer, but rather laterally secure a handle of the organizer and/or another structure of the organizer (i.e., one or more portions of the organizer other than the handle) to prevent rotational movement of the organizer relative to the example second receiver 2830. In some examples, the first receiver 2815 and/or the first retainer 2816 may be positioned to apply a compressive force (e.g., a small compressive force) against a handle of the organizer and/or another structure of the organizer to enhance engagement between the first receiver 2815 and/or the first retainer 2816 and the handle of the organizer and/or other structure of the organizer.

In some examples, an example distal end 2835 of the example second receiver 2830 includes an example second retainer 2832 (e.g., a flange, a plate, a post, a dorsal protrusion, a high friction interface, a magnet, etc.) to inhibit or to prevent the example second end 2192 of the example organizer 2100 (e.g., example second end 2292 of the example base 2200) from moving in a forward direction away from the wall (see, e.g., example wall 2106 in FIG. 14) and out of engagement with the example second receiver 2830.

In the example of FIG. 19, the example first receiver 2815 is integrated with the example base 2810 and the example second receiver 2730 is integrated with the example mount 2805. In FIG. 19, the example second receiver 2830 and the example mount 2805 are stationary and the example first receiver 2815 and the example base 2810 are translatable relative thereto. However, in some other examples, the example first receiver 2815 is integrated with the example mount 2805 and the example second receiver 2830 is integrated with the example base 2810. In such example, the example first receiver 2715 and the example base 2710 are stationary, with the example second receiver 2830 and the example base 2810 being translatable relative thereto.

In FIG. 19, the example first receiver 2815 is movable relative to the example base 2810, such as in the directions indicated by the example arrow 2817, and the example first retainer 2816 is movable relative to the example first receiver 2815, such as in the directions indicated by the example arrow 2818. In some examples, the example first receiver 2815 is movable, in addition to the directions indicated by the example arrow 2817, or alternatively thereto, vertically relative to the example base 2810 and/or rotationally relative to the example base 2810 (e.g., along an axis connecting the example first receiver 2815 to the example base 2810). In some examples, the example first retainer 2816 is movable, in addition to the directions indicated by the example arrow 2818, or alternatively thereto, vertically relative to the example first receiver 2815 and/or rotationally relative to the example first receiver 2815 (e.g., along an axis connecting the example first receiver 2815 to the example first retainer 2816). In FIG. 19, the example first retainer 2816 is shown to be disposed below the example first receiver 2815. In some examples, the example first retainer 2816 is disposed above the example first receiver 2815 (see, e.g., the example retainer 2116 of FIG. 14).

In some examples, the example translational movement (e.g., vertically, horizontally) of the example first receiver 2815 relative to the example base 2810 is implemented via a linear guide rail or linear track having one or more locking positions (e.g., locking device integrated with guide rail disposed on the example base 2810) or a locking mechanism (e.g., a lever handle moving a brake unit into engagement with the guide rail, a clamp, etc.) integrated with the example first receiver 2815. In some examples, the example rotational movement of the example first receiver 2815 relative to the example base 2810 is implemented via a locking hinge having one or more locking positions connecting the example first receiver 2815 and the example base 2810.

In FIG. 19, the example second receiver 2830 is movable relative to the example mount 2805, such as in the directions indicated by the example arrow 2831, and the example second retainer 2832 is movable relative to the example second receiver 2830, such as in the directions indicated by the example arrow 2833. In some examples, the example second receiver 2830 is movable, in addition to the directions indicated by the example arrow 2831, or alternatively thereto, vertically relative to the example mount 2805 and/or rotationally relative to the example mount 2805 (e.g., along an axis connecting the example second receiver 2830 to the example mount 2805). In some examples, the example second retainer 2832 is movable, in addition to the directions indicated by the example arrow 2833, or alternatively thereto, vertically relative to the example second receiver 2830 and/or rotationally relative to the example second receiver 2830 (e.g., along an axis connecting the example second receiver 2830 to the example second retainer 2832).

In some examples, the example translational movement (e.g., vertically, horizontally) of the example second receiver 2830 relative to the example mount 2805 is implemented via a linear guide rail or linear track having one or more locking positions (e.g., locking device integrated with guide rail disposed on the example mount 2805) or a locking mechanism (e.g., a lever handle moving a brake unit into engagement with the guide rail, a clamp, etc.) integrated with the example second receiver 2830. In some examples, the example rotational movement of the example second receiver 2830 relative to the example mount 2805 is implemented via a locking hinge having one or more locking positions connecting the example second receiver 2830 and the example mount 2805.

FIG. 20 depicts a perspective view of an example third adjustable wall mount 2900 that may be used with the example organizer 2100 of FIGS. 14-16 or with another organizer. FIG. 20 shows an example third adjustable wall mount 2900 including an example mount 2902 attachable to a wall (not shown in FIG. 20, see, e.g., FIG. 14). In some examples, the example mount 2902 is attached to a wall via one or more example through holes (not shown) through which mechanical fasteners (e.g., screws, nails, etc.) may be disposed to connect the example mount 2902 to the wall. In some examples, the example mount 2902 is attached to a wall via one or more adhesives or is itself attached to another mount that is secured to the wall.

The example third adjustable wall mount 2900 also includes an example first base 2910 and an example second base 2910 selectively positionable relative to the example mount 2902. In some examples, the example first base 2910 is translatable vertically relative to the example mount 2902 within an example slot 2915, as indicated by the example arrow 2911. In some examples, the example second base 2925 is translatable vertically relative to the example mount 2902 within an example slot 2930, as indicated by the example arrow 2926.

In some examples, the example first base 2910 and the example second base 2925 are each secured to the example mount 2902 via one or more example locking elements (not shown) to lock the example first base 2910 and the example second base 2925 relative to the example mount 2902 when the example first base 2910 and the example second base 2925 are each in a desired position relative to the example mount 2902. For instance, in some examples, the one or more locking elements includes mechanical fasteners (e.g., screws, dowels, pins, pegs, etc.) inserted through a selected one or more of example through holes 2907 formed in the example mount 2902 and through a selected one or more of example through holes 2927 formed in the example first base 2910 and the example second base 2925 after alignment of the example through holes 2907, 2927. The mechanical fasteners (e.g., screws, etc.) are selectively removable, enabling removal of the mechanical fasteners to permit relative motion between (e.g., repositioning of) the example mount 2902 relative to the example first base 2910 and the example second base 2925. Following such repositioning, the one or more locking elements (e.g., mechanical fasteners, etc.) are secured in a desired location (e.g., inserting the one or more mechanical fasteners through aligned ones of the through holes 2907, 2927) to prevent relative motion between the example mount 2902 and the example first base 2910 and the example second base 2925.

In some examples, the one or more locking elements include mechanical fasteners (e.g., latch(es), lock(s), clasp(s), etc.) disposed on the example mount 2902 that are selectively repositionable (e.g., moved from a first state of engagement with the example first base 2910 and the example second base 2925 to a second state of disengagement from the example first base 2910 and the example second base 2925) to enable relative motion between the example mount 2902 and the example first base 2910 and the example second base 2925 to facilitate positioning or repositioning. In some examples, rather than two tracks of example through holes 2907, 2927 in the example mount 2902 and the example first base 2910 and the example second base 2925, the example mount 2902, the example first base 2910 and the example second base 2925 include a plurality of tracks of, or an array of, example through holes 2907, 2927.

In some examples, the third adjustable wall mount 2900 of FIG. 20 includes an example first receiver 2905 to receive a handle of an organizer (e.g., the example handle 2110 of the example organizer 2100, etc.). In the example of FIG. 20, the example first receiver 2905 extends outwardly from the example first base 2910, which is movably disposed within the example slot 2915 of the example mount 2902. In some examples, an example distal end of the example first receiver 2905 includes an example first retainer 2935 (e.g., a flange, a plate, a post, a dorsal protrusion, a high friction interface, a magnet, etc.) to inhibit or to prevent a handle of the organizer (e.g., the example handle 2110 of the example organizer 2100, etc.) from moving in a forward direction away from the wall (see, e.g., example wall 2106 in FIG. 14) and out of engagement with the example first receiver 2905. In some examples, the example first retainer 2935 is movable (e.g., in translation and/or rotation) relative to the example first receiver 2905, such as in the directions indicated by the example arrow 2936 (e.g., upwardly or downwardly relative to the example first receiver 2905). In some examples, the example second base 2925 includes an example second receiver 2920 to receive and retain the example second end 2192 of the example organizer 2100 (e.g., second end 2292 of the example base 2200). In some examples, the example first retainer 2935 is rotatable relative to the first receiver 2905 and/or the example second retainer 2940 is rotatable relative to the second receiver 2920.

In some examples, the example second receiver 2920 bears an entirety of a weight of an organizer inserted into the example third adjustable wall mount 2900. In some examples, the example first receiver 2905 bears an entirety of a weight of an organizer inserted into the example third adjustable wall mount 2900. In some examples, the example first receiver 2905 and the example second receiver 2920 each bear a portion of a weight of an organizer inserted into the example third adjustable wall mount 2900. In some configurations of the example third adjustable wall mount 2900 of FIG. 20, the example first retainer 2935 is positioned to extend downwardly beneath the example first receiver 2905. In this position, the example first receiver 2905 and the example first retainer do not bear any weight of the organizer, but rather laterally secure a handle of the organizer and/or another structure of the organizer (i.e., one or more portions of the organizer other than the handle) to prevent rotational movement of the organizer relative to the example second receiver 2920. In some examples, the first receiver 2905 and/or the first retainer 2935 may be positioned to apply a compressive force (e.g., a small compressive force) against a handle of the organizer and/or another structure of the organizer to enhance engagement between the first receiver 2905 and/or the first retainer 2935 and the handle of the organizer and/or other structure of the organizer.

In some examples, an example distal end of the example second receiver 920 includes an example second retainer 2940 (e.g., a flange, a plate, a post, a dorsal protrusion, a high friction interface, a magnet, etc.) to inhibit or to prevent the example second end 2192 of the example organizer 2100 (e.g., the example second end 2292 of the example base 2200) from moving in a forward direction away from the wall (see, e.g., example wall 2106 in FIG. 14) and out of engagement with the example second receiver 2920.

In some examples, the example translational movement (e.g., vertically) of the example first base 2910 relative to the example mount 2902 is implemented via a linear guide rail or linear track having one or more locking positions or a locking mechanism (e.g., a lever handle moving a brake unit into engagement with the guide rail, a clamp, etc.) integrated with the example mount 2902. In some examples, the example translational movement (e.g., vertically) of the example second base 2925 relative to the example mount 2902 is implemented via a linear guide rail or linear track having one or more locking positions or a locking mechanism (e.g., a lever handle moving a brake unit into engagement with the guide rail, a clamp, etc.) integrated with the example mount 2902.

In the preceding examples, the example wall mount 2105, the example first adjustable wall mount 2700, the example second adjustable wall mount 2800, the example third adjustable wall mount 2900, the example lateral connectors 2140, the example side connectors 2150, the example base 2200, the example cover 2300, the example partition 440, may be made from or include one or more metals (e.g., aluminum, an alloy, etc.) and/or one or more plastics (e.g., a polymer such as, but not limited to a thermoplastic polymer, a thermosetting polymer, a phenolic resin, polyamide (PA), polycarbonate (PC), high-density polyethylene (HDPE), low-density polyethylene (LDPE), polypropylene (PP), polyvinyl chloride (PVC), acrylonitrile butadiene styrene (ABS), etc.).

In the preceding examples, a plurality of locking mechanisms (i.e., the example central connector 2315, the example lateral connectors 2140 and the example side connectors 2150) are shown to secure the example cover (e.g., cover 2300) to the example base (e.g., base 2200). In some examples, the example lateral connectors 2140 are omitted and the example side connectors 2150 are displaced forwardly in a direction toward the upper corners of the example organizer 2100 and further from the example hinge(s) 2202.

In some examples, the example wall mount 2105 may include an example central connector (not shown) similar to that shown by way of the example central connector 2315, but sized to not only engage a corresponding feature on the example base 2200 of the example organizer 2100. For example, an example first connector (e.g., similar to 2322) of the example central connector of the example wall mount engages an example second connector (e.g., similar to 2323) of the example base 2200. In some examples, the example central connector of the example wall mount 2105 includes a first mechanical closure or feature (e.g., a snap connector, a ledge, a strike, a protrusion or boss, a recess, etc.) and the example base 2200 includes a second mechanical closure or feature (e.g., a snap connector, a ledge, a strike, a protrusion or boss, a recess, etc.) configured to matingly engage one another to lock the example base 2200 of the example organizer 2100 to the example wall mount 2105. In some examples, the example central connector of the example wall mount 2105 is disposed at a bottom portion of the example wall mount 2105 to not only lock the example organizer 2100 to the example wall mount, but to also support a bottom portion of the example organizer 2100. In some examples, the example central connector of the example wall mount 2105 is disposed at a top portion of the example wall mount 2105.

In some examples, the example central connector of the example wall mount 2105 is attached to, or integral with (e.g., formed as part of, permanently affixed to, etc.), the example wall mount 2105. In some examples, the example central connector of the example wall mount 2105 includes an example hinge connecting the example central connector to the example wall mount 2105. In some examples, the example hinge of the example central connector of the example wall mount 2105 is a living hinge. In some examples, the example central connector of the example wall mount 2105 is a separate part from the example wall mount 2105 and the example central connector includes a first hinge element (e.g., a shaft, etc.) that is attached to corresponding second hinge element (e.g., a knuckle, a loop, joint, a node, etc.) of the example wall mount 2105, with a spring or resilient element biasing the example central connector inwardly to facilitate the automatic engaging of the example mechanical closure of the example central connector with the corresponding mechanical closure or feature on the example base 2200 of the example organizer 2100.

In some examples, the present concepts include a wall mounted organization system including a wall mount (e.g., 2105, 2700, 2800, 2900, etc.) and including an organizer (e.g., 2100, etc.) having a base (e.g., 2200, etc.) and a cover (e.g., 2300, etc.), the organizer defining one or more compartments in an interior volume. The wall mounted organization system enables the storage of an example organizer on a wall or other inclined surface (e.g., a surface in a work van, etc.).

The disclosed examples of FIGS. 1-20 illustrate a user-configurable organizer system configurable to individual preferences and/or job-specific requirements. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wall mount for a tool box, the wall mount comprising:
    a base, the base being at least substantially planar and defining a volume dimensioned to receive a tool box;
    a support extending outwardly from a lower portion of the base, the support constructed to at least substantially bear a weight of a tool box received by the wall mount; and
    at least one receiver extending outwardly from an upper portion of the base, the at least one receiver being constructed to engage a correspondingly dimensioned and positioned feature of a tool box to prevent outward rotation of a tool box about the at least one support,
    wherein the receiver comprises a retainer at a distal portion thereof,
    wherein the retainer of the receiver comprises one or more upwardly extending sections or members to limit forward movement of a handle of a tool box received by the wall mount.

2. The wall mount according to claim 1, wherein the support comprises only one support.

3. The wall mount according to claim 2, wherein the one support extends across at least substantially an entire lateral width of the base.

4. The wall mount according to claim 2, wherein the one support extends across only a portion of a lateral width of the base.

5. The wall mount according to claim 1, wherein the support comprises one or more first connectors comprising one or more male features and/or one or more female features to matingly engage corresponding one or more second connectors at a lower portion of a tool box received by the wall mount.

6. The wall mount according to claim 5, wherein the one or more first connectors comprise recessed areas, grooves or teeth.

7. The wall mount according to claim 1, wherein at least one of the at least one-receiver or the support is movable from a first position relative to the base to a second position.

8. The wall mount according to claim 1, wherein the support comprises a retainer at a distal portion thereof.

9. The wall mount according to claim 8, wherein the retainer of the support comprises one or more upwardly extending sections or members to limit lateral movement of a base portion of a tool box received by the wall mount.

10. The wall mount according to claim 1, wherein the retainer of the receiver comprises a recessed area to receive a handle of a tool box received by the wall mount and to limit translation of the handle along the retainer.

11. The wall mount according to claim 1, wherein the retainer comprises a movable downwardly extending member to positively engage an upper portion of a tool box received by the wall mount.

* * * * *